US012437592B2

(12) United States Patent
Poddar

(10) Patent No.: US 12,437,592 B2
(45) Date of Patent: Oct. 7, 2025

(54) SYSTEM AND METHOD FOR MULTIPLE LOCKABLE MEDICATION CONTAINERS

(71) Applicant: Satish Poddar, Duluth, GA (US)

(72) Inventor: Satish Poddar, Duluth, GA (US)

( * ) Notice: Subject to any disclaimer, the term of this patent is extended or adjusted under 35 U.S.C. 154(b) by 0 days.

(21) Appl. No.: 18/338,085

(22) Filed: Jun. 20, 2023

(65) Prior Publication Data

US 2023/0351827 A1 Nov. 2, 2023

Related U.S. Application Data

(63) Continuation-in-part of application No. 17/571,053, filed on Jan. 7, 2022, now Pat. No. 12,027,004, which is a continuation of application No. 16/895,942, filed on Jun. 8, 2020, now Pat. No. 11,238,682, which is a continuation-in-part of application No. 16/431,449, (Continued)

(51) Int. Cl.

| | |
|---|---|
| ***A61J 1/03*** | (2023.01) |
| ***A61J 7/00*** | (2006.01) |
| ***A61J 7/04*** | (2006.01) |
| ***G06Q 50/14*** | (2012.01) |
| ***G07C 9/00*** | (2020.01) |

(52) U.S. Cl.

CPC ............ *G07C 9/00896* (2013.01); *A61J 1/03* (2013.01); *A61J 7/0084* (2013.01); *A61J 7/0409* (2013.01); *A61J 7/0445* (2015.05); *A61J 7/0481* (2013.01); *G06Q 50/14* (2013.01); *A61J 2200/30* (2013.01)

(58) Field of Classification Search

CPC .......... A61J 1/03; A61J 7/0084; A61J 7/0445; A61J 2200/30; G07C 9/00896; G07C 9/0069

See application file for complete search history.

(56) References Cited

U.S. PATENT DOCUMENTS

| | | | |
|---|---|---|---|
| 4,967,928 | A | 11/1990 | Carter |
| 5,701,828 | A | 12/1997 | Benore et al. |

(Continued)

FOREIGN PATENT DOCUMENTS

| | | |
|---|---|---|
| WO | WO 2018/035147 A1 | 2/2018 |

OTHER PUBLICATIONS

J Russell et al. "Illinois Law Will Bring Lockable Pill Bottles, But Will They Work?", Chicago Tribune, Sep. 2, 2015, pp. 1-5, http://www.chicagotribune.com/business/ct-locked-pill-bottles-0903-biz-2- -0150902-story.html.

(Continued)

*Primary Examiner* — Vernal U Brown
(74) *Attorney, Agent, or Firm* — BakerHostetler

(57) ABSTRACT

A system having a first locking medication dispenser and a second locking medication container both connected to a base. Each of the first locking medication dispenser and the second locking medication dispenser has an outer container, a inner container configured to be disposed within the outer container and further configured to receive a medication, and a rotatable assembly connected to a bottom of the inner container, the rotatable assembly having a hole defined therein, wherein the hole rotates with the rotation of the rotatable assembly. The base is coupled to the first locking medication dispenser and the second locking medication dispenser and the base is configured to dispense medications from either of the first locking medication dispenser or the second locking medication dispenser.

18 Claims, 49 Drawing Sheets

Related U.S. Application Data filed on Jun. 4, 2019, now abandoned, which is a continuation of application No. 16/053,027, filed on Aug. 2, 2018, now Pat. No. 10,325,433, which is a continuation of application No. 15/399,106, filed on Jan. 5, 2017, now Pat. No. 10,064,788.

(56) References Cited

U.S. PATENT DOCUMENTS

| | | | |
|---|---|---|---|
| 6,335,907 | B1 | 1/2002 | Momich et al. |
| 7,426,475 | B1 | 9/2008 | Tangellapally et al. |
| 7,467,093 | B1 | 12/2008 | Newton et al. |
| 7,600,648 | B2 | 10/2009 | Hamer |
| 7,757,295 | B1 | 7/2010 | Hadaaegh |
| 8,020,415 | B2 | 9/2011 | Corbin et al. |
| 8,662,330 | B2 | 3/2014 | Simpson |
| 8,944,263 | B1 | 2/2015 | Small |
| 9,870,450 | B2 | 1/2018 | Blackburn |
| 10,064,788 | B2 | 9/2018 | Poddar |
| 10,325,433 | B2 | 6/2019 | Poddar |
| 10,512,592 | B1 | 12/2019 | Sandhu |
| 11,176,764 | B2 | 11/2021 | Poddar |
| 2007/0156282 | A1 | 7/2007 | Dunn |
| 2007/0186923 | A1 | 8/2007 | Poutiatine et al. |
| 2008/0029601 | A1 | 2/2008 | Clarke et al. |
| 2008/0264967 | A1 | 10/2008 | Schifman et al. |
| 2010/0318218 | A1 | 12/2010 | Muncy, Jr. et al. |
| 2012/0185276 | A1 | 7/2012 | Shah |
| 2013/0231954 | A1 | 9/2013 | Bryant |
| 2014/0276549 | A1 | 9/2014 | Osorio |
| 2015/0272825 | A1 | 10/2015 | Lim et al. |
| 2015/0314069 | A1 | 11/2015 | Estes |
| 2015/0327691 | A1 | 11/2015 | Alshammari |
| 2016/0158107 | A1 | 6/2016 | Dvorak et al. |
| 2016/0267310 | A1 | 9/2016 | Alnasser et al. |
| 2017/0053098 | A1 | 2/2017 | Hawkins |
| 2017/0083687 | A1 | 3/2017 | Josyula et al. |
| 2017/0095405 | A1* | 4/2017 | Afsarifard ............ A61J 7/0472 |
| 2017/0270274 | A1 | 9/2017 | Garcia et al. |
| 2018/0133110 | A1 | 5/2018 | Bickley |
| 2018/0308571 | A1 | 10/2018 | Tupler et al. |
| 2020/0261319 | A1 | 8/2020 | Hines |
| 2020/0372740 | A1 | 11/2020 | Poddar |
| 2020/0372741 | A1 | 11/2020 | Poddar |
| 2021/0045972 | A1 | 2/2021 | Zuleta |

OTHER PUBLICATIONS

D. Lambert, "Locking Pill Bottles Gaining in Marketplace," The Sacramento Bee, Jan. 10, 2015, pp. 1-7, http://www.sacbee.com/news/business/technology/article5730735.html.

Safe Lock—Combination Locking Medication Bottle, pp. 1-5, http://www.saferlockrx.com/product/safer-lock/.

International Patent Application No. PCT/US2024/029208; Int'l Search Report and Written Opinion; dated Jul. 22, 2024; 12 pages.

International Patent Application No. PCT/US2024/029218; Int'l Search Report and the Written Opinion; dated Sep. 3, 2024; 16 pages.

International Patent Application No. PCT/US2024/029211; Int'l Written Opinion and Search Report; dated Nov. 4, 2024; 21 pages.

* cited by examiner

SYSTEM AND METHOD FOR MULTIPLE LOCKABLE MEDICATION CONTAINERS

CROSS REFERENCE TO RELATED APPLICATIONS

This application is a continuation-in-part of, and claims priority to, U.S. patent application Ser. No. 17/571,053, filed Jan. 7, 2022, which is a continuation of, and claims priority to, U.S. patent application Ser. No. 16/895,898, filed Jun. 8, 2020, which is a continuation-in-part of, and claims priority to, U.S. patent application Ser. No. 16/431,449, filed Jun. 4, 2019, which is a continuation of, and claims priority to U.S. patent application Ser. No. 16/053,027, filed Aug. 2, 2018, now U.S. Pat. No. 10,325,433 issued Jun. 18, 2019, which is a continuation of U.S. patent application Ser. No. 15/399,106, filed Jan. 5, 2017, now U.S. Pat. No. 10,064,788 issued Sep. 4, 2018 all of which are entitled "Locking Medication Containers and Methods of Use Thereof," the entire contents of which are hereby incorporated herein by reference.

TECHNICAL FIELD

The technical field relates generally to medication containers and more particularly to systems and methods for utilizing locking medication containers.

BACKGROUND

Many people enjoy travelling to other parts of the world to see new sights and enjoy the local culture. Similarly, the modern business world requires many workers to travel abroad to investigate a potential new market or meet a foreign client, for example. Visiting a new locale, however, may expose a traveler to novel circumstances or environments which may adversely affect the traveler's health. For instance, the water purification technology used at a travel destination may be less advanced than that of a traveler's home city. When the traveler drinks the water at the travel destination, the traveler may be exposed to bacteria, parasites, or other pathogens that the traveler's immune system is unaccustomed to handling. As another example, certain diseases, such as malaria, may be common in some regions of the world. When a traveler visits one of those regions, the traveler may be exposed to those diseases to which the traveler might not have otherwise been exposed. It is not uncommon for a particular travel destination to be associated with several such factors that may each adversely affect a traveler's health. Moreover, even ailments common in a traveler's home country may strike when at a travel destination.

In order to allow a traveler to respond while on the trip to such adverse health conditions caused by various aspects of a travel destination, a health care provider may supply a medication for each of the potential health conditions.

SUMMARY

Disclosed herein are locking medication containers and methods of use thereof. In one aspect, a method may include receiving, by a medication provider and from a user, a request for a medication. The medication may be placed in a medication container with a locking mechanism that is operable to lock and unlock the medication container. The medication container may be locked using the locking mechanism. The locked medication container with the medication within may be provided to the user. Subsequent to providing the locked medication container to the user, a request may be received from the user to access the medication in the medication container. A credential may be sent to the user that is usable, via the locking mechanism, to unlock the medication container. The user may then input the credential into the locking mechanism to unlock the medication container and access the medication therein.

In another aspect, a method may include receiving, by a medication provider, a request from a user for medication. The medication may be placed in a plurality of compartments in a medication container that is configured with a locking mechanism that is operable to lock and unlock each of the plurality of compartments. Each of the plurality of compartments may be locked using the locking mechanism. The locked medication container may be provided to the user. A request may subsequently be received from the user requesting access to the medication in the medication container. A credential may be sent to the user that is usable, via the locking mechanism, to unlock a subset of the plurality of compartments. The user may use the credential with the locking mechanism to unlock the subset of the plurality of compartments and access the medication therein.

In yet another aspect, a medication container may include a plurality of compartments, each for holding a medication. The medication container may further include a locking mechanism operable to lock and unlock each of the plurality of compartments. The medication container may further include a display and a processor communicatively connected to the locking mechanism and the display. The medication container may include a memory, communicatively connected to the processor and having instruction that, when executed by the processor, cause the processor to effectuate operations. The operations may include receiving an indication of a time interval during which a credential may be usable via the locking mechanism to unlock a subset of the plurality of compartments. The operations may further include displaying an indication, on the display and during the time interval, that a user should provide a user input. For example, the indication that a user should provide the user input may comprise an indication of the credential, such as a code. The operations may yet further include receiving the user input at a time point and, upon a determination that the user input matches the credential and that the time point is within the time interval, causing the locking mechanism to unlock the subset of the plurality of compartments.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings:

FIG. 1O is an example illustration of a medication dispenser according to an embodiment of the present disclosure;

FIG. 1AA is an example illustration of components of a medication dispenser according to an embodiment of the present disclosure;

FIG. 1AB is an example illustration of components of a medication dispenser according to an embodiment of the present disclosure;

FIG. 1AC is an example illustration of components of a medication dispenser according to an embodiment of the present disclosure;

FIG. 1AD is an example illustration of a medication collection mechanism according to an embodiment of the present disclosure;

FIG. 1AE is an example illustration of a software portal according to an embodiment of the present disclosure;

DETAILED DESCRIPTION OF ILLUSTRATIVE EMBODIMENTS

Figure 1A:
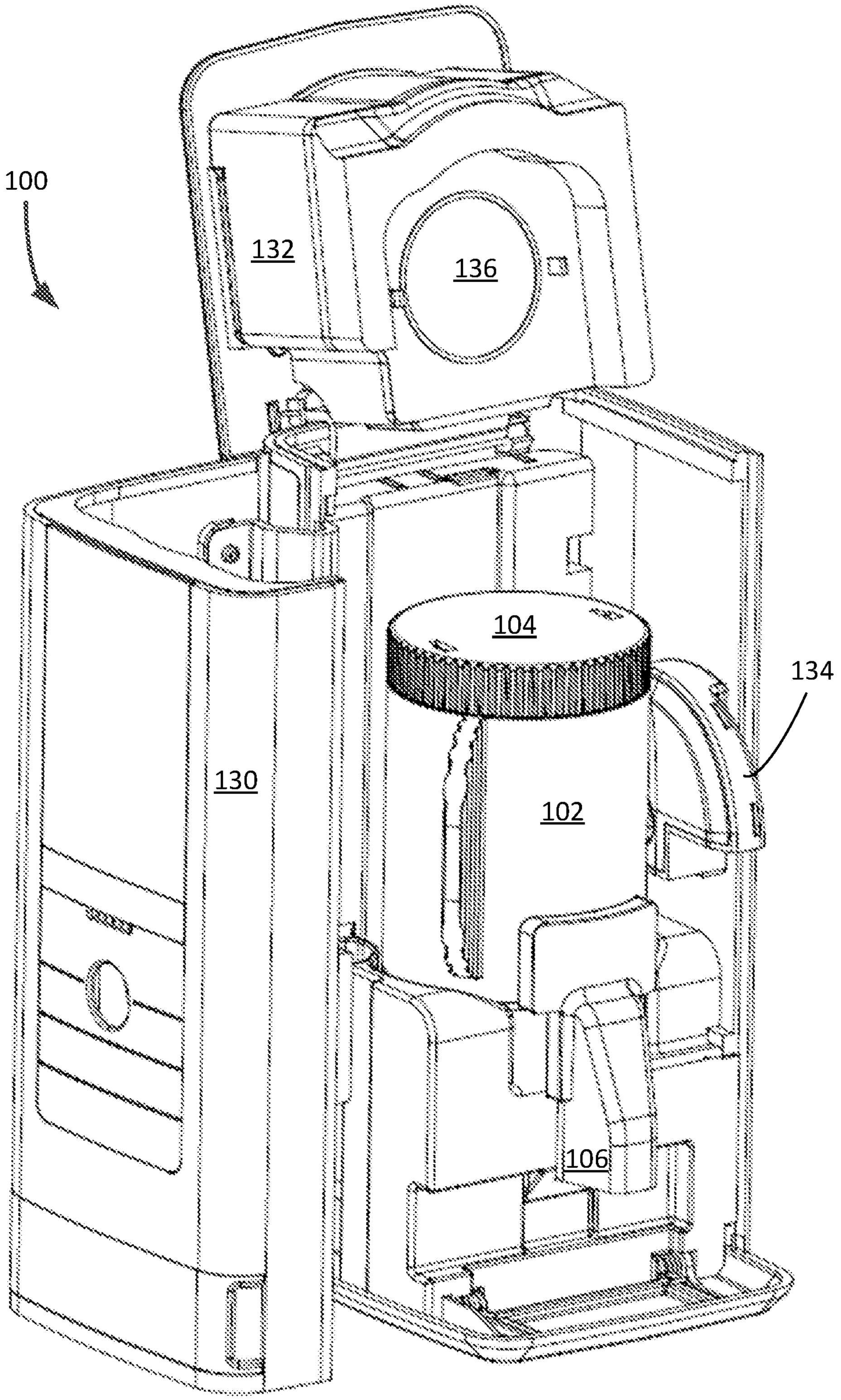
FIG. 1A is an example illustration of a medication dispenser according to an embodiment of the present disclosure.
Figure 1B:
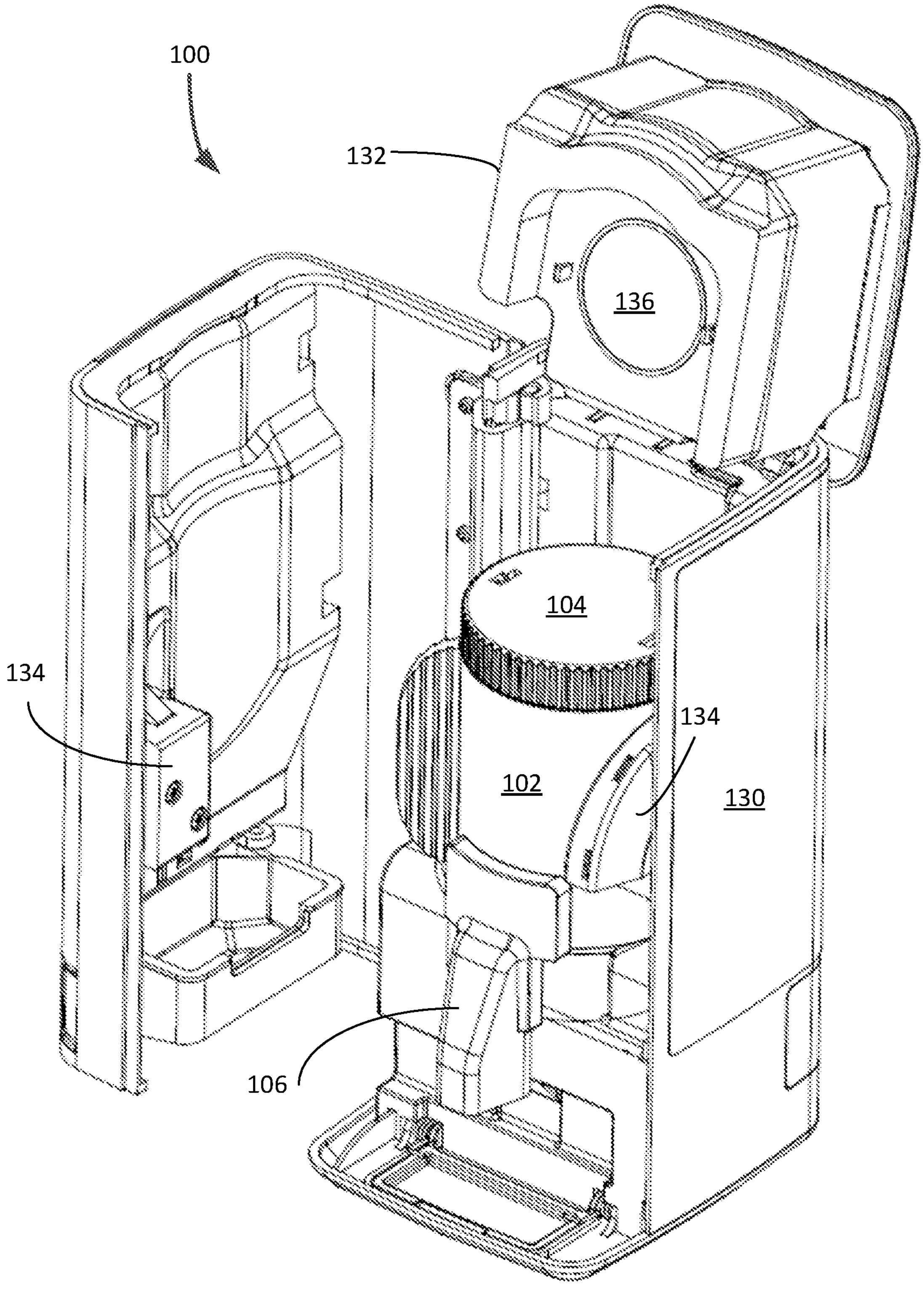
FIG. 1B is an example illustration of a medication dispenser according to an embodiment of the present disclosure.
Figure 1C:
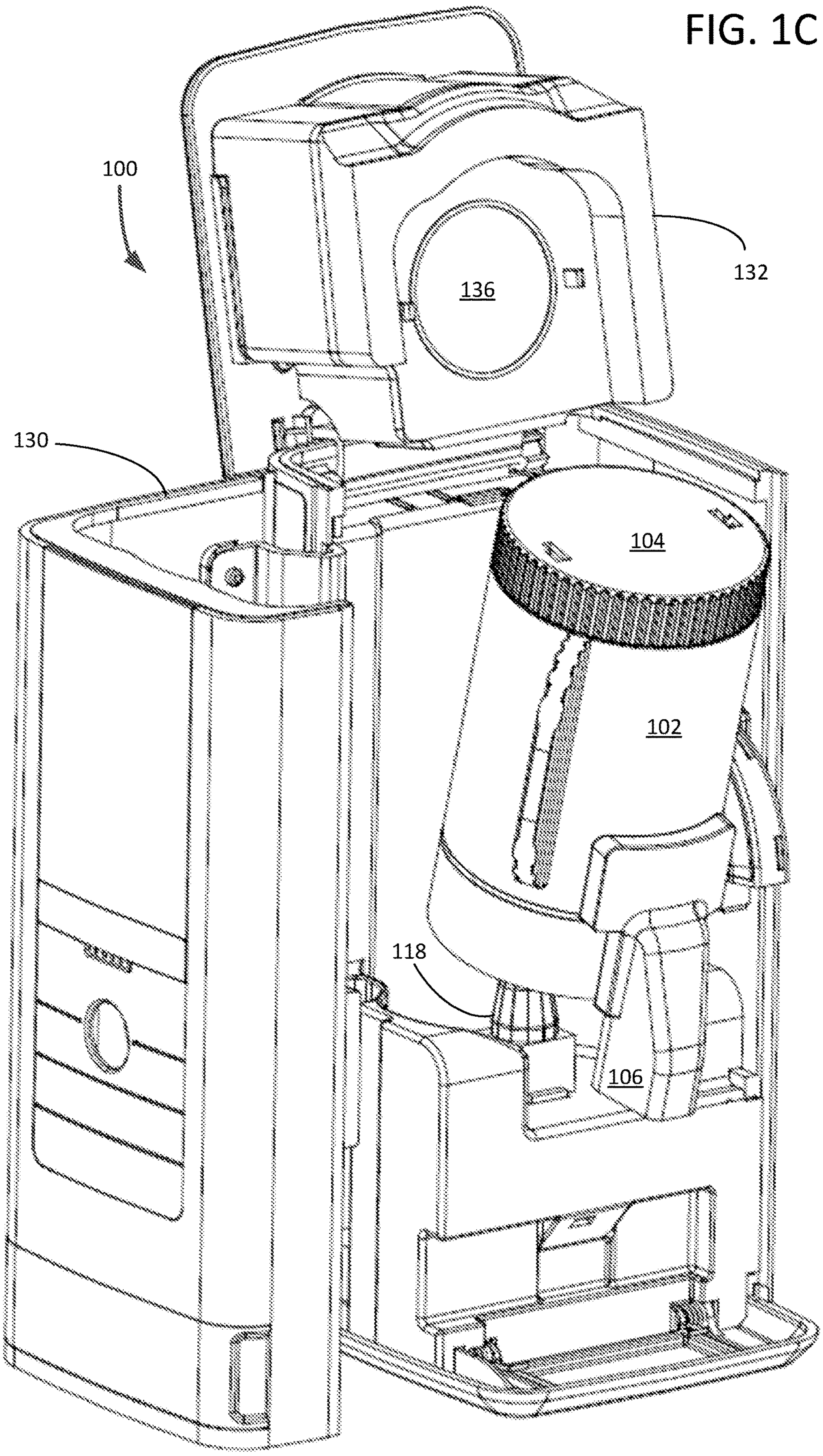
FIG. 1C is an example illustration of a medication dispenser according to an embodiment of the present disclosure.
Figure 1D:
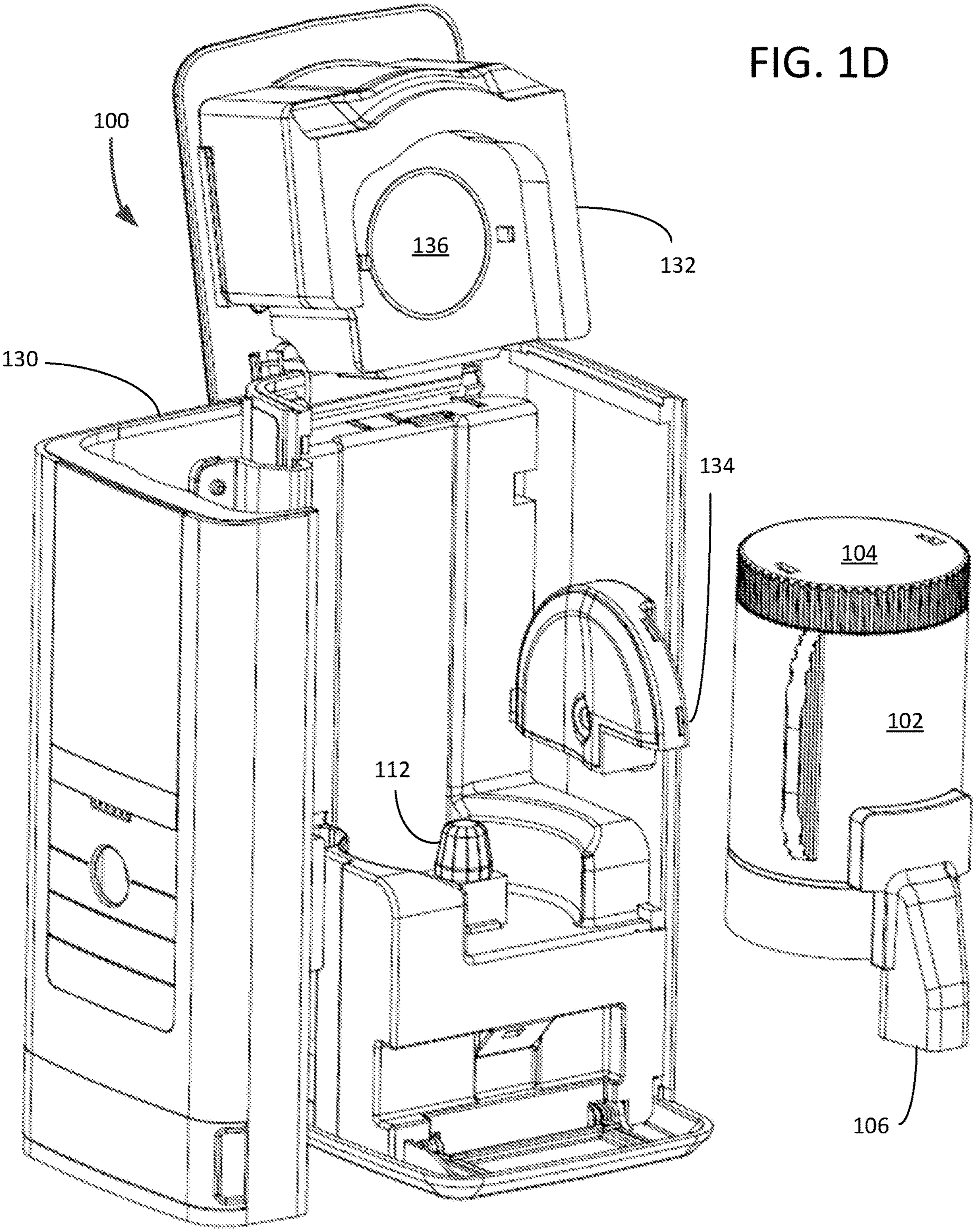
FIG. 1D is an example illustration of a medication dispenser according to an embodiment of the present disclosure.

Described herein are locking medication containers and methods of using said locking medication containers. The container may be provided by a medication provider, such as a pharmacist, physician, or even an automated medication dispenser. The container may contain one or more medications or other medical products. One or more of the medications or other medical products included in the container may be determined by the health care provider according to a travel destination or the type of medication provided. For example, if the medication is highly addictive and subject to abuse, the medicine may be locked inside the container and the container may contain only the prescribed dosage. The medication container may be unlocked by the patient only after approval from the pharmacist or physician. For example, the pharmacist or physician may provide a credential or other form of instruction to the patient that allows the patient to unlock the container and thereby gain access to the medication therein.

In describing embodiments of the present disclosure illustrated in the figures, specific terminology is employed for the sake of clarity. The disclosure, however, is not intended to be limited to the specific terminology so selected, and it is to be understood that each specific element includes all technical equivalents that operate in a similar manner to accomplish a similar purpose.

FIG. 1A, FIG. 1B, FIG. 1C, and FIG. 1D illustrate an exemplary embodiment of medication dispenser 100. Medication dispenser 100 may include housing 130, housing lid 132, locking mechanism 134, and destruction mechanism 136. Housing 130 may be configured to accept a container 102. Container 102 may include a container lid 104 and a chute 106. According to some embodiments, the housing 130 may include one or more tamper resistant elements to frustrate a bad actor that may attempt to cut into the medication dispenser 100. For example, the housing 130 may comprise one or more tungsten rods or wire mesh to increase difficulty associated with cutting into the medication dispenser 100.

According to some embodiments, container 102 may be removed from the medication dispenser 100 (e.g., by a pharmacist) and provided to a patient. For example, if a patient visits a pharmacist for a refill, the pharmacist may remove container 102 from the medication dispenser 100 and provide the container 102 to the patient. The container 102 may include any remaining medication. In order to store the remaining medication, the pharmacist may place cap 104 on the medication dispenser. Moreover, one or more assemblies (e.g., including chute 106) may be removed from the container 102 by the pharmacist. The pharmacist may replace any removed assemblies or otherwise seal any open lower portions of the container with a bottom base (e.g., a bottom lid or cap). The bottom base may snap, screw, or otherwise lock to the container 102. This may allow the pharmacist to utilize any pre-existing labels or markings on the container 102, e.g., by using the container 102 to store any remaining medication.

According to some embodiments, medication dispenser 100 may include one or more short-term (e.g., single-use, disposable, replaceable, and/or refillable components) and one or more long-term components (e.g., multi-use, non-disposable, and/or durable components). The long-term components (e.g., housing 130, housing lid 132, locking mechanism 134, and destruction mechanism 136) may remain with a patient throughout multiple prescriptions and the short-term components (e.g., container 102, container lid 104, and chute 106) may be replaced when the patient refills the prescription. Components of the medication dispenser 100 that come into contact with medication (e.g., pills or capsules) may comprise short-term components of the medication dispenser 100 and components that do not come into contact with the medication may comprise long-term components. In an example, a patient may be provided with the medication dispenser 100 in a state that the medication container does not include the short-term or single-use components. Alternatively, the patient may already have a medication dispenser 100 (e.g., where there is no longer medication stored within the medication container). The pharmacist may provide the patient with a prescription stored in short-term components of the medication dispenser 100. A pharmacist may provide a patient (e.g., in-person, via mail, etc.) with a prescription stored in one or more short-term. The patient may replace the previously used short-term components of the medication dispenser 100 with the new short-term components provided by the pharmacist. In another example, a medication dispenser 100 used by a first patient may be recycled or reused by a second patient after the short-term components of the medication dispenser 100 are replaced.

According to some embodiments, the housing lid 132 may be movably attached to housing 130 (e.g., hinged). Housing lid 132 may be configured to enclose an upper portion of container 102 (e.g., container lid 104) and/or an upper portion of housing 130. Moreover, housing lid 132 may comprise one or more tamper resistant mechanisms, for example, destruction mechanism 136. In some embodiments, housing lid 132 may form a seal against an upper surface of container 102. For example, destruction mechanism 136 may expel a foaming agent into the container 102. Moreover, destruction mechanism 136 may destroy the medication based on an expiration of the medication. According to some aspects, the medication dispenser 100 may not dispense medication based on an expiration date associated with the medication.

One or more portions of housing 130 may be configured to enclose the container 102. Moreover, one or more portions of housing 130 may be configured to enclose one or more portions of housing lid 132 such that housing lid 132 may not be opened when housing 130 is shut on closed housing lid 132 (e.g., or vice versa).

Medication dispenser 100 may comprise a motor 112. The motor 112 may be configured to interface with the container 102. For example, the container 102 may comprise a cavity sized to accommodate an extension of motor 112.

Locking mechanism 134 may secure the housing 130 in a closed configuration so that the medication dispenser 100, housing lid 132, and/or housing 130 are secured in a closed position. According to some embodiments, locking mechanism 134 may comprise a first member and a second member. At least one of the first member and the second member may be configured to lock or latch to the other.

Moreover, the locking mechanism 134 may include a solenoid, e.g., to engage a latch. For example, the solenoid may lock the locking mechanism 134 in a closed position.

There may be a plurality of different embodiments of the medication dispenser 100. For example, a medication dispenser 100 may be suitable for dispensing medication having a classification of narcotics. In order to satisfy regulations and/or promote safety, the medication dispenser 100 may include one or more of security features (e.g., a lock, fingerprint reader, etc.) and/or tamper-resistant features (e.g., a destruction mechanism). Moreover, internal movement of medication (e.g., dropping of medication from container 102) may be detected by a sensor of the medication dispenser 100. Moreover, collection of the medication (e.g., by a user) may be detected by a sensor of the medication dispenser 100.

The medication dispenser 100 may include a data connection (e.g., a SIM card, GSM chip, Bluetooth interface, etc.). According to some embodiments, the medication dispenser 100 may be programmed, reprogrammed, or initialized (e.g., by a manufacturer, pharmacist, and/or user) by utilizing one or more of the data connections.

Figure 1E:
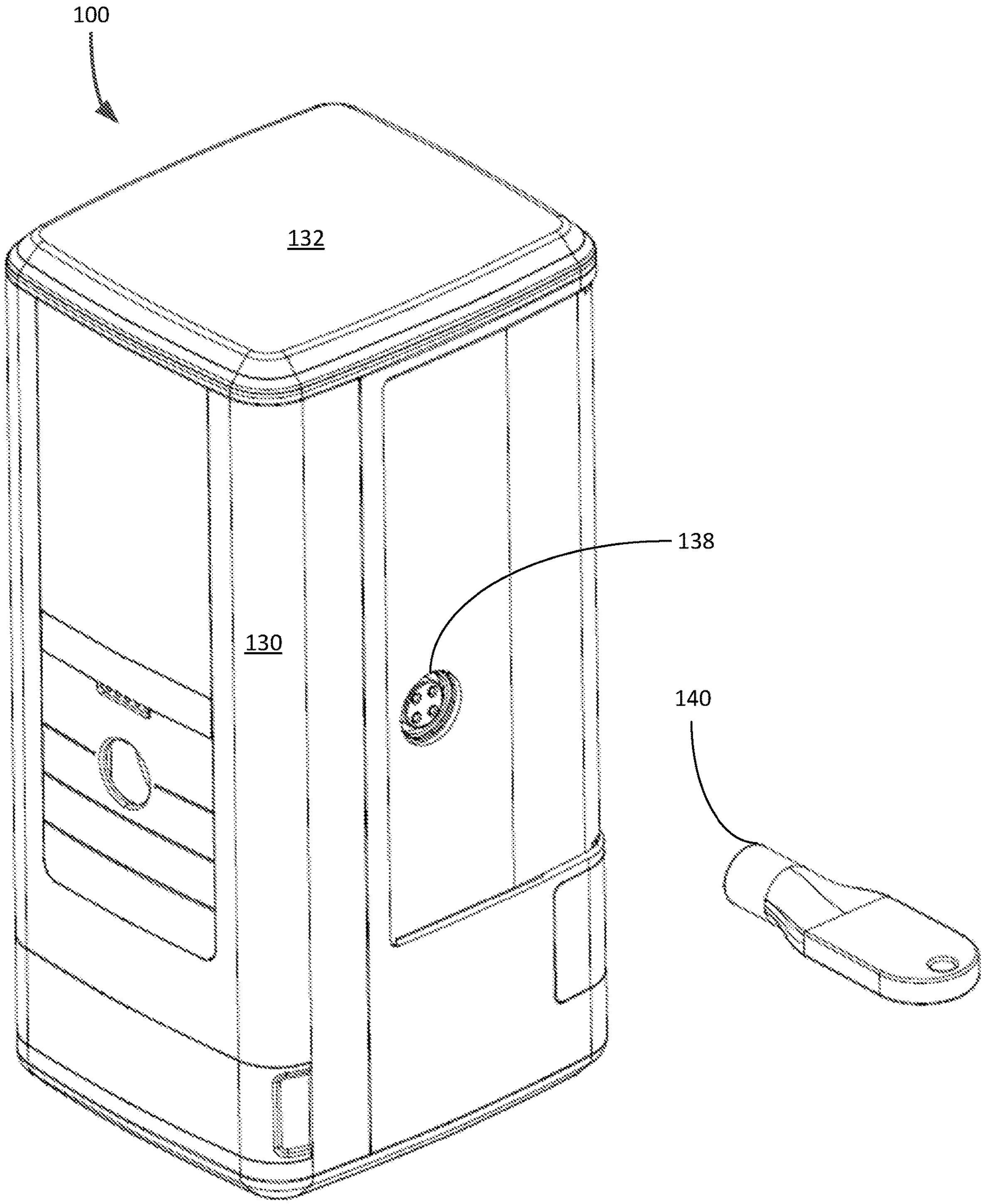
FIG. 1E is an example illustration of a medication dispenser according to an embodiment of the present disclosure.
Figure 1F:
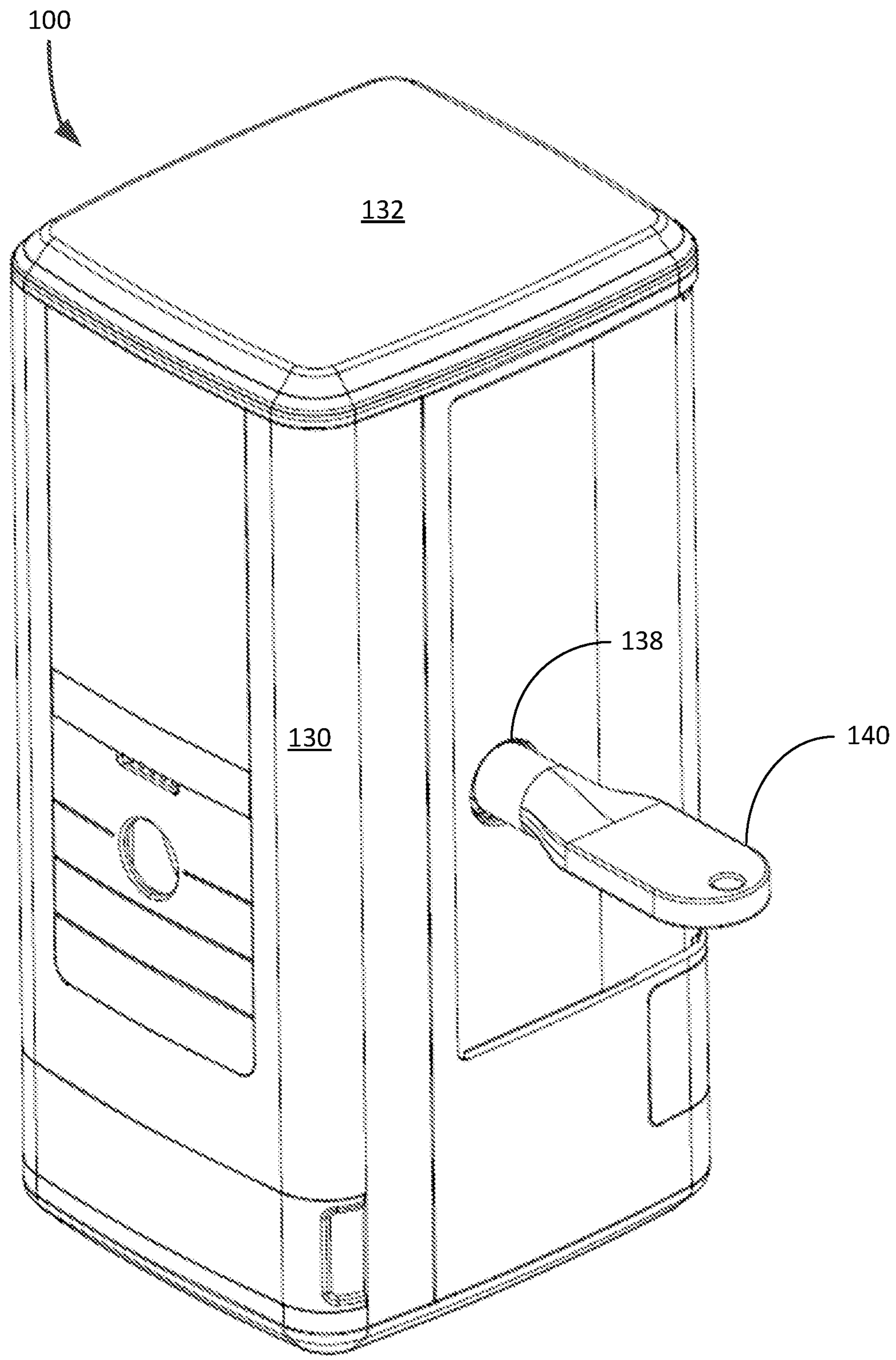
FIG. 1F is an example illustration of a medication dispenser according to an embodiment of the present disclosure.

As illustrated in FIG. 1E and FIG. 1F, according to some embodiments, the medication dispenser 100 may include a lock 138 that may be unlocked from the outside of the medication dispenser 100 (e.g., by a key 140). For example, lock 138 may mechanically engage with locking mechanism 134. The lock 138 may be accessible from the outside of medication dispenser 100 and may include a keyhole through housing 130.

Figure 1H:
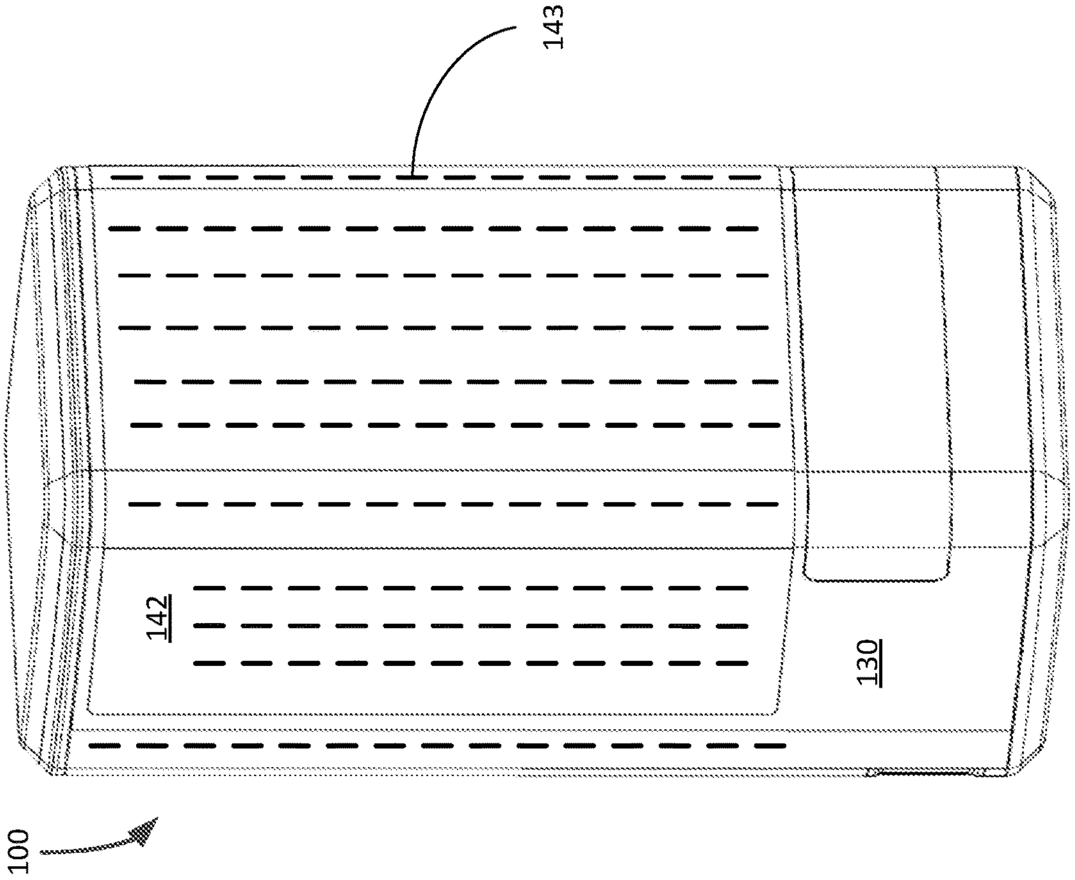
FIG. 1H is an example illustration of a medication dispenser according to an embodiment of the present disclosure.
Figure 1G:
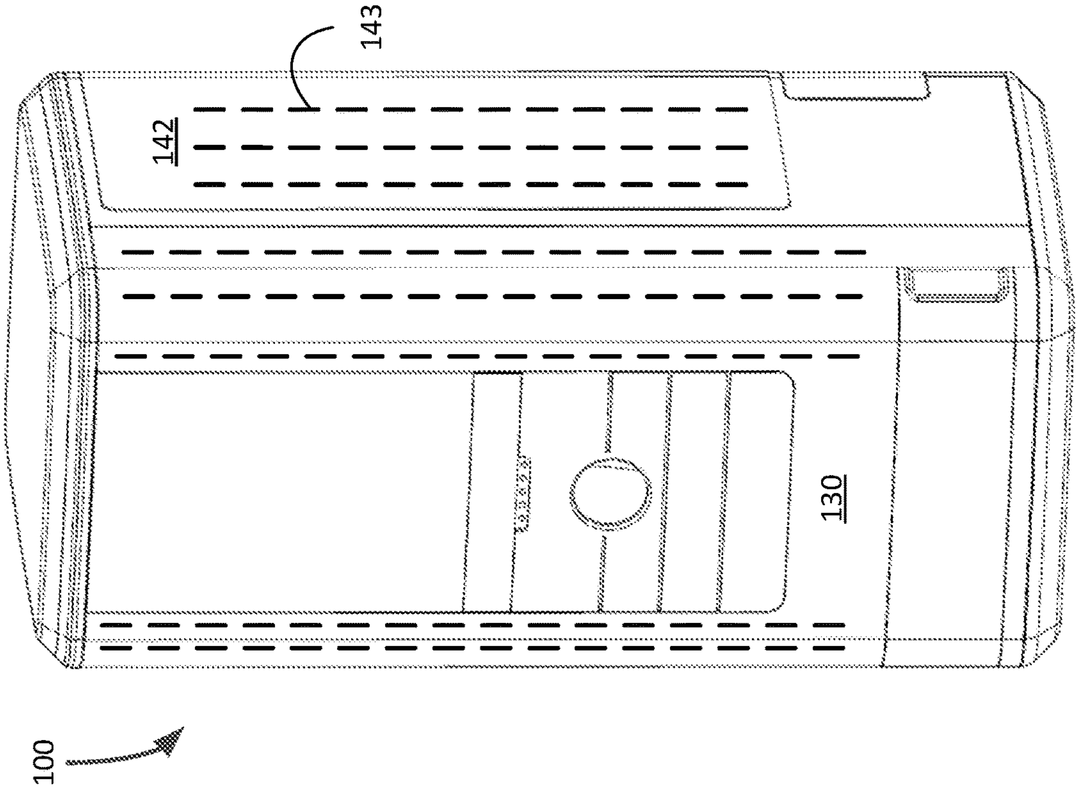
FIG. 1G is an example illustration of a medication dispenser according to an embodiment of the present disclosure.

Key 140 may be configured to engage with lock 138. Key 140 and/or lock 138 may utilize one or more of mechanical, electrical, and/or wireless communication interfaces. For example, a pharmacist may use the key 140 to open the medication dispenser 100 (e.g. when a battery of medication dispenser 100 is depleted and the solenoid associated with locking mechanism 134 cannot be operated). As another example, using key 140 to unlock lock 138 may disable any tamper resistant mechanisms (e.g., by mechanically disabling destruction mechanism 136). As illustrated in FIG. 1G and FIG. 1H, according to some embodiments, a tamper resistant sticker 142 may be placed over lock 138, e.g., to provide a visual indication that lock 138 has been tampered with. According to some aspects, a tamper-resistant cover may be placed over lock 138. For example, the cover may have one or more one-way tabs that are configured to break off when the cover is removed. Moreover, the medication dispenser 100 may include a cover for attaching a medication label to the medication dispenser (e.g., a label holder cover). The cover may be removable and replaceable, thereby allowing a dispenser to be reused. The cover for attaching a medication label may have a series of holes defined therethrough such that when a corresponding component that has a series of pins which aligns with the series of holes, the series of pins will go through the label into the series of holes, thereby rendering the label unreadable. While the cover may be any size, in an embodiment, the cover may be a constant size regardless of the size of the dispenser.

According to some embodiments, the medication dispenser 100 may include one or more electrical components 143 (e.g., wires, printed circuit boards, etc.). For example, the one or more electrical components 143 may be adhesively attached to the tamper resistant sticker 142 and/or may be affixed or embedded to the housing 130 of medication dispenser 100. The medical dispenser 100 may use the one or more electrical components 143 to determine if housing 130 and/or another component of the medical dispenser 100 has been breached. For example, the medical dispenser 100 may apply a voltage or current to the electrical components 143 to determine if a wire (e.g., embedded within a housing of the medical dispenser 100) has been broken.

According to some embodiments, the medication dispenser 100 may include a battery compartment (e.g., a battery carriage tray). The battery compartment may be secured to the medication dispenser 100 by one or more fasteners. Moreover, the battery compartment tray may be sealed or may include one or more raised sides to prevent any chemicals (e.g., battery acid leaking from a battery) from damaging the medication dispenser 100. In order to prevent tampering with any batteries and/or the battery compartment, the one or more fasteners may be accessed only by unlocking the device. For example, one or more internal fasteners may secure the battery compartment to the medication dispenser 100. Moreover, the one or more electrical components 143 may be attached to the battery compartment in order to detect if the battery compartment has been breached or otherwise tampered with. According to some aspects, the battery compartment may hold one or more rechargeable batteries and the one or more rechargeable batteries may be electrically connected to a charging interface (e.g., wired or wireless).

Figure 1I:
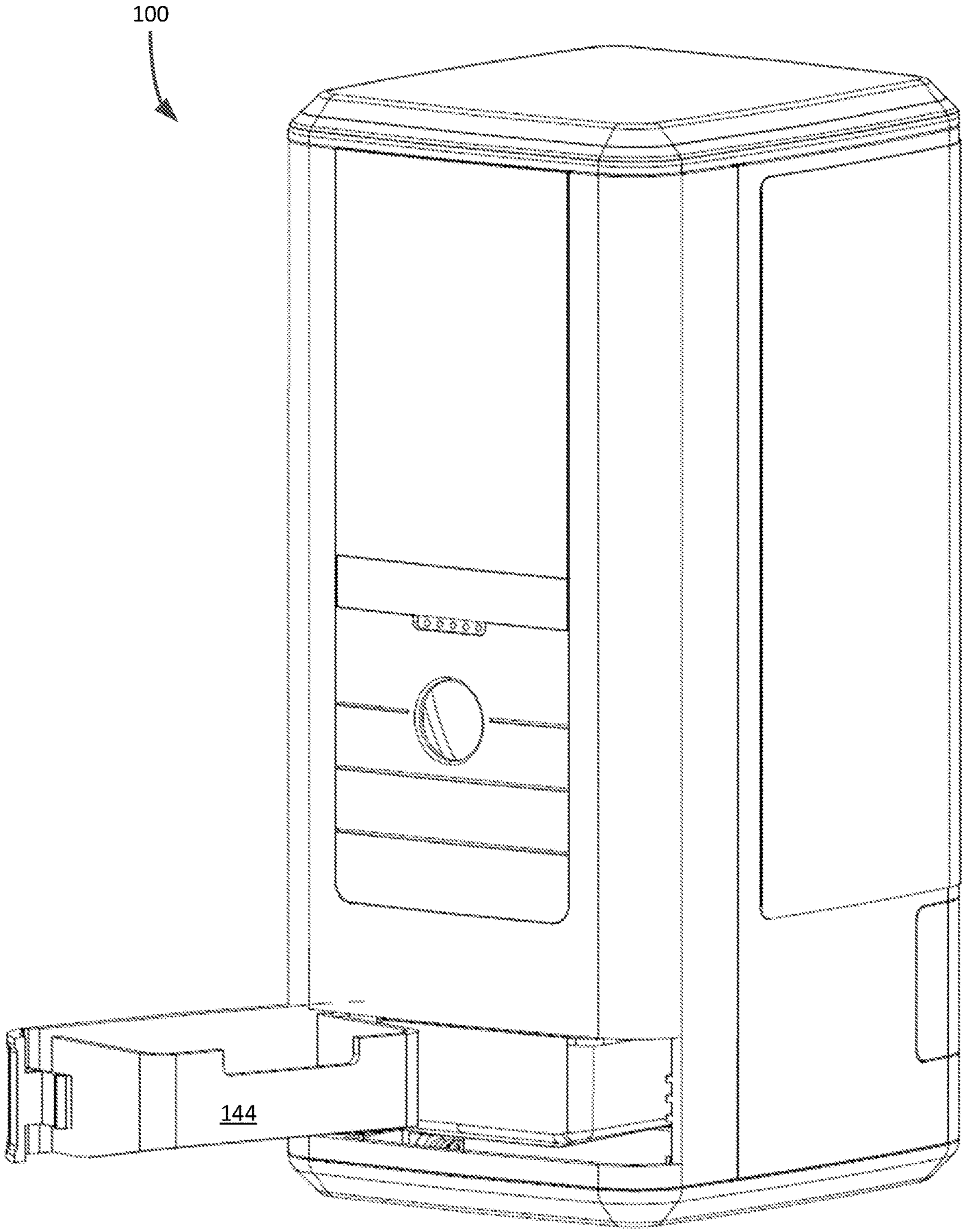
FIG. 1I is an example illustration of a medication dispenser according to an embodiment of the present disclosure.
Figure 1J:
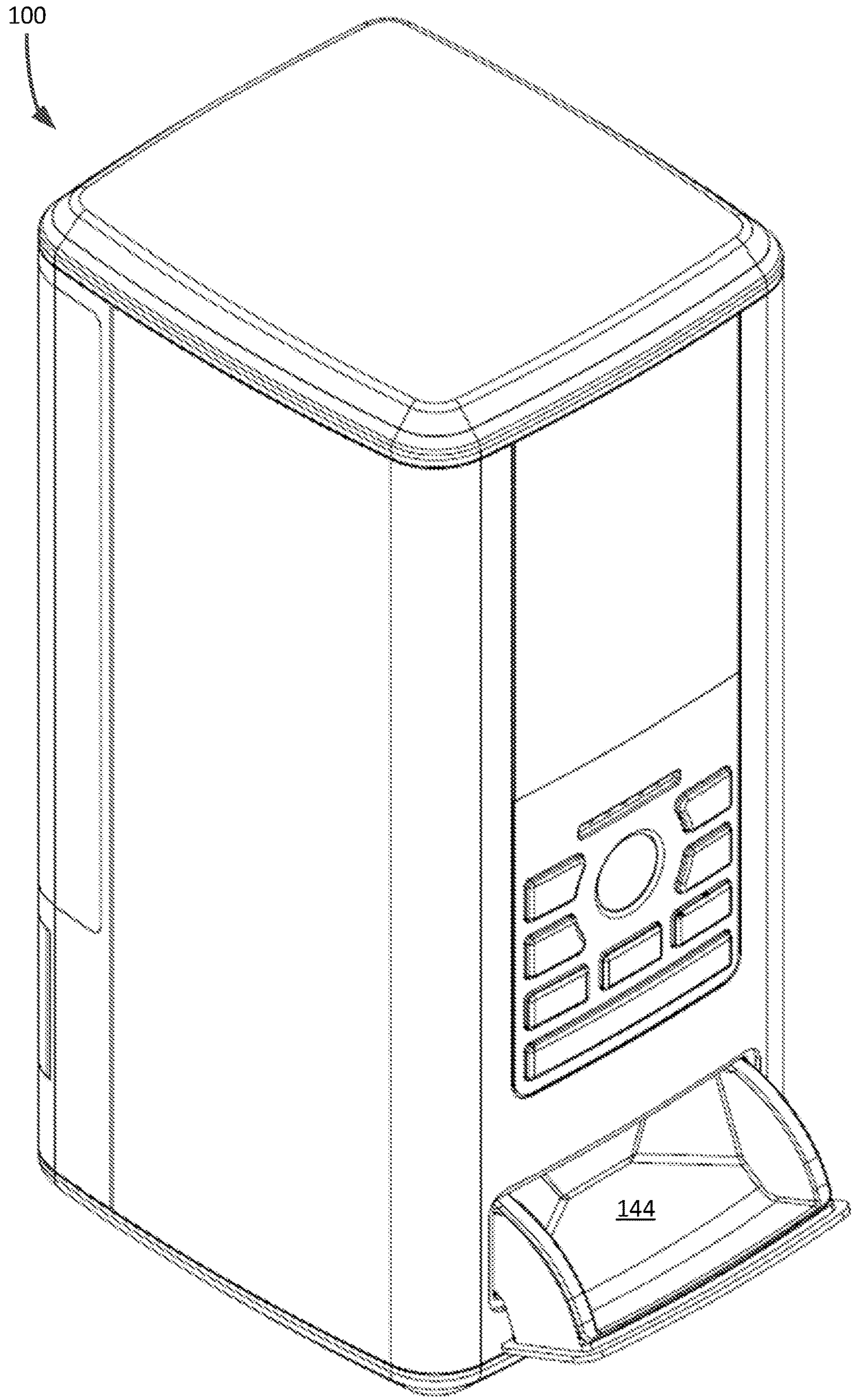
FIG. 1J is an example illustration of a medication dispenser according to an embodiment of the present disclosure.
Figure 1K:
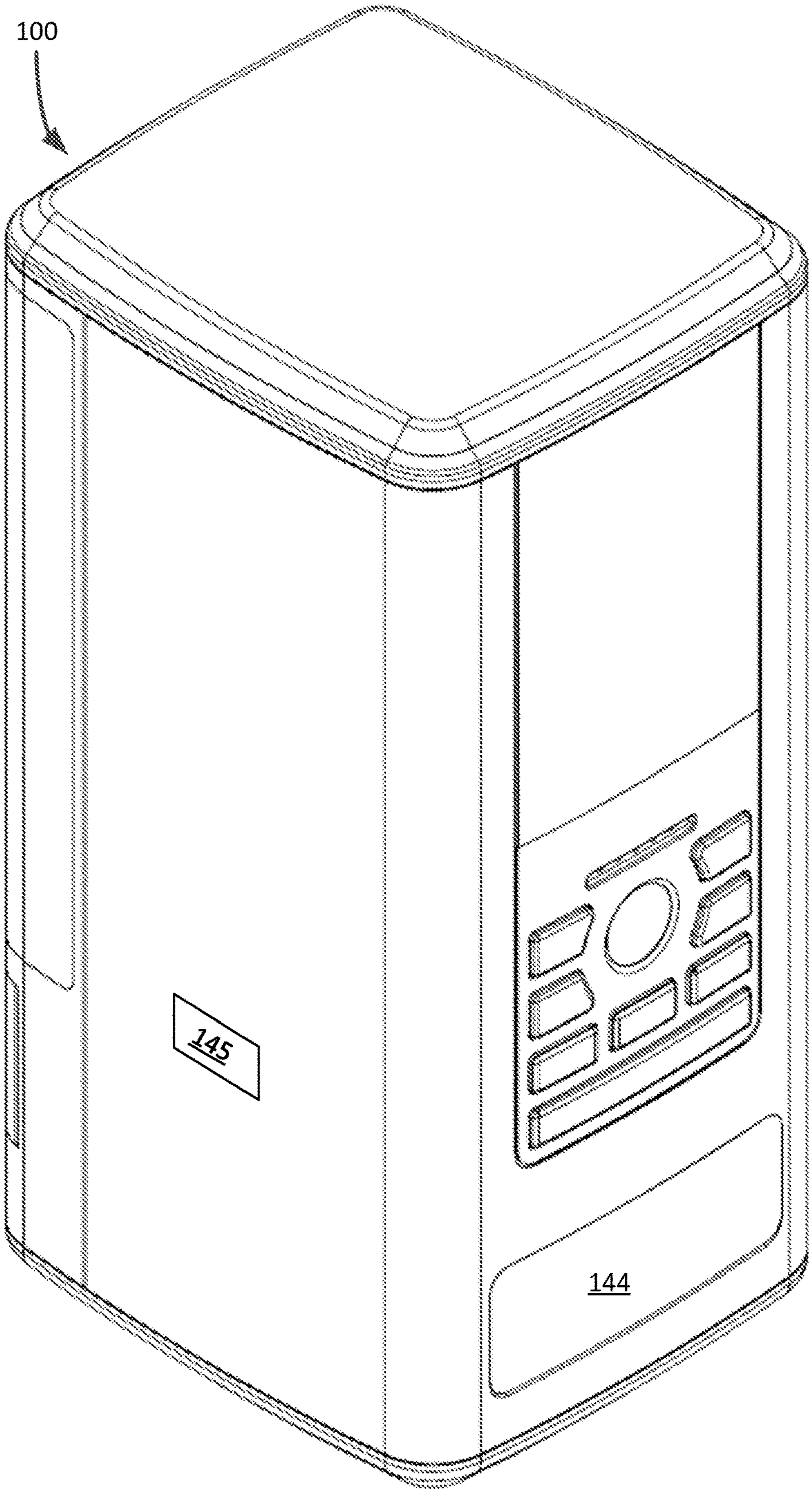
FIG. 1K is an example illustration of a medication dispenser according to an embodiment of the present disclosure.

As illustrated in FIG. 1I, FIG. 1J, and FIG. 1K, according to some embodiments, the medication dispenser 100 may include an access panel 144 (e.g., located on a lower front side of the medication dispenser 100) for accessing dispensed medication. For example, the access panel 144 may include a swing open door (e.g., as illustrated in FIG. 1I) or a flip-open door (e.g., as illustrated in FIG. 1J). According to some embodiments, the access panel 144 may include one or more childproof mechanisms. For example, opening the access panel 144 may require one or more steps and/or exerting physical pressure on a plurality of portions of access panel 144.

In some embodiments, the medication dispenser 100 may dispense medication into a tray (e.g., without a door or cover for the access panel). For example, the access panel 144 may include a bypass flap may be engaged to direct dispensed medication into an external tray. Moreover, one or more ramps may direct medication dispensed from one or more dispensing systems into a single collection tray.

In some embodiments, the medication dispenser 100 may include an inspection window 145 (e.g., a 20 mm by 10 mm molded transparent portion of the housing 130). The inspection window 145 may be adjacent to the chute 106 and/or may facilitate a user viewing medication as it is dispensed. Moreover, the inspection window 145 may facilitate troubleshooting of any issues (e.g., jamming) associated with the medication dispenser 100.

Figure 1L:
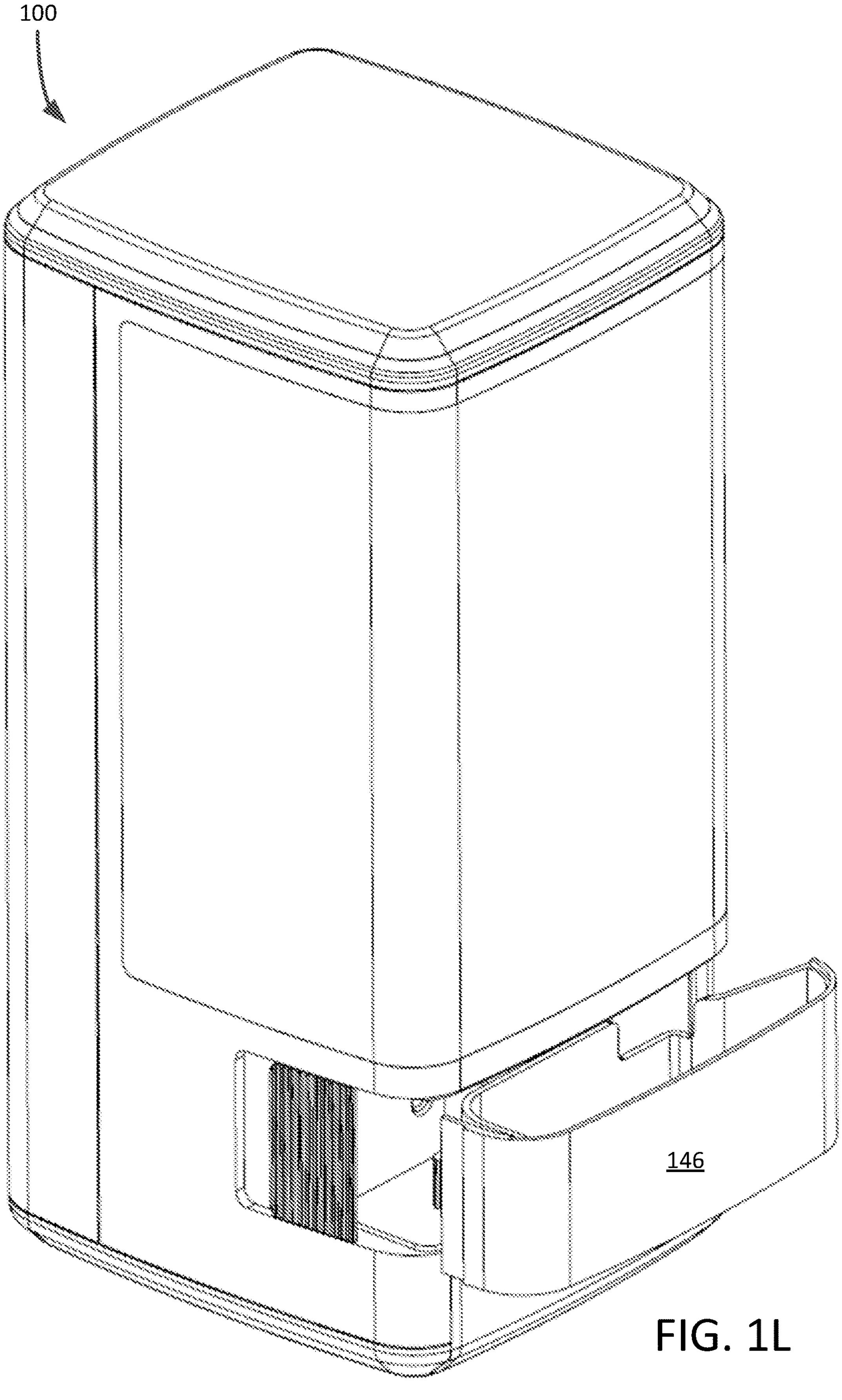
FIG. 1L is an example illustration of a medication dispenser according to an embodiment of the present disclosure.
Figure 1M:
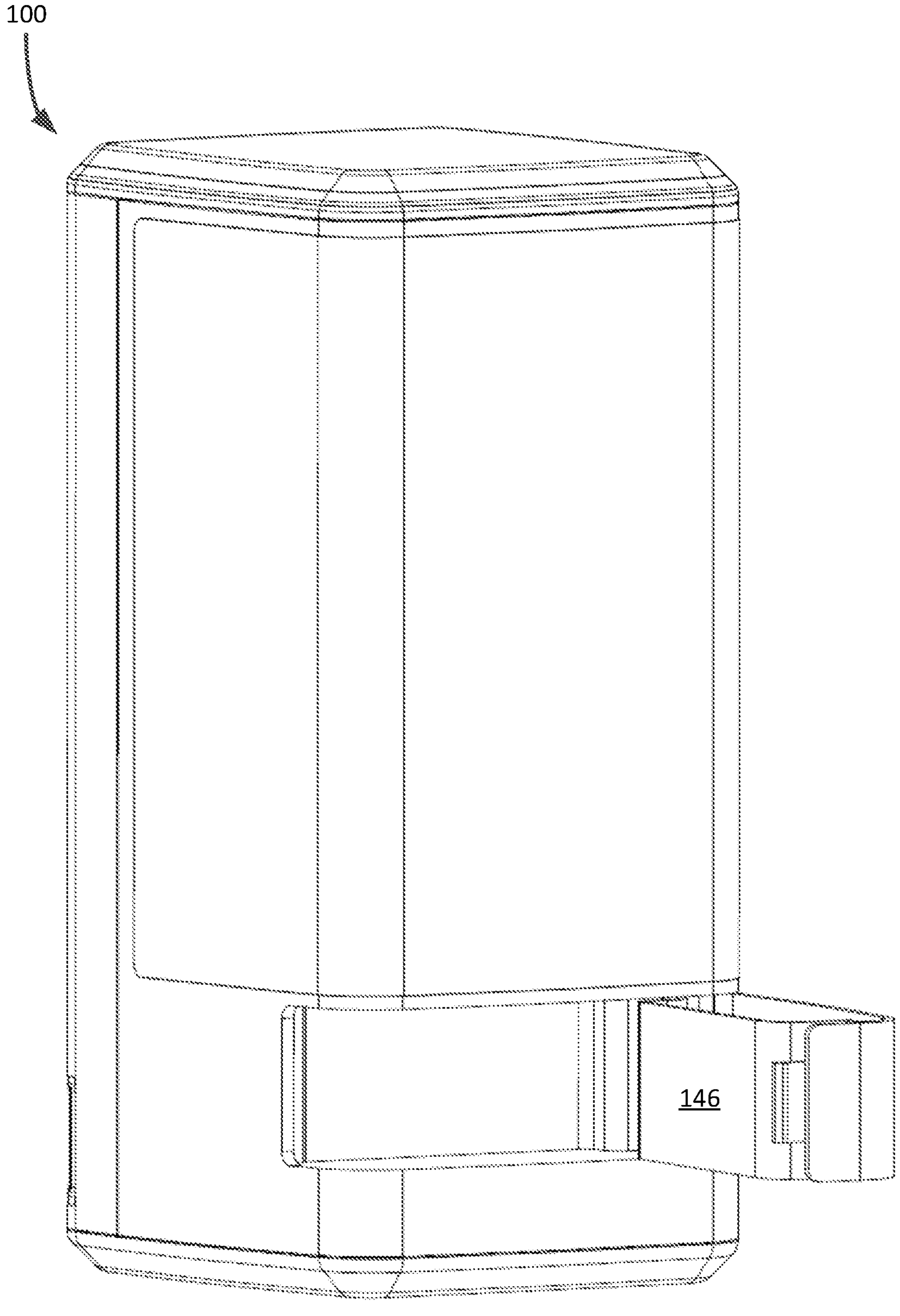
FIG. 1M is an example illustration of a medication dispenser according to an embodiment of the present disclosure.
Figure 1N:
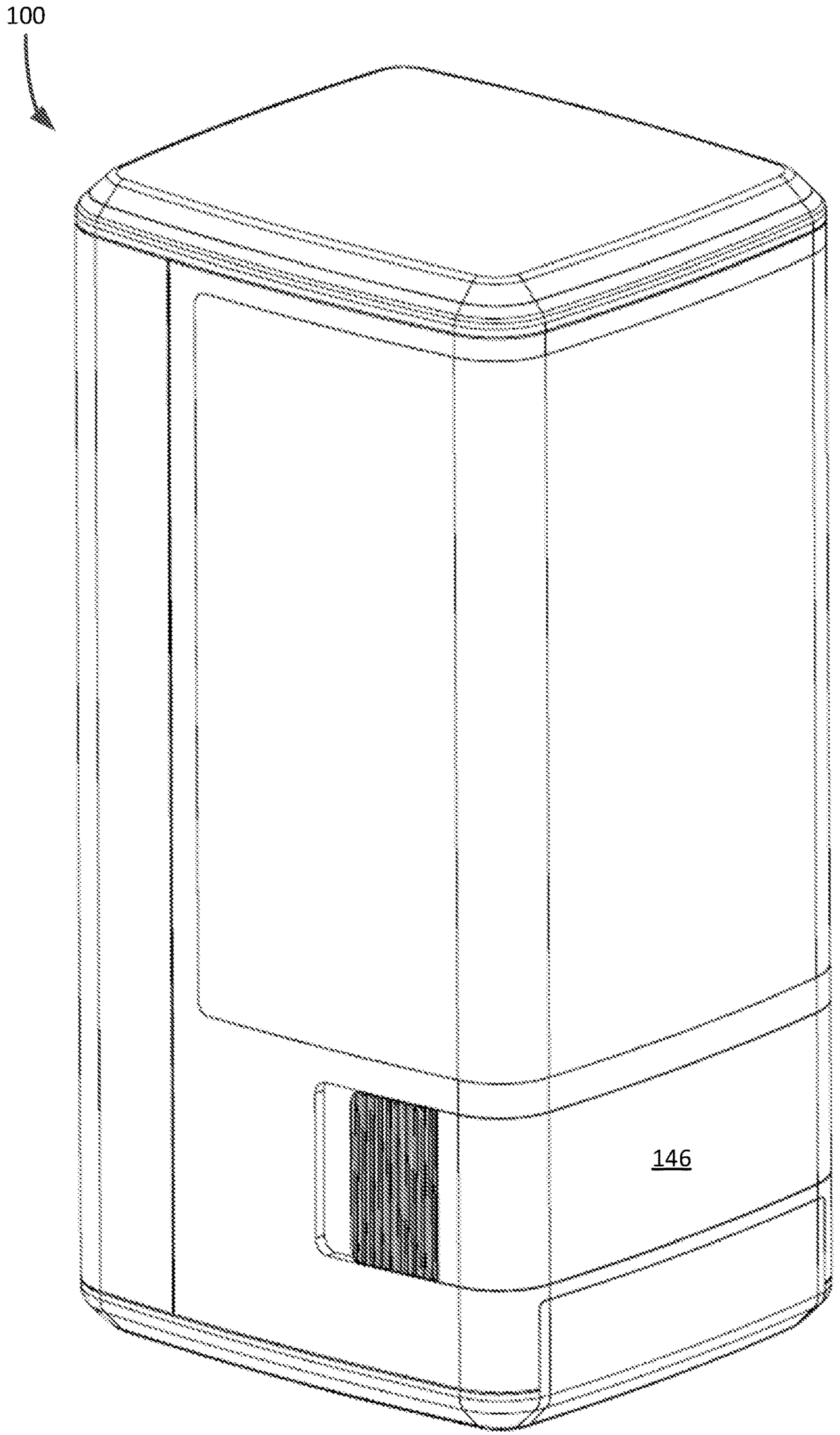
FIG. 1N is an example illustration of a medication dispenser according to an embodiment of the present disclosure.
Figure 10:
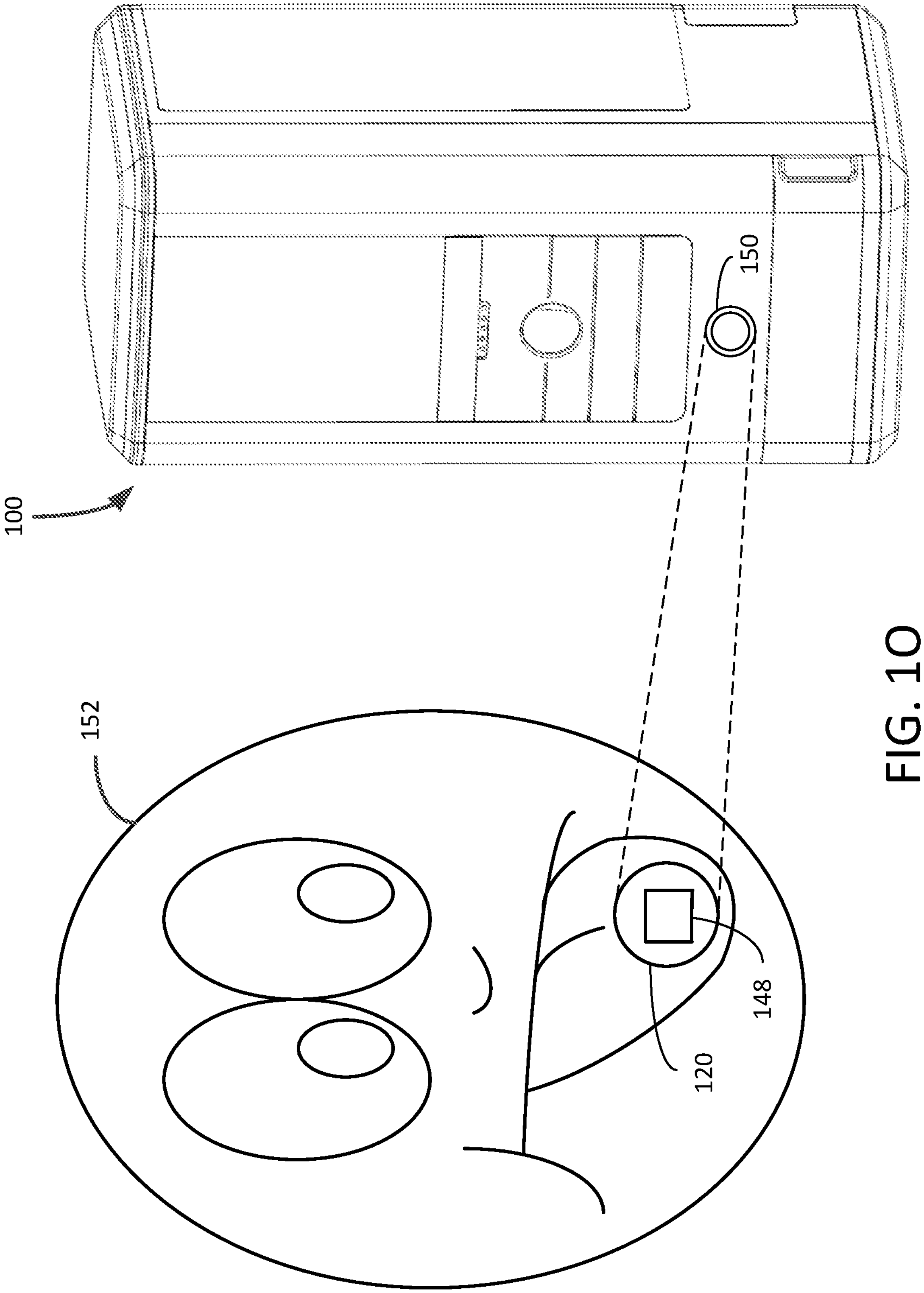

As illustrated in FIG. 1L, FIG. 1M, and FIG. 1N, according to some embodiments, the medication dispenser 100 may include an emergency access panel 146 (e.g., located or lower rear side of the medication dispenser 100) for accessing emergency medication. For example, the emergency access panel 146 may include a swing open door (e.g., as illustrated in FIG. 1L) or a flip-open door (e.g., as illustrated in FIG. 1M). The emergency access panel 146 may be covered by a barrier. For example, a tamper-resistant sticker may hide or disguise the emergency access panel 146 and/or show that the emergency access panel 146 has been opened. For example, a patient may be instructed (e.g., by a pharmacist) to access the emergency access panel 146 if the medication dispenser 100 fails to properly dispense medication. According to some aspects, the emergency access panel 146 may provide access to an emergency pill storage container (e.g., a disposable medication container for storing emergency medication). For example, the emergency pill container may be a hinged container that is removable from the medication dispenser 100.

As illustrated in FIG. 1O, according to some embodiments, medication 120 may be marked with an identification marker 148. For example, the identification marker 148 may be unique to a specific medication or may be unique to a particular pill or capsule (e.g., serialized). Moreover, the identification marker 148 may be a barcode, a two-dimensional barcode, a symbol, a color or sequence of colors, text, a serial number, or any other identifier of medication 120. The medication dispenser 100 may include a camera 150. A user 152 of the medication dispenser 100 may display the medication 120 to the camera 150 after the medication 120 is dispensed by the medication dispenser 100. The camera 150 may identify the medication 120 based on the identification marker 148. For example, the user 152 may place the medication 120 on their tongue and the medication dispenser 100 may capture a photo or video of the user 152 and/or the medication 120. The medication dispenser 100 may identify the medication 120 by using a lookup database to correlate the identification marker 148 to a particular medication or type of medication. Moreover, the medication dispenser 100 may store the photo and/or any other information associated with the identified medication (e.g., date, time, user, medication type, identifier, etc.). According to some embodiments, identification of the medication 120 based on the identification marker 148 may encourage the user 152 to take the medication 120 at the appropriate time and/or document that the user 152 took the appropriate medication at the appropriate time.

According to some embodiments, the dispensing mechanism may be shipped to user 152 (e.g., via mail or a package delivery service) with the medication 120 stored inside of the medication dispenser 100. The user 152 may initialize the medication dispenser 100 (e.g., with the assistance of a pharmacist) upon receipt. For example, a pharmacist may guide the user 152 through an initialization process including registering a fingerprint of the user 152. Moreover, refills may be shipped to the user 152, e.g., so that the user 152 may reload the medication dispenser 100. The refills may include the container 102. The container 102 may be sealed by a tamper evident seal.

According to some embodiments, the medication dispenser 100 may detect that the tamper evident seal is in place and/or that the container 102 has not been tampered with. For example, the medication (e.g., a narcotic) may be shipped to a user in a container 102 including a tamper evident seal. Moreover, the tamper evident seal may include one or more electrical components (e.g., wires, printed circuit boards, etc.). The medical dispenser 100 may use the one or more electrical components to determine if the tamper evident seal has been breached. For example, the medical dispenser 100 may apply a voltage or current to the container 102 to determine if a wire, embedded within a seal affixed to the container 102, has been broken.

In some aspects, electrical components of the container 102 may include one or more security devices. The medical dispenser 100 may communicate with the one or more security devices of the container 102 to determine if the medication and/or container 102 are authorized for use by the user. For example, the medical dispenser 100 may confirm that a security code or identifier associated with the container 102 is valid.

If the medication dispenser 100 determines the container 102 has been tampered with based on damage to the tamper evident seal, a trust level associated with the user 152 may be decreased. A decreased trust level may result in a reduced availability of refills for the user 152. Moreover, the medication dispenser 100 may be reconfigured (e.g., remotely) based on information associated with the refill (e.g., medication quantity, type, dosage, etc.).

Figure 1P:
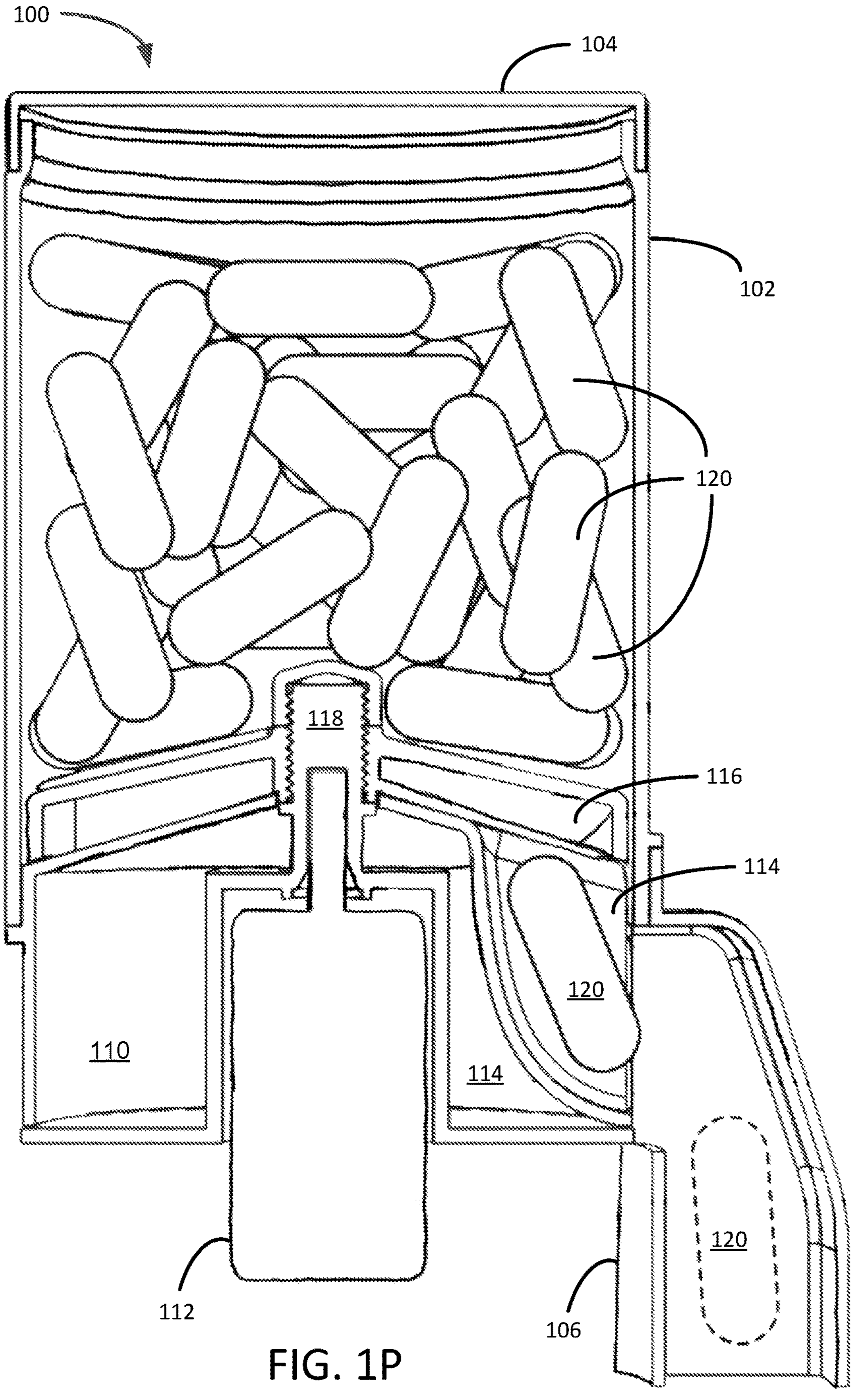
FIG. 1P is an example illustration of a section view of a medication dispenser according to an embodiment of the present disclosure.
Figure 1R:
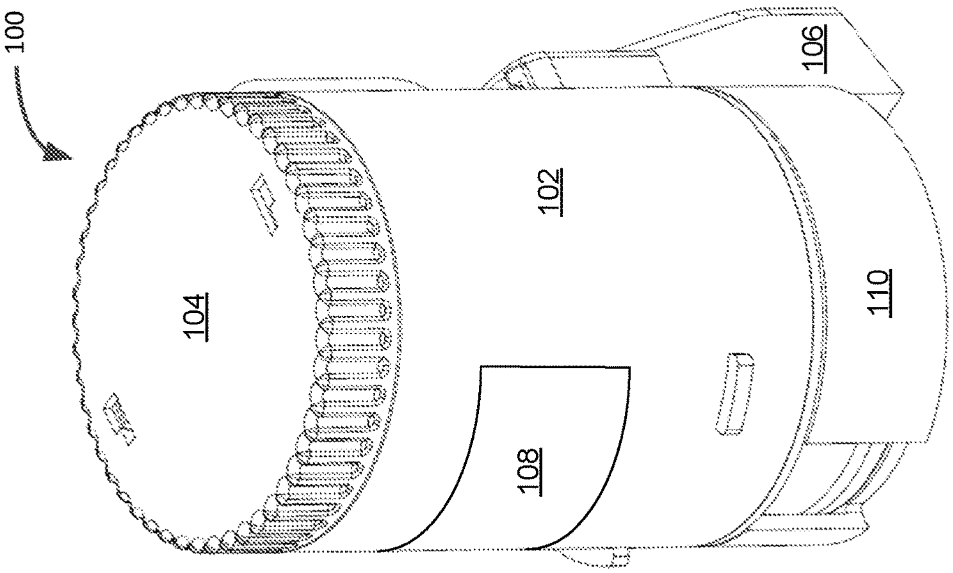
FIG. 1R is an example illustration of a medication container according to an embodiment of the present disclosure.
Figure 1Q:
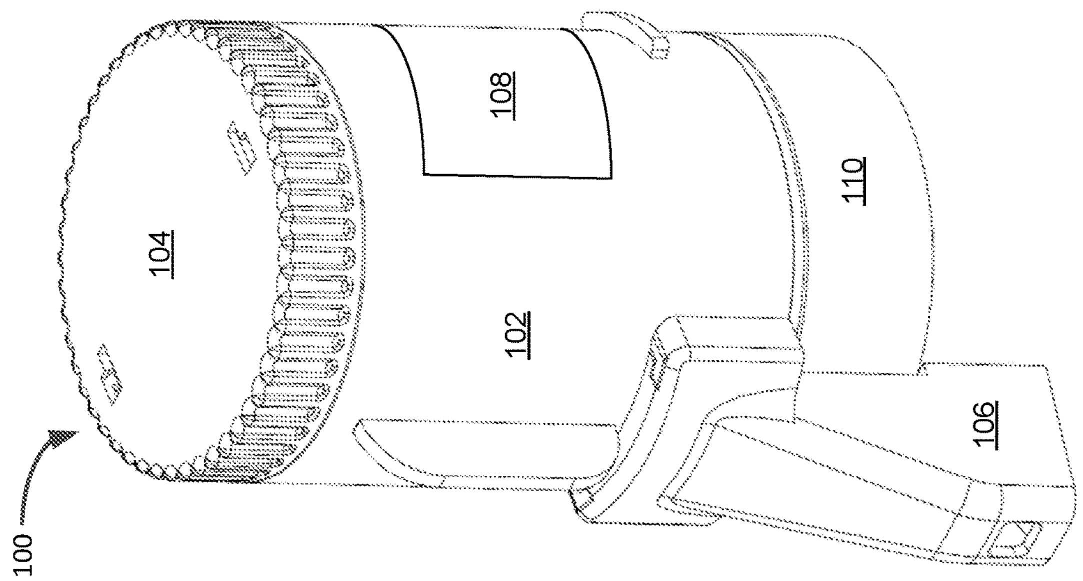
FIG. 1Q is an example illustration of a medication container according to an embodiment of the present disclosure.
Figure 1S:
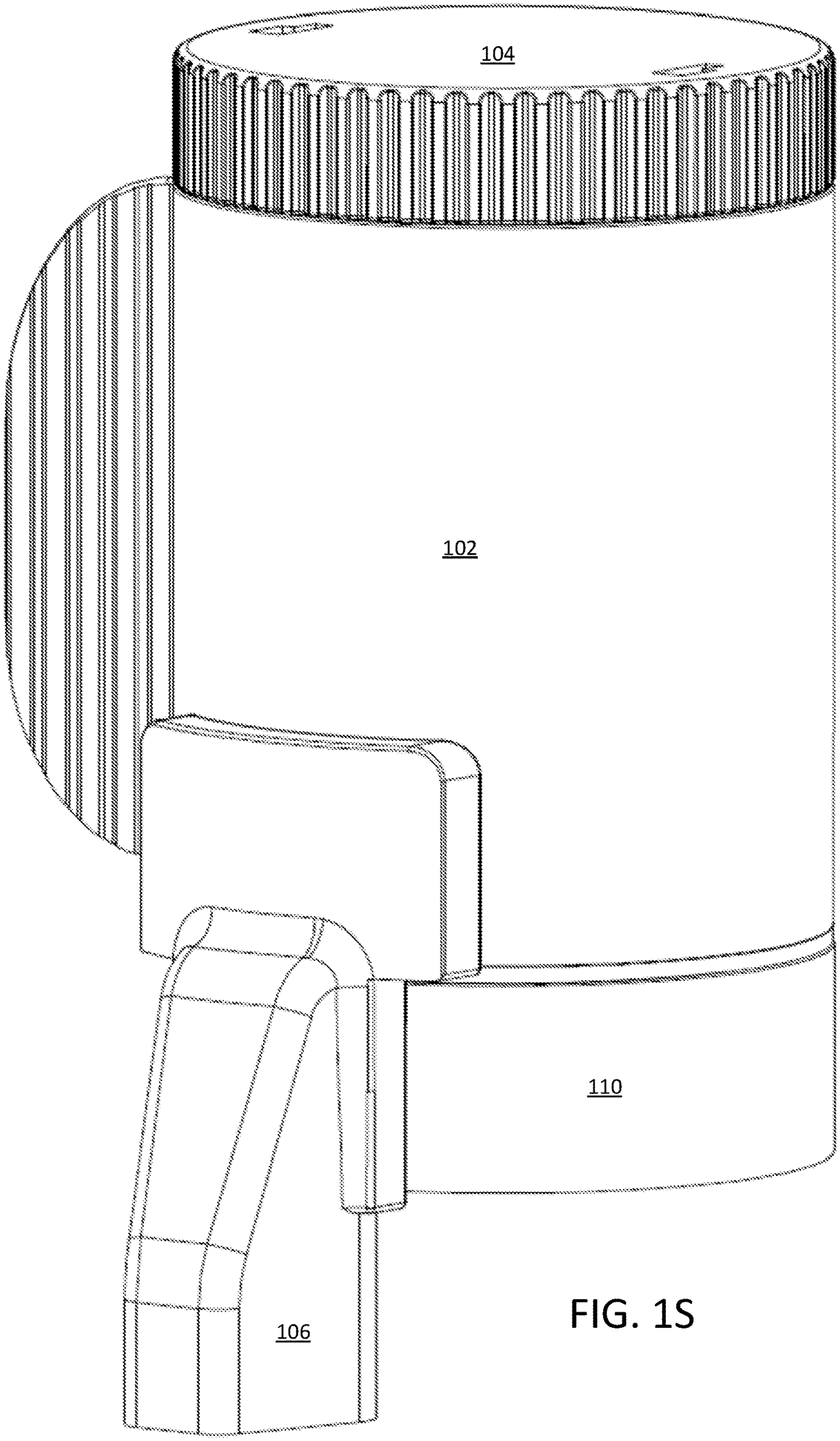
FIG. 1S is an example illustration of a medication container according to an embodiment of the present disclosure.

FIG. 1P illustrates a section view of an exemplary embodiment of medication dispenser 100. The medication dispenser 100 includes a motor 112 (e.g., mounted in the center of medication dispenser 100). The motor 112 may be coupled (e.g., directly or indirectly) to one or more portions of ring 110 (e.g., push wing 116 or first portion 129 illustrated in FIG. 1T). According to some embodiments, an output shaft of the motor 112 may be keyed to the ring 110 (e.g., first portion 129) and/or the push wing 116 so that one or more portions of the ring 110 (e.g., first portion 129) and/or the push wing 116 rotate as the output shaft of the motor 112 turns. Moreover, the motor 112 may move one or more portions of the ring 110 (e.g., first portion 129) and/or push wing 116 in a circular motion about an axis of the motor 112. For example, the first portion 129 and/or push wing 116 may be driven directly by the motor 112. The motor 112 may be a direct current motor or a stepper motor. An amperage draw of the motor 112 may be measured and used to control the operation of the motor 112. As the motor moves one or more portions of the ring 110 (e.g., first portion 129) and/or push wing 116 in a circular motion about an axis of the motor 112, the motor 112 may sense an increase in amperage draw due to a blockage and may reverse direction to clear the blockage. For example, one or more pills or capsules may become trapped or blocked as the motor 112 moves the push wing 116. The motor 112 may reverse its direction of rotation to free the obstruction.

The push wing 116 may be secured to the ring 110 (e.g., first portion 129) by a push wing lock 118. In some embodiments, the push wing lock 118 may be integrated into the push wing 116. One or more medication 120 (e.g., tablets or capsules) may be contained within the container 102. A container lid 104 may be removably attached to the container 102.

The push wing 116 may push an individual medication (e.g., medication 120) from the inside of container 102 to a cavity formed on the interior of an adapter 114. The adapter 114 may be sized to fit within a void or recess of a portion of ring 110 (e.g., adapter holder 128 illustrated in FIG. 1T). Moreover, the cavity on the interior of the adapter 114 may be sized based on the particular medication (e.g., medication 120). For example, a large pill or capsule may be associated with an adapter 114 having a similarly large cavity to accommodate the large pill or capsule. Similarly, a small pill or capsule may be associated with an adapter 114 having a similarly small cavity to accommodate the small pill or capsule. One or more dimensions of the medication may be determined based on a name of the medication or a National Drug Code (NDC) number. The one or more dimensions may be used to determine the appropriate adapter 114 and/or adapter holder 128. Moreover, a sizing template including cut-out shapes of different shapes and size of medication (e.g., for matching with a physical medication) may be used to determine the appropriate adapter 114 and/or adapter holder 128. According to some embodiments, the adapter holder 128 and the adapter 114 may be referred to as the "adapter assembly."

As the motor 112 rotates one or more portions of ring 110 (e.g., first portion 129) and/or the push wing 116, the cavity of the adapter 114 may become aligned with the chute 106. When the cavity of the adapter 114 and the chute 106 are aligned, the medication 120 may travel through the chute 106 and may exit the medication dispenser 100.

FIG. 1Q, FIG. 1R, FIG. 1S, FIG. 1T, FIG. 1U, FIG. 1V, FIG. 1W, FIG. 1X, FIG. 1Y, FIG. 1Z, FIG. 1AA, FIG. 1AB, and FIG. 1AC illustrate an exemplary embodiment of medication dispenser 100. Medication dispenser 100 may include a container 102, a container lid 104, a chute 106, a label 108, and a medication dispenser 100. Container 102 may include any housing that can hold and store medication. Container lid 104 may be operably attached to container 102 to secure any medication stored therein. Container lid 104 may be configured to securely attach container lid 104 to container 102. For example, container lid 104 may lock onto container 102 via a locking mechanism including one or more tamper-proof and tamper resistant opening mechanisms (e.g., FIG. 1Q and FIG. 1R).

Medication dispenser 100 may be sized to accommodate a dose of medication (e.g., a single pill or capsule) and may be connected or attached to container 102 and/or medication dispenser 100. Moreover, chute 106 may be sized to accommodate a dose of medication (e.g., a single pill or capsule) and may be connected or attached to container 102 and/or medication dispenser 100.

Label 108 may be made of any suitable material and may be formed as part of any other component of medication dispenser 100 (e.g., container 102, container lid 104, chute 106, and/or label 108). Label 108 may specify one or more of the type, size, or quantity of a medication. Moreover, label 108 may include any regulatory and/or compliance information. Label 108 may include dosage and/or warning information.

One or more of container 102, container lid 104, chute 106, and medication dispenser 100 may be made of a type of material that is lightweight, but durable. Container 102 may need to be light enough to carry, but durable enough so that it would be extremely difficult to break. For example, container 102 may be made of carbon fiber, a metal such as aluminum, a hard plastic such as PVC, and the like. Moreover, one or more components of medication dispenser 100 (e.g., container 102, container lid 104, chute 106, and/or label 108) may be formed (e.g., in combination) as a single unit or component.

Figure 1T:
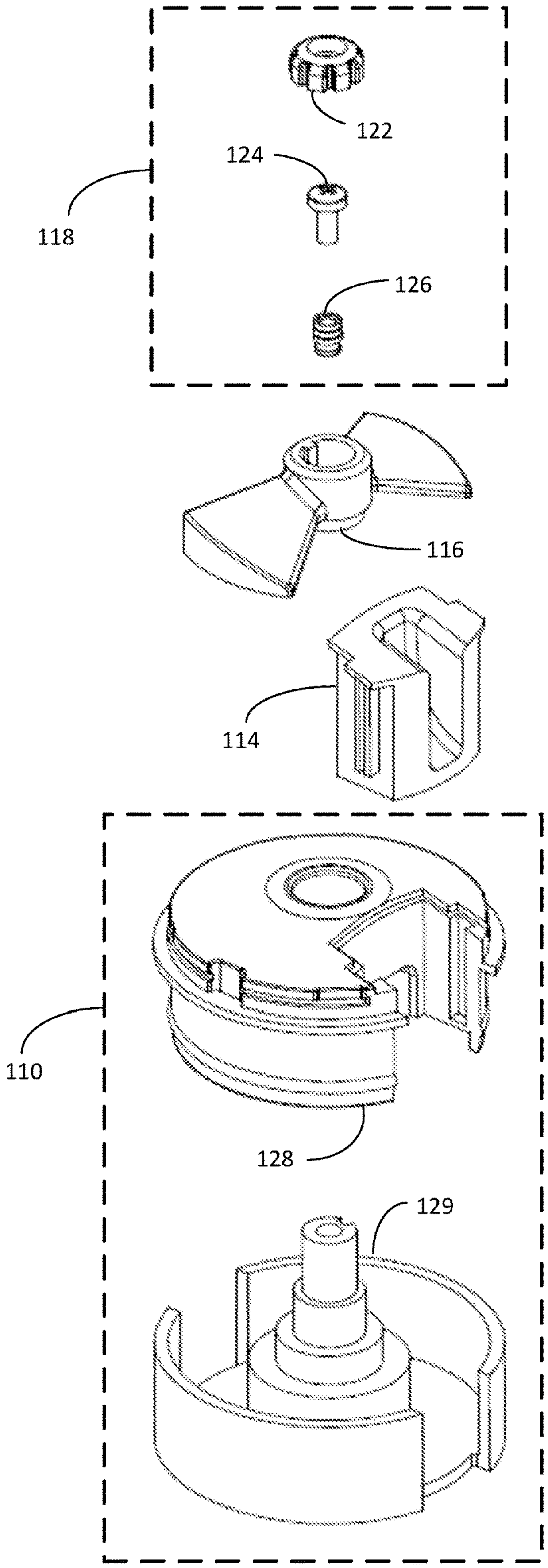
FIG. 1T is an example illustration of components of a medication dispenser according to an embodiment of the present disclosure.
Figure 1U:
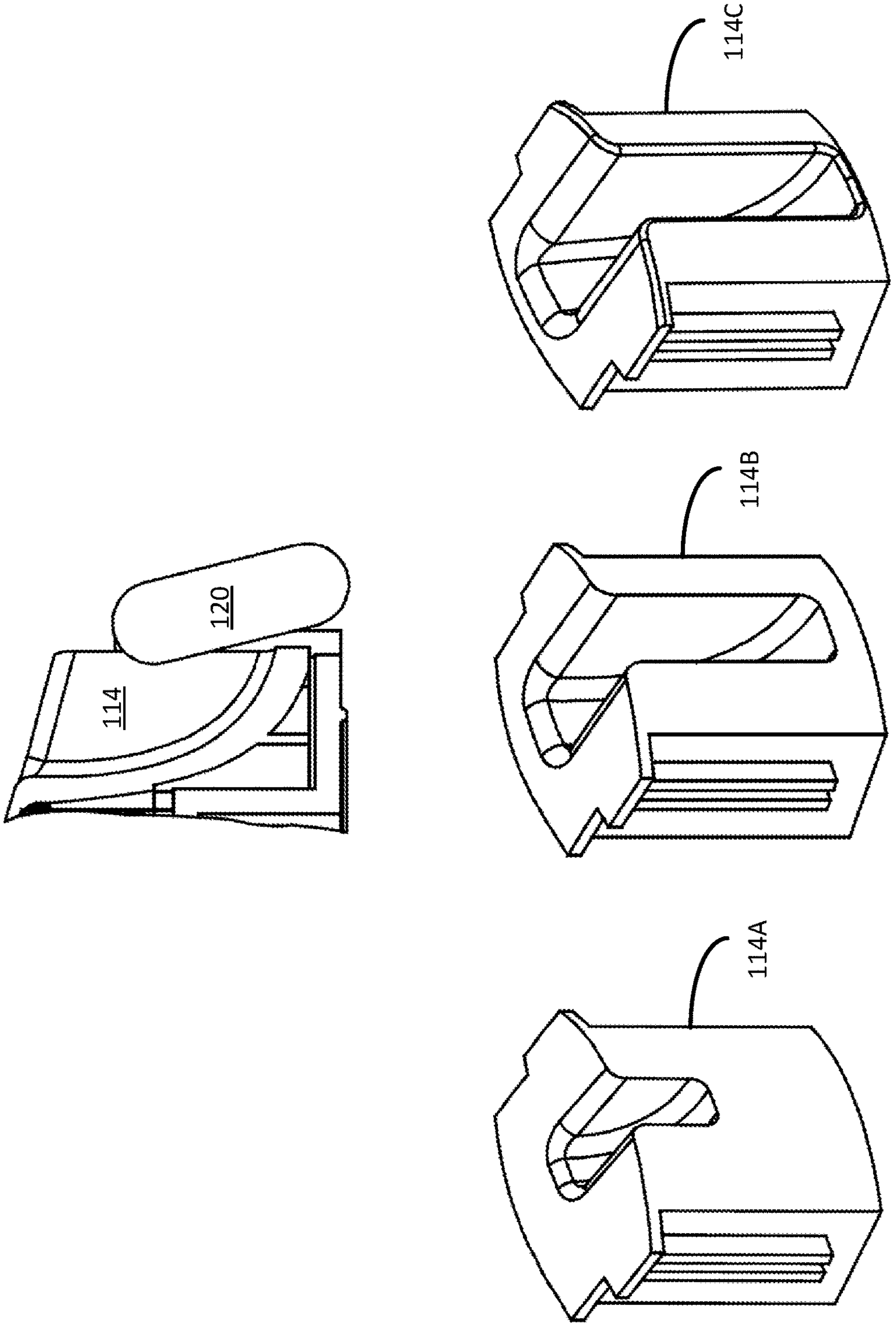
FIG. 1U is an example illustration of adapters according to an embodiment of the present disclosure.

FIG. 1T illustrates a section view of an exemplary embodiment of medication dispenser 100. According to some embodiments, push wing lock 118 may comprise one or more components. The components may include a knob 122 (e.g., keyed or unkeyed), a screw 124, and an insert 126. The knob 122 and/or the insert 126 may be keyed or otherwise configured to mate with the push wing 116. Moreover, the knob 122 and/or the insert 126 may be keyed or otherwise configured to mate with one or more portions of ring 110 (e.g., first portion 129). For example, the push wing 116 may rotate as one or more portions of ring 110 (e.g., first portion 129) turns.

According to some embodiments, the ring 110 may comprise of one or more components. For example, a first portion 129 of the ring 110 may be configured to mate with the push wing 116. Moreover, the first portion 129 of the ring 110 may be keyed to maintain alignment with the push wing 116. The first portion 129 of the ring 110 may include several openings (e.g., two openings) to allow medication 120 to pass through one of the openings, e.g., as the first portion 129 of the ring 110 is rotated and the adapter 114 becomes aligned with one of the openings of the first portion 129 of the ring 110. For example, if the first portion 129 of the ring 110 included two openings, the medication dispenser 100 may dispense one pill or capsule of medication (e.g., medication 120) per a 180-degree rotation of first portion 129, as opposed to a 360-degree rotation for a single opening.

By dispensing the medication 120 in a shorter rotation, motor longevity may be conserved and battery consumption may be reduced (e.g., through reduced motor usage). The push wing 116 may include an arm or section for each of the openings of the first portion 129. For example, if the first portion 129 has three openings, the push wing 116 may include three corresponding members. Moreover, smaller medication 120 may allow the number of openings and corresponding members of the push wing 116 to be increased, e.g., because smaller medication may be agitated more easily by the push wing 116 and/or more likely to properly dispense in a shorter rotation.

The ring 110 may comprise of an adapter holder 128. The adapter holder 128 may be configured to mate with the first portion 129. The adapter holder 128 may include an area or cavity configured to accept the adapter 114. The adapter 114 may be configured to accept a particular type or size of medication 120. The adapter 114 may be selected or changed based on the particular type or size of medication 120.

The push wing 116 may move in one or more patterns (e.g., based on a size or type of medication). According to some embodiments, the push wing 116 may move forward and backwards to increase agitation and/or to increase a likelihood that the medication falls into the adapter. For example, the push wing 116 may move forward 30-degrees and may then move backwards 15-degrees.

Moreover, a direction of rotation of the push wing 116 may be reversed if medication 120 becomes jammed and/or prevents the push wing 116 from moving in a particular direction. For example, an increased amperage draw of the motor may indicate the push wing 116 has become jammed by medication 120 and a specific pattern of movement (e.g., a reversal of rotation of the push wing 116) of the push wing 116 may be implemented.

According to some embodiments, the adapter holder 128 may rotate within the first portion 129. For example, the orientation of the adapter 114 (e.g., fitted to the adapter holder 128) may change with respect to one of the openings of the first portion 129 as the adapter holder 128 is rotated (e.g., about a common axis with the first portion 129). According to other embodiments, the first portion 129 may rotate around the adapter holder 128. For example, the orientation of the adapter 114 (e.g., fitted to the adapter holder 128) may change with respect to one of the openings of the first portion 129 as the first portion 129 is rotated (e.g., about a common axis with the adapter holder 128). An upper surface (e.g., conical) of the adapter holder 128 may comprise a downward slope to direct the medication 120 to the periphery of the medication dispenser 100.

According to some embodiments, the first portion 129 may comprise a side wall that restricts medication 120 from falling to the side of the medication dispenser 100. For example, the side wall may prevent medication 120 from falling into a cavity or recess between container 102 and ring 110.

As illustrated in FIG. 1T, the knob 122 and/or screw 124 may lock the push wing 116 to the first portion 129. In some embodiments, the push wing 116 and the knob 122 may be formed as a single component. The adapter 114 may be fit to the adapter holder 128.

According to some embodiments, the push wing 116 may comprise a sloping front side or top face to agitate the medication 120. Moreover, the push wing 116 may comprise a vertical or nearly vertical front face or leading edge or front face to push the medication 120 (e.g., towards the adapter 114). According to some embodiments, the push wing 116 may comprise a rear face shaped to remove unwanted pills from the cut out of the adapter 114. For example, a second pill or capsule may fall into or become lodged into the adapter 114. A shape of the rear face of the push wing may be optimized to remove or dislodge the second pill or capsule.

In some embodiments, a forward rotation of the push wing 116 may advance the medication 120 forward (e.g., towards the chute 106). A reverse rotation of the push wing 116 may agitate the medication 120. In some embodiments, the push wing 116 may block or obstruct the chute 106 at a point of dispensing the medication 120. This may prevent tampering with the medication at a point of dispensing.

In some embodiments, a rotation of the push wing 116 may be based on a sensed resistance to rotation of the push wing 116. For example, as the push wing 116 rotates, it may sense resistance and may change direction. In this way, the medication dispenser 100 may avoid crushing or damaging the medication 120. For example, the push wing 116 may change direction to allow the medication to become dislodged or unstuck (e.g., by agitating the medication with the top surface of the push wing 116 or dislodging the medication 120 with the rear surface of the push wing 116).

Adapter 114 may comprise a side cut out to dispense (e.g., drop) the medication 120 sideways. The medication dispenser 100 may dispense medication 120 from adapter 114 in a lateral or horizontal direction (e.g., from a vertical side of dispensing mechanism). This is distinguishable from medication dispensers that may dispense medication vertically downward (e.g., from a bottom of a medication dispenser).

The adapter 114 may be changeable to suit the size (shape, thickness, length, etc.) of medication 120. The adapter may be sized to accommodate only a single dose of medication 120 (e.g., a single pill or capsule) and may be replaced to accommodate medication of different sizes. For example, a small pill or capsule may be dispensed by adapter 114A, a medium pill or capsule may be dispensed by adapter 114B, and a large pill or capsule may be dispensed by adapter 114C.

Figure 1W:
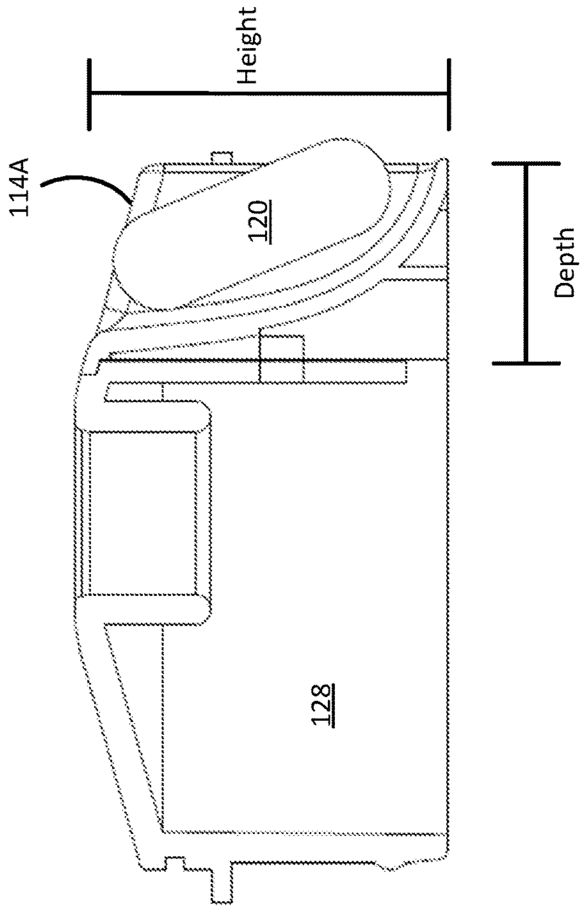
FIG. 1W is an example illustration of components of a medication dispenser according to an embodiment of the present disclosure.
Figure 1V:
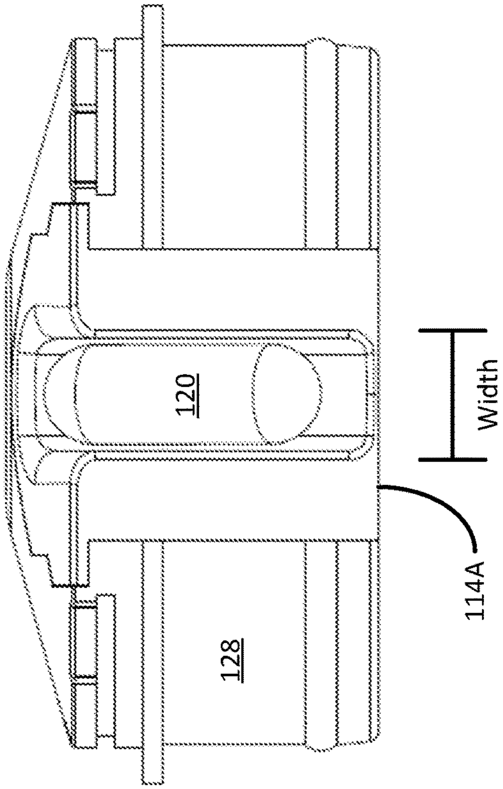
FIG. 1V is an example illustration of components of a medication dispenser according to an embodiment of the present disclosure.

As illustrated in FIG. 1V and FIG. 1W, an adapter 114 may be associated with a particular size, or range of sizes, of medication 120. One or more dimensions (e.g., height, width, depth, etc.) associated with the side cutout of the adapter 114 may be selected in accordance with a particular size of medication 120 (e.g., for accommodating different pill sizes). For example, adapter 114A may associated with a large pill or capsule. Moreover, by installing a modular adapter (e.g., adapter 114) into the adapter holder 128 of the ring 110, different sizes of medication 120 may be accommodated by simply changing the adapter 114.

Figure 1Y:
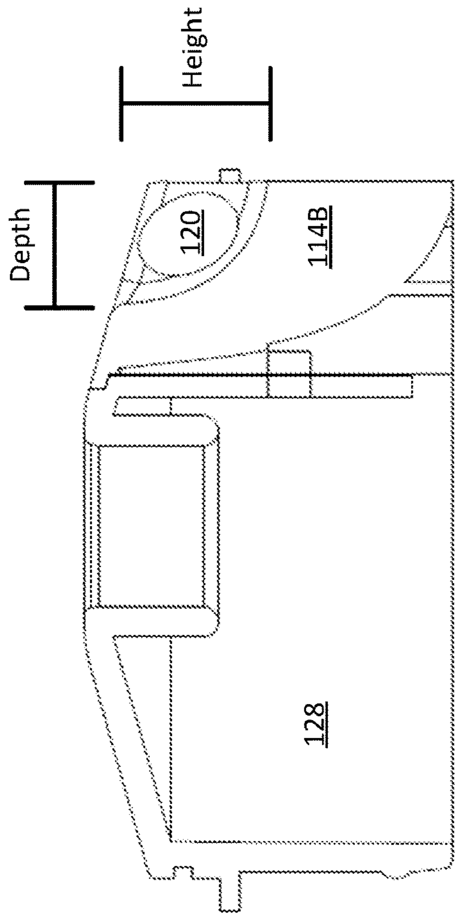
FIG. 1Y is an example illustration of components of a medication dispenser according to an embodiment of the present disclosure.
Figure 1X:
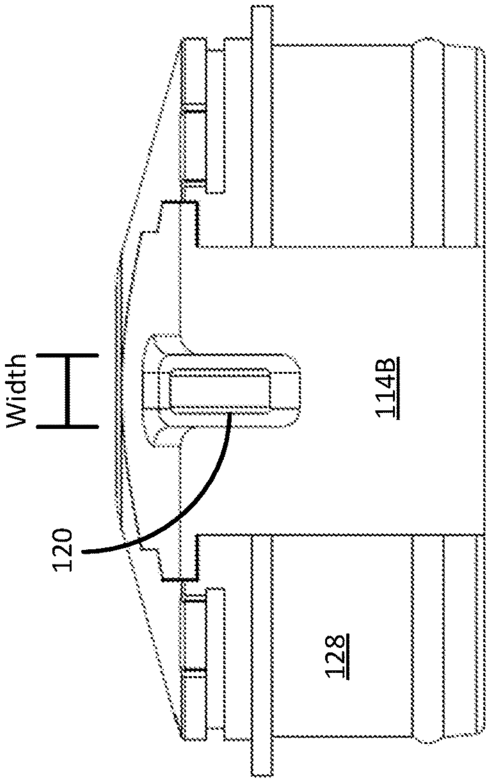
FIG. 1X is an example illustration of components of a medication dispenser according to an embodiment of the present disclosure.
Figure 1A:
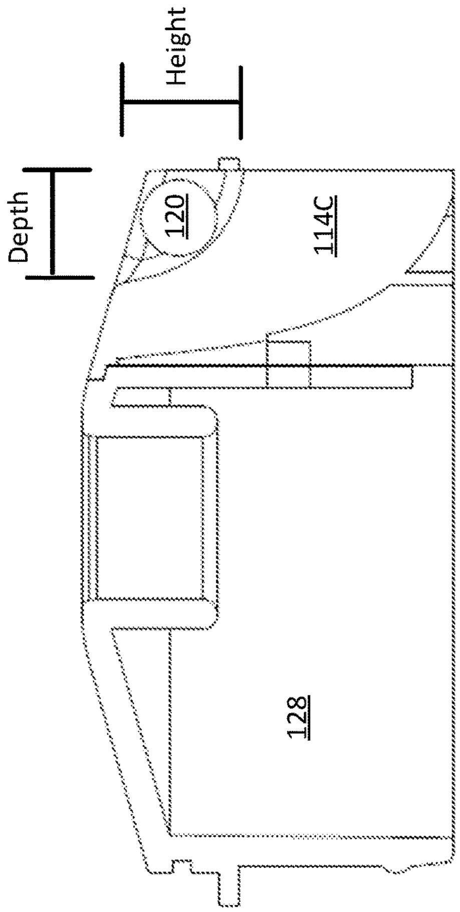

As illustrated in FIG. 1X and FIG. 1Y, an adapter 114 may be associated with a particular size, or range of sizes, of medication 120. One or more dimensions (e.g., height, width, depth, etc.) associated with the side cutout of the adapter 114 may be selected in accordance with a particular size of medication 120 (e.g., for accommodating different pill sizes). For example, adapter 114B may associated with a medium pill or capsule. Moreover, by installing a modular adapter (e.g., adapter 114) into the adapter holder 128 of the ring 110, different sizes of medication 120 may be accommodated by simply changing the adapter 114.

Figure 1Z:
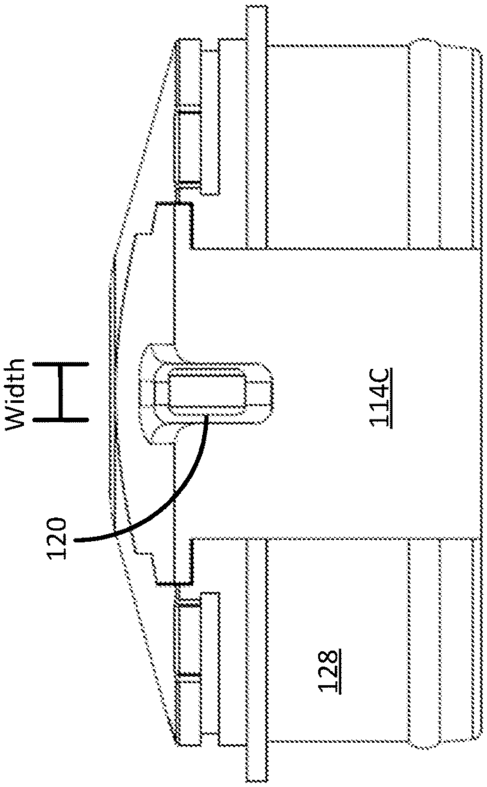
FIG. 1Z is an example illustration of components of a medication dispenser according to an embodiment of the present disclosure.
Figure 1A:
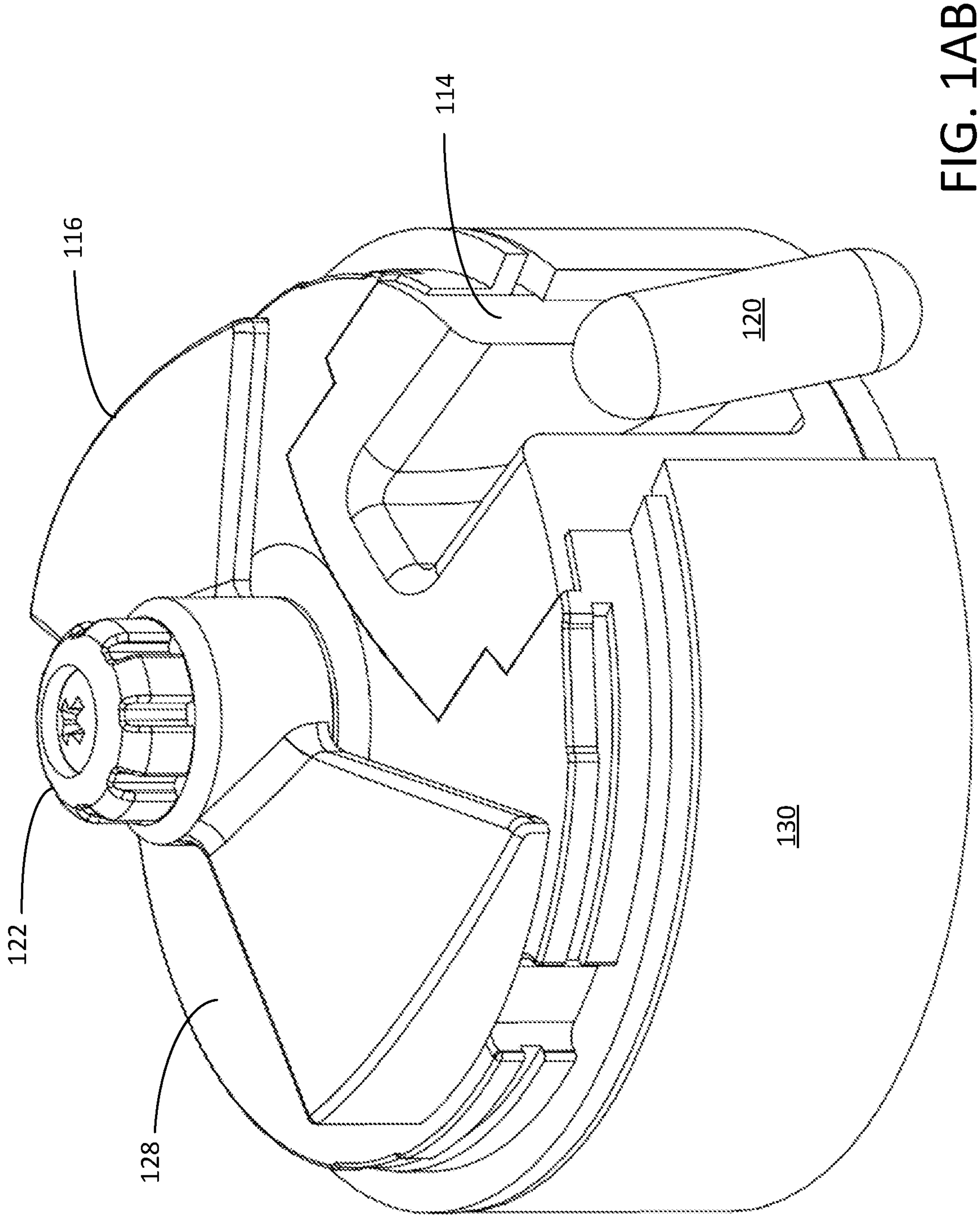
Figure 1A:
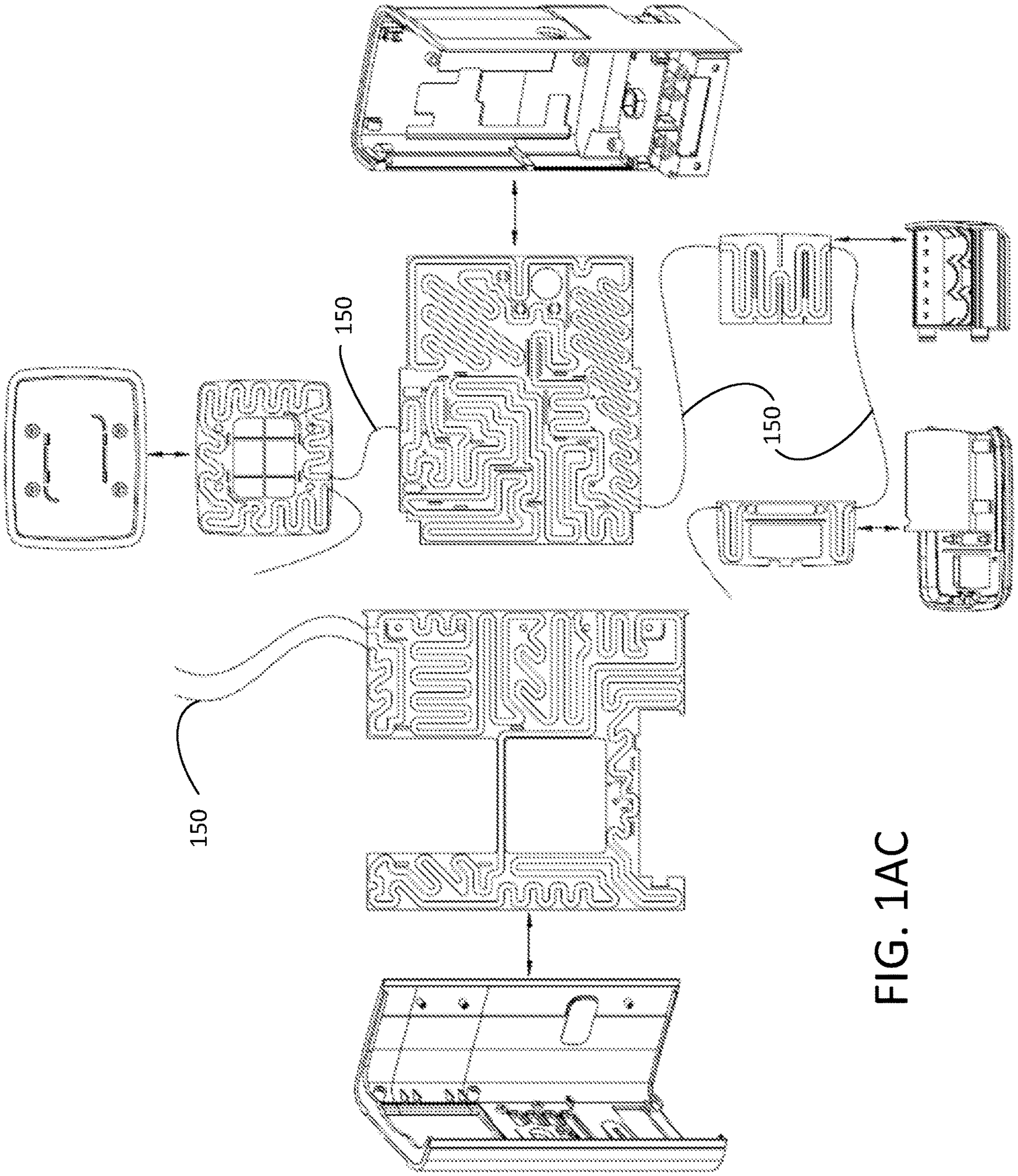
Figure 1A:
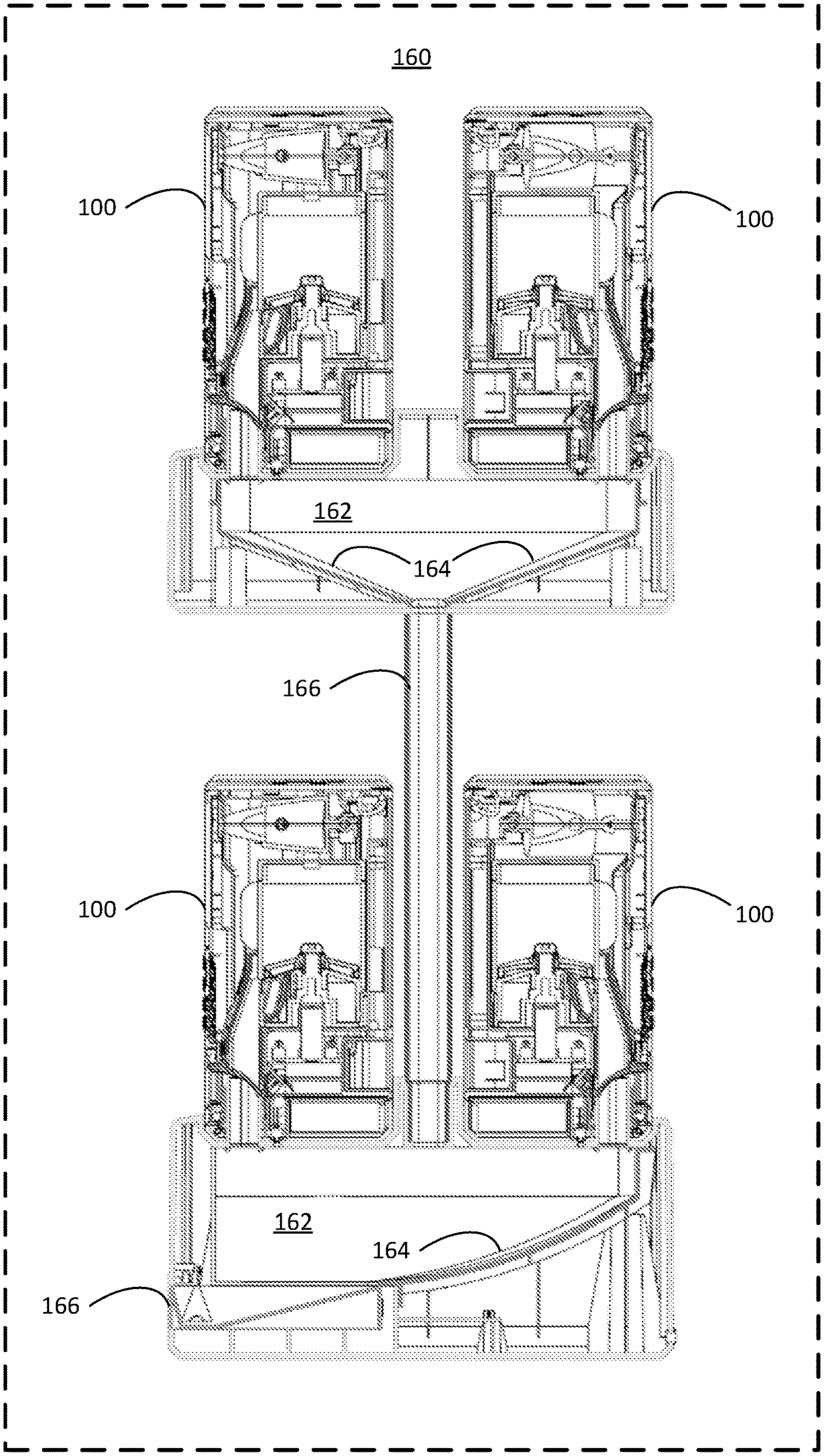
Figure 1A:
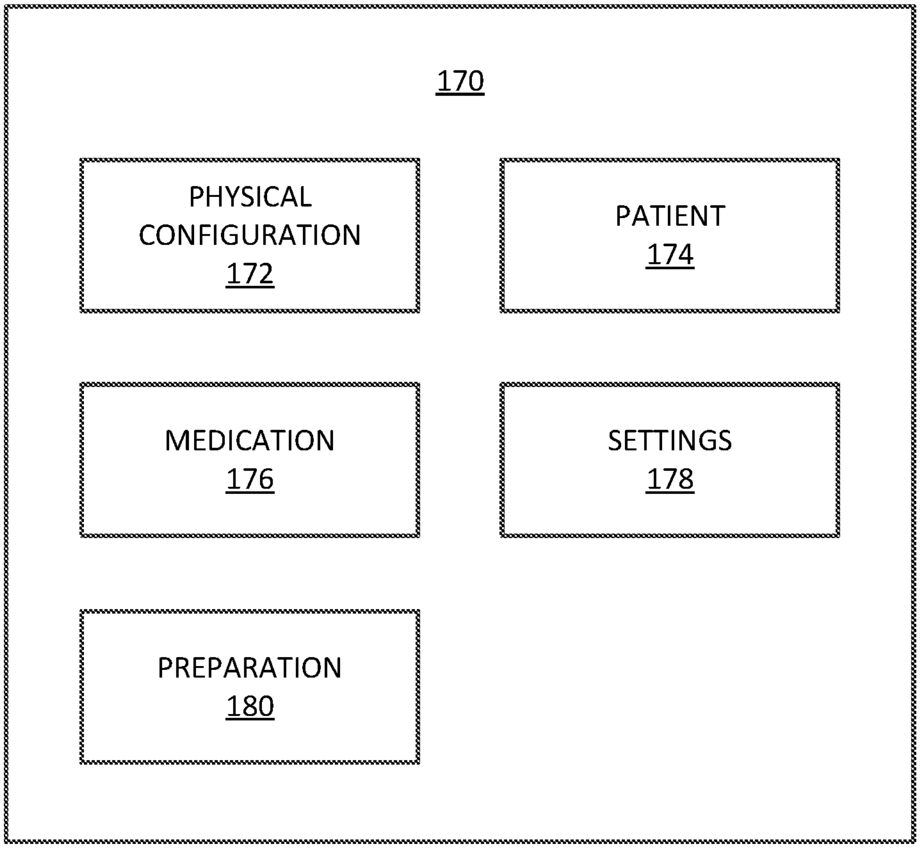

As illustrated in FIG. 1Z, FIG. 1AA, and FIG. 1AB, an adapter 114 may be associated with a particular size, or range of sizes, of medication 120. One or more dimensions (e.g., height, width, depth, etc.) associated with the side cutout of the adapter 114 may be selected in accordance with a particular size of medication 120 (e.g., for accommodating different pill sizes). For example, adapter 114C may associated with a small pill or capsule. Moreover, by installing a modular adapter (e.g., adapter 114) into the adapter holder 128 of the ring 110, different sizes of medication 120 may be accommodated by simply changing the adapter 114.

As illustrated in FIG. 1AC, one or more examples may include a loop of wire 150, e.g., built into or wrapped around the medication dispenser 100 (e.g., housing 130, housing lid 132, locking mechanism 134, etc.). Moreover, the loop of wire 150 may be attached to the medication dispenser 100 by an adhesive or tape. The loop of wire 150 may be continuous, creating a barrier within or around the medication dispenser 100. Moreover, a signal may be transmitted throughout the wire 150 and the signal may be detected if the wire remains unbroken (e.g., checking for a voltage drop at one end of the wire. If the medication dispenser 100 is tampered with (e.g., breached or broken), the respective loop of wire 150 may no longer carry the signal and it may be determined that the loop of wire 150 has been broken. In some examples, one or more tamper resistant mechanisms (e.g., destruction mechanism 136) may be triggered by a breach or break of the loop of wire 150.

As illustrated in FIG. 1AD, a plurality of medication dispensers 100 may be attached to a medication collection mechanism 160. According to some aspects, the medication collection mechanism 160 may include a base 162 comprising an interface for one or more medication dispensers 100. The base 162 may include one or more ramps 164 to direct the medication to a medication collector 166. The medication collection mechanism may supply power (e.g., via a power outlet or wireless charging) to the plurality of medication dispensers 100.

According to some aspects, the medication collection mechanism may include a plurality of bases 162 (e.g., an upper base and a lower base). For example, multiple (e.g., 4) medication dispensers 100 may interface with multiple bases 162 (e.g., upper and lower). The multiple bases may be connected by a medication pathway 166, e.g., directing dispensed medication from the upper base to a lower base.

According to some aspects, a software portal may be presented to a prescriber, pharmacist, or user to configure the medication dispenser 100. As illustrated in FIG. 1AE, a pharmacist may be presented with a portal 170 to configure the medication dispenser 100. According to some aspects, the portal 170 may be presented by a display of a computing device (e.g., desktop computer, laptop, tablet, mobile device, etc.). Moreover, the portal 170 may be provided by one or more servers and/or cloud computing devices.

At block 172, the pharmacist may determine a physical configuration of the medication dispenser 100 by selecting the adapter 114 (e.g., based on type, size, and/or shape of medication), the container 102 (e.g., based on type, size, shape, and/or quantity of medication), and/or the medication dispenser 100 (e.g., based on type, size, shape, and/or quantity of medication). In some aspects, the pharmacist may simply select the type and quantity of the medication and the selections may be determined by the system based on one or more attributes of the medication, including type, size, shape, and/or quantity of medication. According to some aspects, the adapter 114 and/or the container 102 may be determined by the system based on an available inventory of one or more sizes of adapters 114 and/or containers 102.

Moreover, the available inventory may be adjusted based on the selected adapter 114 and/or the selected container 102.

At block 174, the pharmacist may be presented with information associated with the patient and/or the subscriber. For example, information associated with the patient may include one or more of name, date of birth, phone number, email address, home address, allergies, insurance information, etc. Information associated with the prescriber may include, for example, one or more of name, Drug Enforcement Agency (DEA) number, National Provider Identifier (NPI), etc.

At block 176, the pharmacist may be presented with medication dispensing information, including quantity of dispensed medication, quantity of medication to be included in the container 102, quantity of emergency medication (e.g., to be accessed via emergency access panel 146), etc. In some aspects, the pharmacist may enter and/or be presented with additional medication specific information. The information may include prescriber instructions, medicine side effects, a maximum allowed dosage (e.g., per 24 hours), a minimum time interval between dosages, a dosing schedule, a prescription number, a date the prescription was written, a date the prescription was filled, specific instructions, and/or a number of refills. In some aspects, the pharmacist may determine a schedule for dispensing the medication (e.g., a daily, weekly, monthly, etc. schedule). The additional medication specific information may be used by the medication dispenser 100 to dispense medication. For example, the medication dispenser 100 may only dispense medication in accordance with the medication specific information (e.g., maximum allowed dosage, minimum time interval between dosages, etc.). Moreover, medication specific information may include a name of the medication and/or National Drug Code (NDC), medication strength, manufacturer, formulation, form, color, and/or route of medication administration (e.g., oral).

At block 178, the pharmacist may determine one or more settings (e.g., attributes or privileges) of the medication dispenser 100. The attributes or settings may include automatic dispensing, dispense on an as-needed basis, fingerprint authentication, random code display, pain level input, module, dispenser audio alerts, dispenser visual alerts, short message service (SMS) notification, email notifications, foaming module, dispenser visual alerts, and/or mobile data (e.g., Global System for Mobile Communications (GSM) chip activation). In some aspects, the settings may be determined by the system based on one or more of the medication being dispensed, dosage, and/or details regarding the user.

For example, the medication dispenser 100 may automatically dispense medication (e.g., into a collection tray) at specified times or time periods based on an automatic dispensing attribute. Whether or not the medication should be dispensed to a patient on an as-needed basis may be determined based on the dispense on an as-needed basis attribute. For example, allowed dosages and/or dosage time intervals may be disregarded when the medication is to be dispensed on an as-needed basis. Based on a random code display attribute, the medication dispenser 100 may display a random code to the user and require the user to enter the random code prior to dispensing medication. Moreover, based on the user's input of the random code (e.g., or the user's attempted input of the random code), the medication dispenser 100 may determine a cognitive state of the user and/or whether to dispense a medication or not to dispense a medication (e.g., a poor cognitive state may be associated with not dispensing pain medication).

The medication dispenser 100 may require a user to authenticate themselves based on a fingerprint authentication attribute. The medication dispenser 100 may request a pain level input from a user (e.g., a patient prescribed pain medication) periodically or when dispensing medication. Based on the foaming attribute, the medication dispenser 100 may determine whether to activate security features (e.g., destruction of medication by a foaming agent) upon detecting tampering with (e.g., a breach) the medication dispenser 100. The medication dispenser 100 may emit audio alerts associated with dispensing or other functions based on the dispenser audio alerts attribute. For example, the medication dispenser 100 may emit audio voice-based instructions or provide a sound when interacting with a user interface. Based on the dispenser visual alerts attribute, the medication dispenser 100 may provide visual alerts associated with dispensing or other functions. For example, the medication dispenser 100 may active a display and/or one or more light emitting diodes as an indication or reminder to take a medication. Based on the SMS and/or email notifications attribute, the dispenser may provide a user, pharmacist, prescriber, etc. with email and/or text notifications regarding the use of the medication dispenser 100. Based on the GSM chip activation attribute, the medication dispenser 100 may activate mobile data as a data connection. For example, in some aspects, the medication dispenser 100 may communication with a mobile network.

At block 180, the pharmacist may be presented with instructions to prepare the medication dispenser 100 for a user. For example, the instructions may include assembly of one or more aspects of the medication dispenser 100, as well as sizes of one or more particular components. An identifier (e.g., a dispenser identifier) may be assigned to the medication dispenser 100. The identifier may be used to connect (e.g., wirelessly) to the medication dispenser 100. According to some aspects, the medication dispenser 100 may include a demo mode that cycles through one or more features of the medication dispenser 100. For example, the pharmacist may initiate a demo mode of the medication dispenser 100 to ensure that a patient can operate the medication dispenser 100.

Figure 2A:
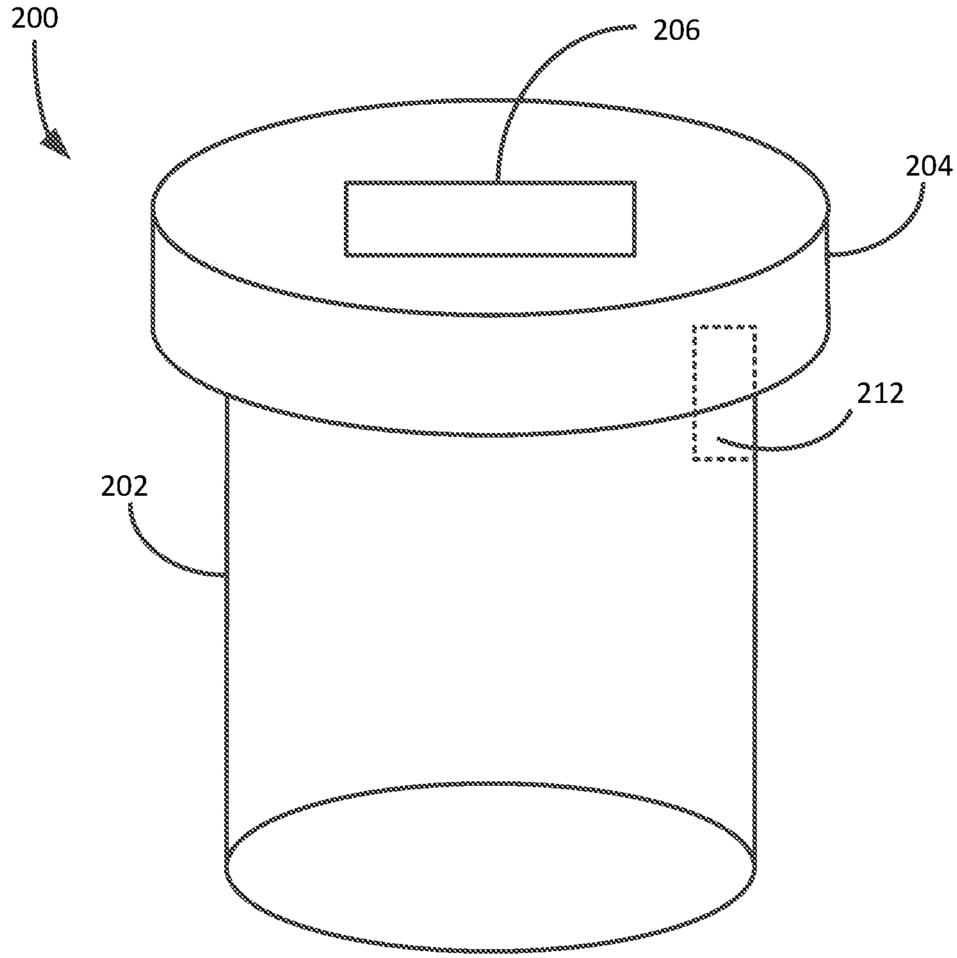
FIG. 2A is an example illustration of a medication container according to an embodiment of the present disclosure.

FIG. 2A illustrates an exemplary embodiment of medication container 200. Medication container 200 may include housing 202, lockable cap 204, locking mechanism 206, and destruction mechanism 212. Housing 202 may be any housing, such as a container, that can hold and store medication. Lockable cap 204 may be operably attached to housing 202 to secure the medication stored therein. Lockable cap 204 may be configured to lock onto housing 202 via locking mechanism 206. Locking mechanism 206 may secure the lockable cap 204 to housing 202, and it may include various means for unlocking lockable cap 204. For example, locking mechanism 206 may include an input via which a patient or other user may enter a credential to unlock locking mechanism 206 and thus also lockable cap 204. As used herein, a credential may include a code, password, passphrase, gesture, or other means of authentication with locking mechanism 206 or other locking mechanisms described herein. Further, in contexts described herein in which the credential is not required to be communicated between parties, a credential may also refer to a biometric identifier.

Medication container 200 may be made of a type of material that is lightweight, but durable. Medication container 200 may need to be light enough to carry, but durable enough so that it would be extremely difficult to break. For example, medication container 200 may be made of carbon fiber, a metal such as aluminum, a hard plastic such as PVC, and the like.

Medication container 200 may include destruction mechanism 212. In an aspect, destruction mechanism 212 may be affixed to lockable cap 204. Destruction mechanism 212 may be a mechanism that can be configured to destroy or otherwise render unusable any medicine stored in housing 202. For example, destruction mechanism 212 may house a liquid, such as a spoiling agent, that, when destruction mechanism 212 is activated, may be released into housing 202 to destroy or render medication disposed within unusable. Destruction mechanism 212 may prevent medication housed inside housing 202 from being accessed without locking mechanism 206 being properly unlocked. For example, destruction mechanism 212 may be activated upon a determination that one or more unauthorized attempts have been made to access the medicine contained within medication container 200 or that medication container 200 has otherwise been tampered with. For example, destruction mechanism 212 may be activated upon a determination that an incorrect credential has been entered into locking mechanism 206 a number of times equal to or greater than a predetermined threshold. Destruction mechanism 212 may, in some aspects, be mechanically activated by an improper access attempt. For example, the body of medication container 200 may be configured with destruction mechanism 212 such that if there is a breach or other trauma to the body, destruction mechanism 212 would activate.

Figure 2B:
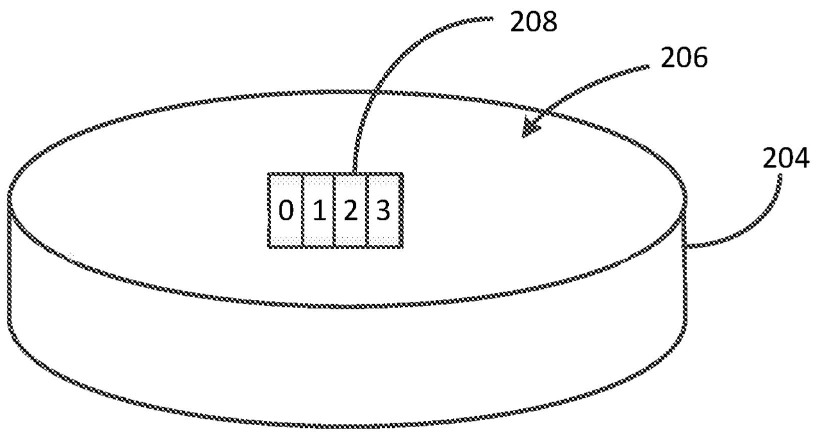
FIG. 2B is an example illustration of a cap of a medication container shown with a locking mechanism according to an embodiment of the present disclosure.
Figure 2C:
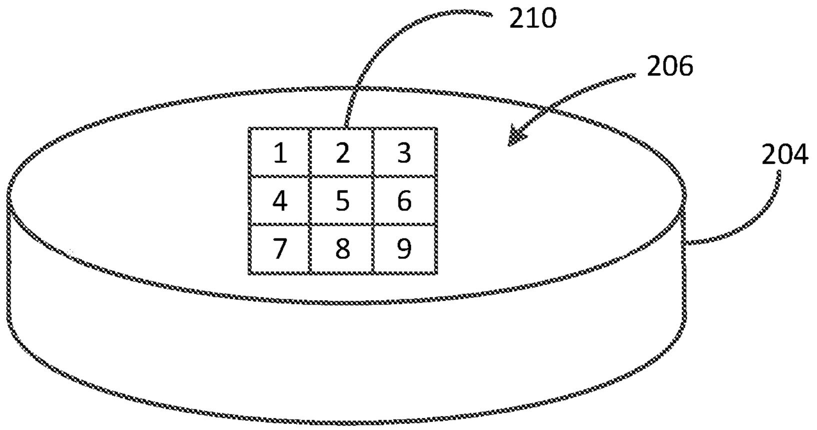
FIG. 2C is an example illustration of a cap of a medication container shown with a locking mechanism according to an embodiment of the present disclosure.

FIGS. 2B-2C illustrate various types of locking mechanism 206 that may be used within the scope of the invention. In FIG. 2B, locking mechanism 206 includes one or more numbered dials 208 that, when the right combination of numbers is selected, will unlock lockable cap 204, similar to a rotary dial lock. In FIG. 2C, locking mechanism 206 includes a series of alphanumeric buttons 210 that, when pressed in the right combination or order, unlock lockable cap 204. In an aspect, locking mechanism 206 may be a mechanical locking mechanism. That is, the mechanism (e.g., numbered dials or buttons) used to input the credential may be purely mechanical, as may be the particular mechanism that locks and unlocks lockable cap 204 to housing 202. In another aspect, locking mechanism 206 may also incorporate electronic components to, for example, receive an input of a credential from a user, evaluate the input credential against a predetermined credential (i.e., the correct credential to unlock locking mechanism 206), and/or effectuate unlocking locking mechanism 206 if the input credential is correct. It yet another aspect, locking mechanism 206 may comprise a biometric lock in which a biometric identifier, such as a fingerprint or voice sample, is provided to unlock locking mechanism 206. It can be appreciated that there are numerous other types of locking mechanisms that can be used to lock or unlock lockable cap 204 to or from housing 202.

Figure 2D:
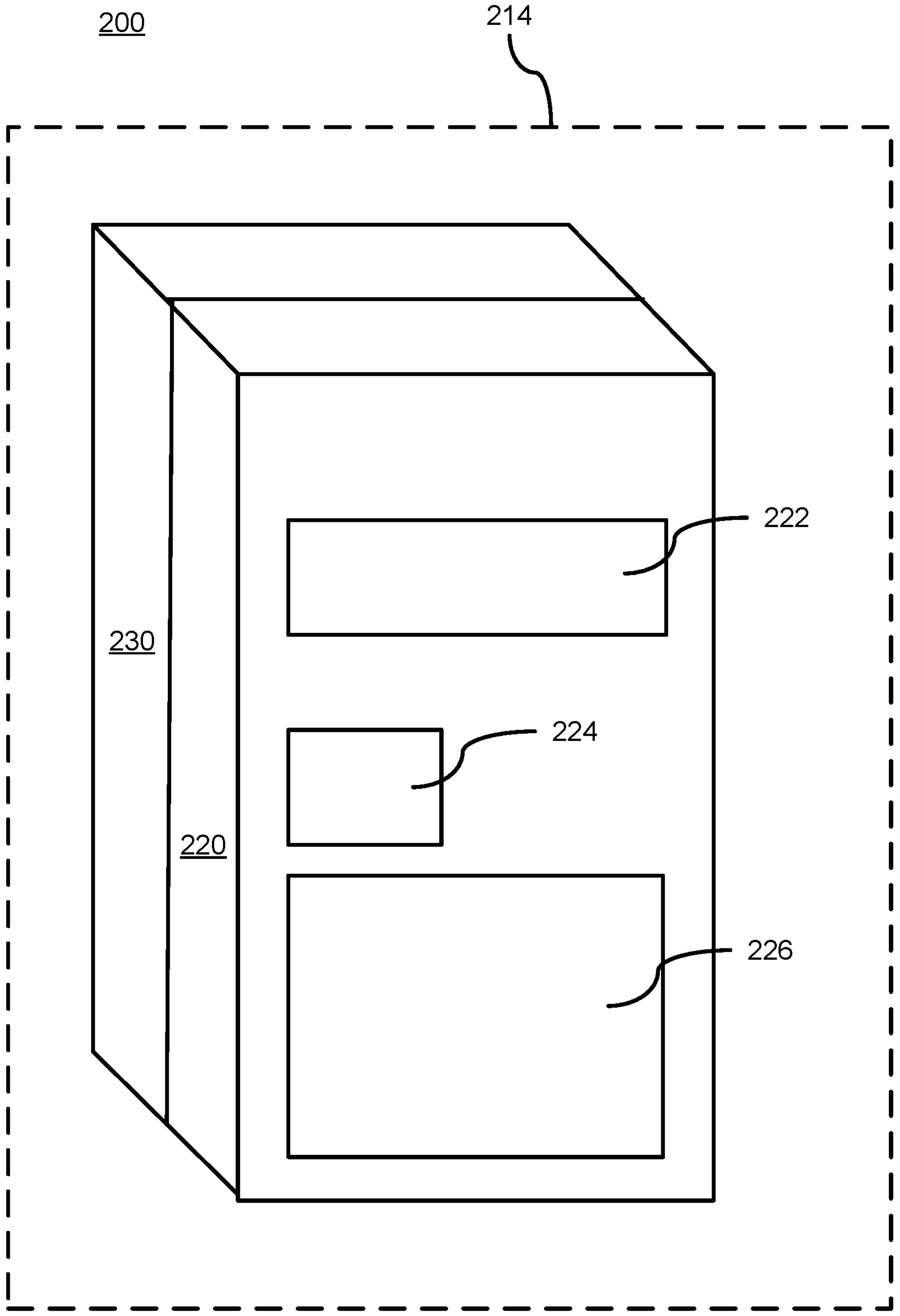
FIG. 2D is an example illustration of a medication container according to an embodiment of the present disclosure.

FIG. 2D illustrates an exemplary embodiment of medication container 200. Medication container 200 may include a durable part 214 (e.g., further including a circuit board, battery, or motor). The durable part 214 may include a first piece 220 and a second piece 230, e.g., such that the durable part 214 opens up (e.g., by a hinge or locking mechanism). The first piece 220 and the second piece 230 may be operably attached to secure any medication stored within and the medication container may include any number of security features (e.g., manual locking mechanism, software controlled electromechanical lock, etc.) to prevent unauthorized access to the medication. Moreover, the durable part may include a keypad 222 (e.g., alphanumeric buttons 210, a touchscreen, a sensor, etc.), a fingerprint reader 224, or a display 226. As shown in FIG. 2A, the keypad 222, fingerprint reader 224, and display 226 are disposed on the first piece 220. However, in some examples one or more of these components or features may be disposed in the first piece 220, the second piece 230, or any combination thereof. In an example, medication container 200 may include an input (e.g., keypad 222, fingerprint reader 224, or display 226) via which a patient or other user may enter a credential.

Figure 2E:
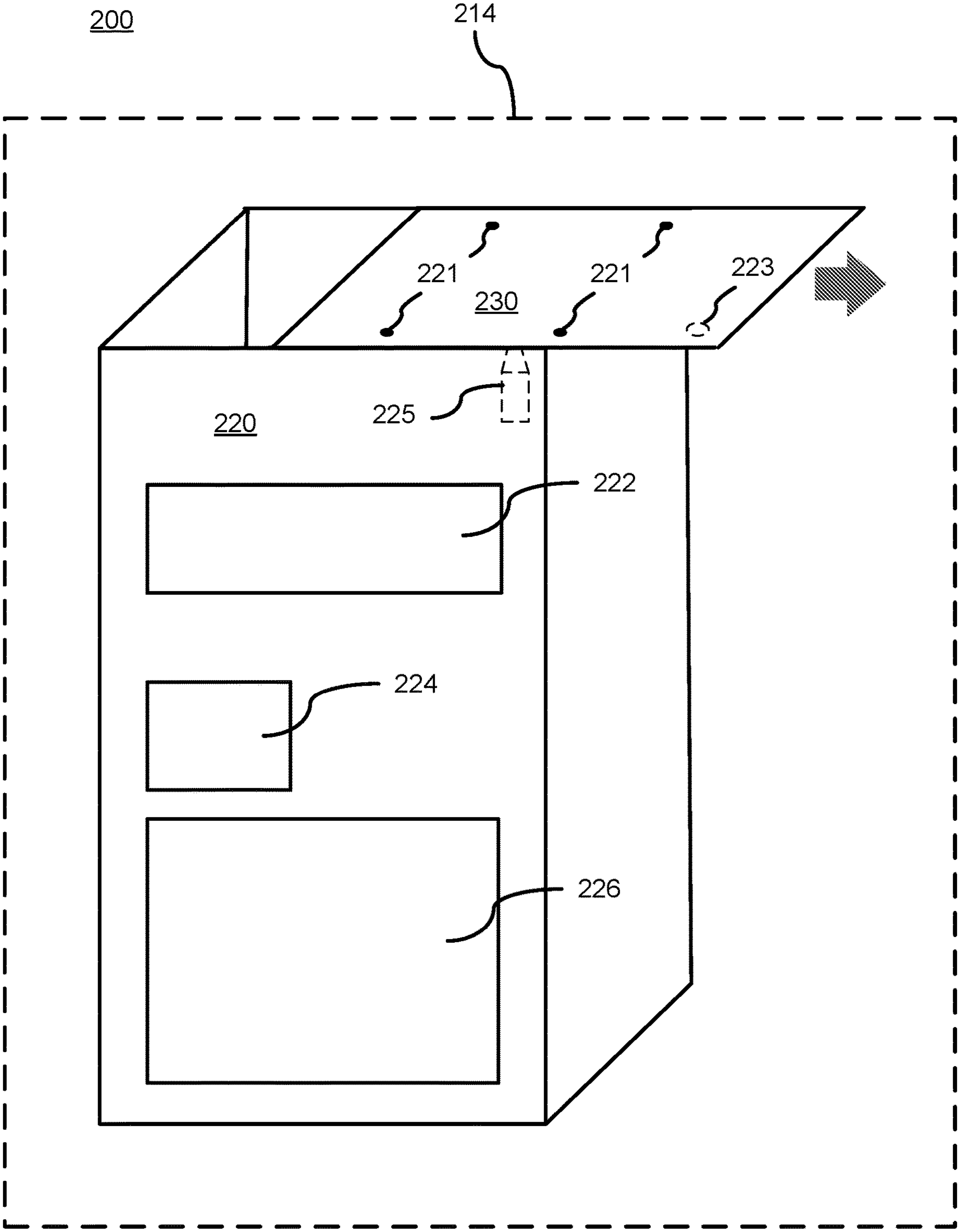
FIG. 2E is an example illustration of a medication container according to an embodiment of the present disclosure.

FIG. 2E illustrates an exemplary embodiment of medication container 200, where the durable part 214 may include a first piece 220 and a second piece 230, e.g., such that the durable part 214 opens up by removing the second piece 230 from the first piece 220. For example, the second piece may slide into place via one or more tongue and groove joints and may be electrically connected by one to the first piece 220 by one or more electrical connections 221. Moreover, a locking mechanism may ensure the second piece 230 is not separated from the first piece 220 by a patient or user. For example, a solenoid 240 (e.g., attached to the first piece 220) may be controlled by a processor to engage or disengage with a recess 223 in the second piece 230 to prevent unauthorized access to the medication.

Figure 2F:
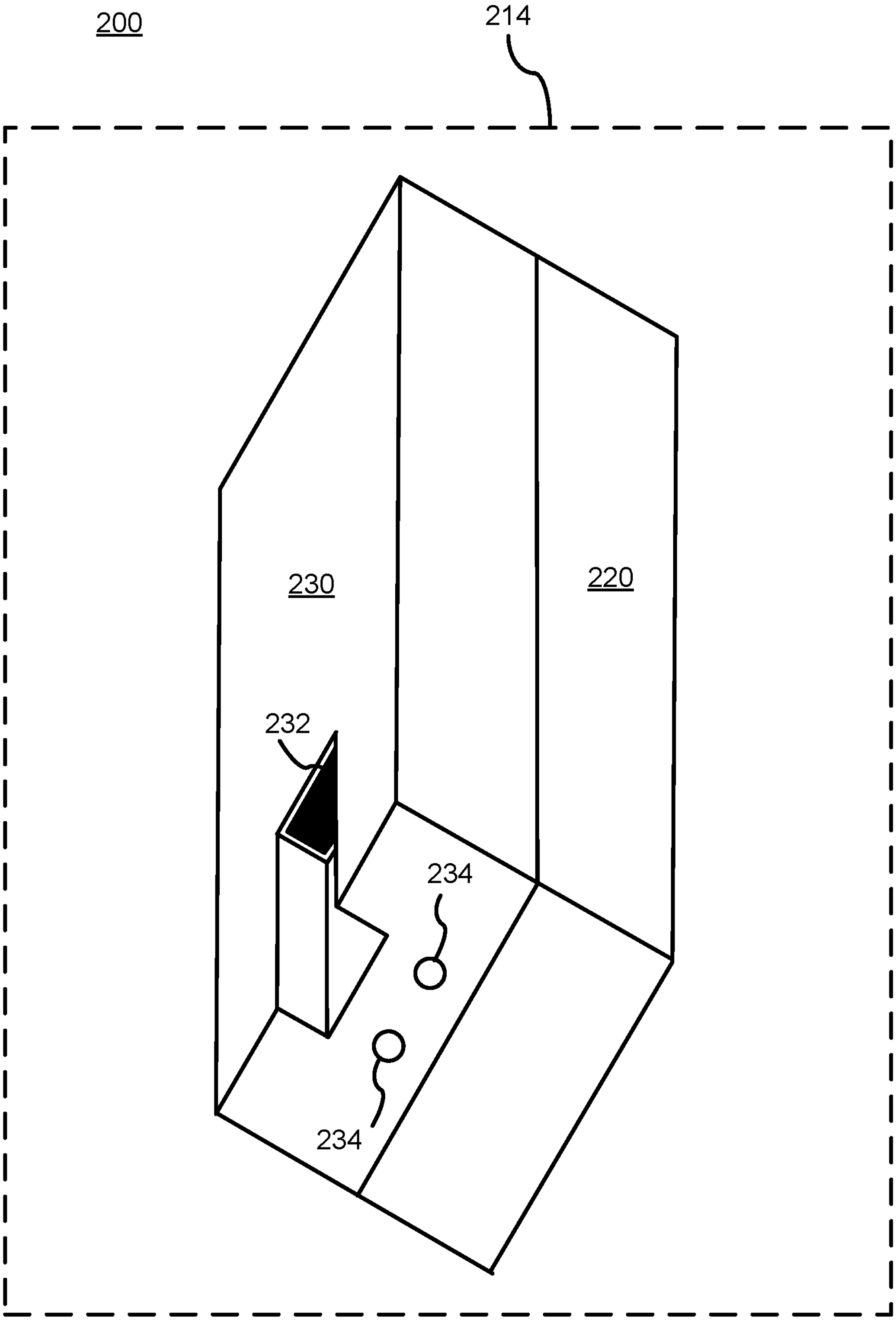
FIG. 2F is an example illustration of a medication container according to an embodiment of the present disclosure.

In an example illustrated in FIG. 2F, a bottom view of the medication container 200 illustrates a chute 232 (e.g., for dispensing medication) and one or more attachment screws 234 (e.g., for securing a motor). As shown in FIG. 2F, the chute 232 and one or more attachment screws 234 are disposed on the second piece 230. However, in some examples one or more of these components or features may be disposed on the first piece 220, the second piece 230, or any combination thereof.

Figure 2G:
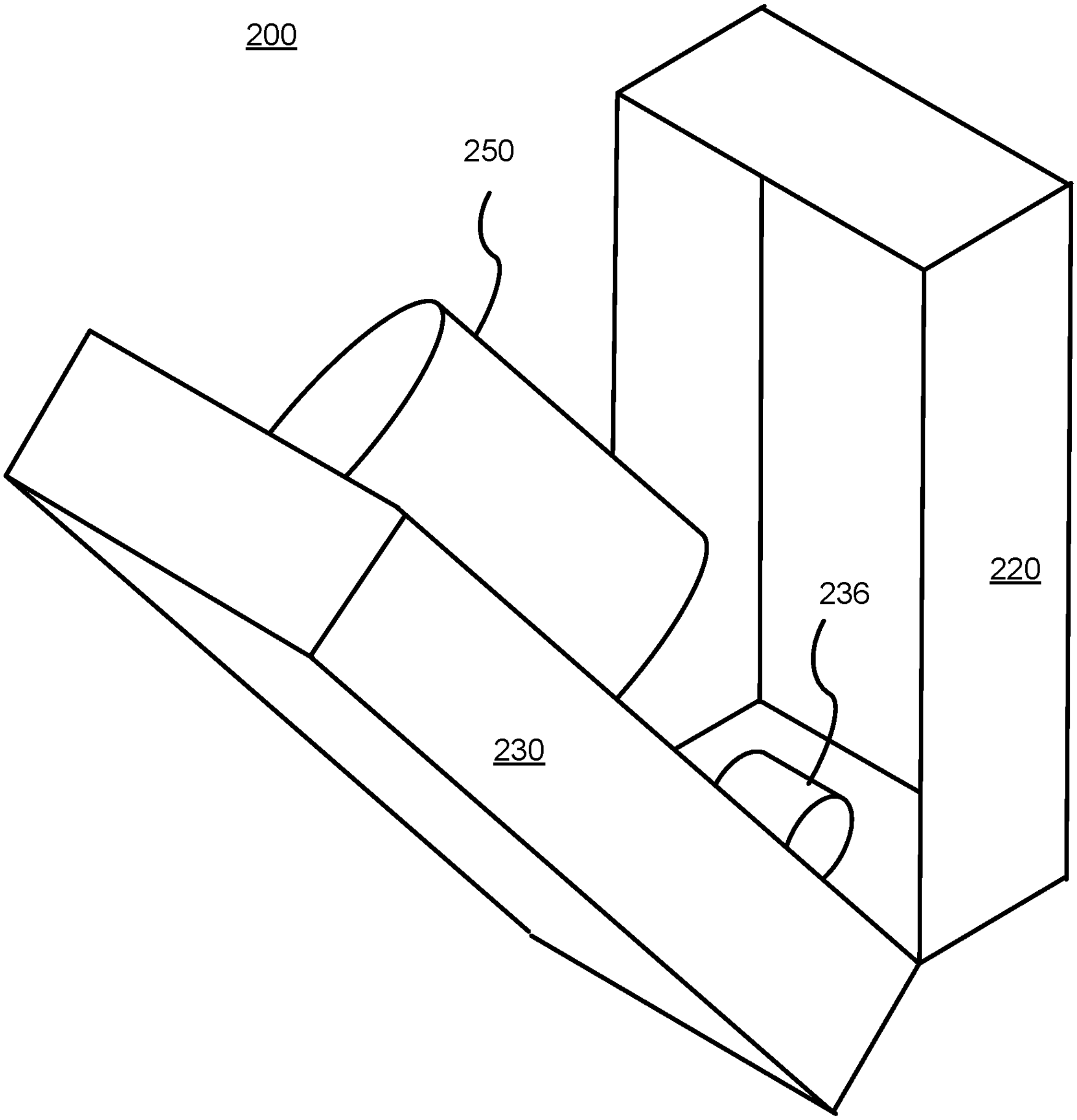
FIG. 2G is an example illustration of a medication container according to an embodiment of the present disclosure.

In an example illustrated in FIG. 2G, a hinge 236 may allow first piece 220 and second piece 230 of the durable part 214 to open. In some examples, the durable part 214 may be configured to house a disposable part 250. For example, a pharmacist may begin filling a prescription by placing medication in the disposable part 250 and may then place the disposable part 250 inside of the durable part 214.

Figure 2H:
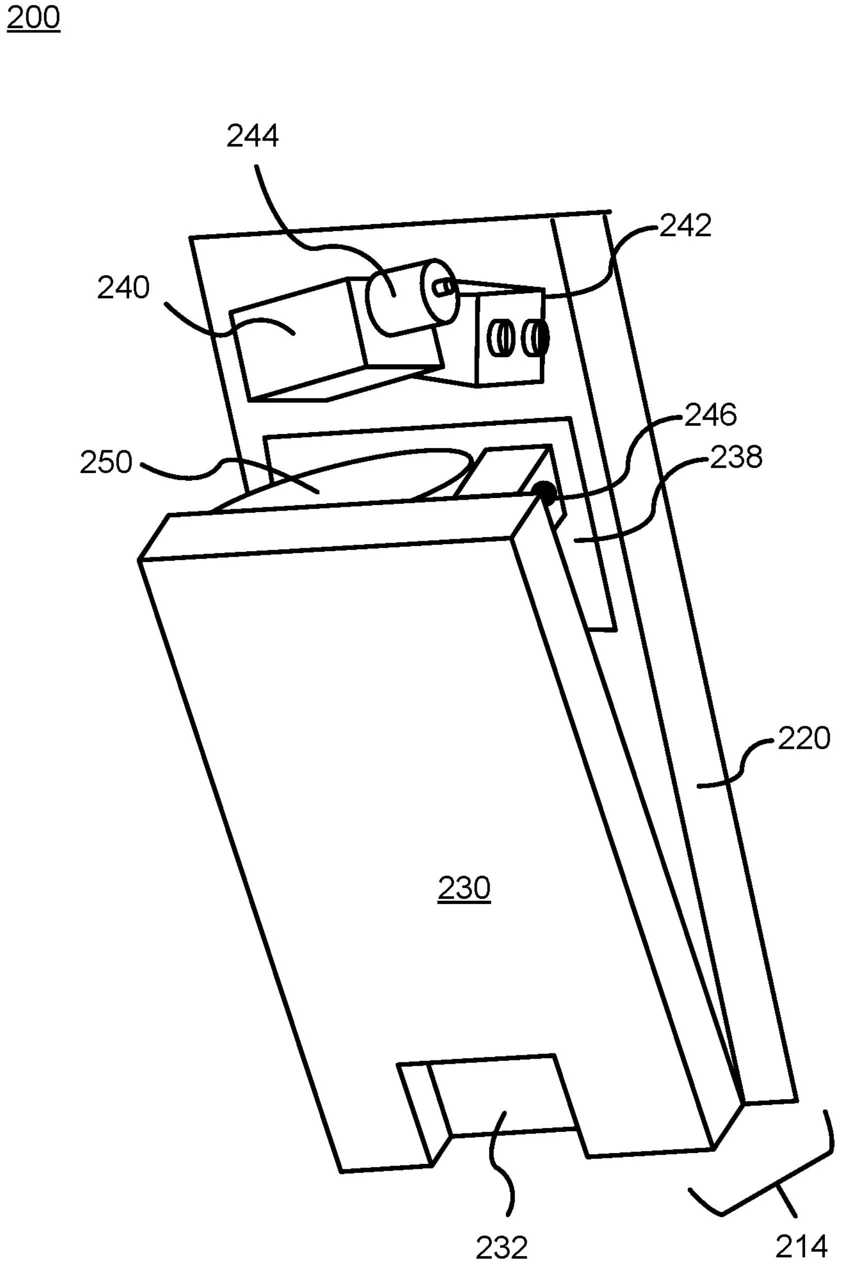
FIG. 2H is an example illustration of a medication container according to an embodiment of the present disclosure.

In an example illustrated in FIG. 2H, the durable part 214 may include a circuit board 238, a solenoid 240, and a battery 242. As shown in FIG. 2H, the circuit board 238, solenoid 240, and battery 242 (e.g., a 9-volt battery and battery connector) may be disposed on the first piece 220. However, in some examples one or more of these components or features may be disposed on the first piece 220, the second piece 230, or any combination thereof. In some examples, the durable part 214 may include a locking mechanism to operably connect the first piece 220 and the second piece 230, e.g., the solenoid 240 may extend a shaft 244 into a receptacle 246 sized to accept the shaft 244. In an example, the solenoid 240 may be activated by entering a specific keycode via the keypad 222, e.g., causing the solenoid 240 to retract the shaft 244 from a receptacle 246 so that the first piece 220 and the second piece 230 may be separated.

In some examples, the medication container 200 may include one or more sensors to detect an orientation of the medication container 200 (e.g., an accelerometer mounted-on or associated with circuit board 238). Thus, the medication container 200 may notify a user when oriented in a nonfunctional or non-ideal position (e.g., a position other than upright where the medication container 200 is incapable of dispensing pills or medication, such as upside down or laying on a side).

In some examples, the prescription securing device may include one or more communication interfaces, e.g., Bluetooth, WIFI, GSM, cellular, etc. The communication interfaces may allow the medication container 200 to communicate with one or more devices of the users, including mobile devices, computing devices, etc. Moreover, the communication interface(s) may enable the prescription securing device to communicate with one or more servers, websites, databases, cloud systems, etc. Multiple communication interfaces may provide redundancy so that the prescription securing device may still communicate with the user, pharmacist, server, apps, etc., when one form of communication is unavailable (e.g., cellular data connection when Bluetooth or Wi-Fi connections are unavailable).

Figure 2I:
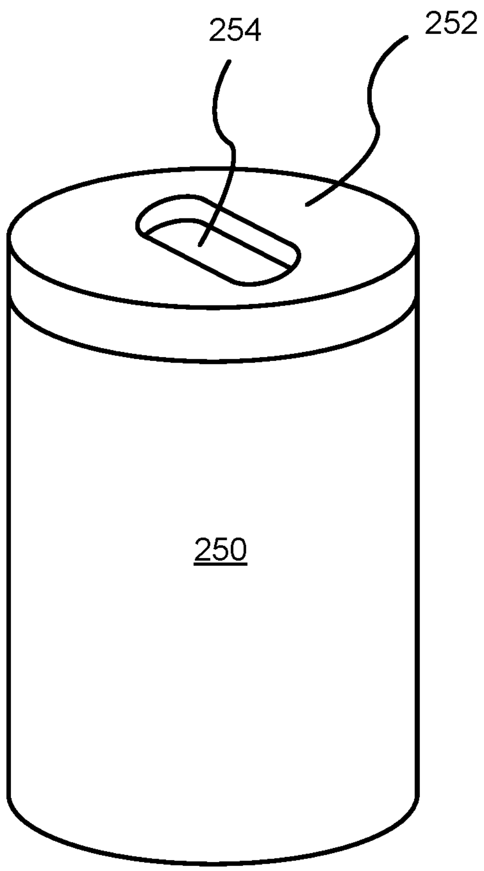
FIG. 2I is an example illustration of a medication container according to an embodiment of the present disclosure.

In an example illustrated in FIG. 2I, the disposable part 250 may include a lid 252. In some examples, the lid 252 may snap or screw into place on the disposable part 250. In some examples, the disposable part 250 or the lid 252 may include an indicator 254 of the size, shape, or type of pill or medication that is compatible with the disposable part 250. For example, a number of different disposable parts may be suited for a particular size, shape, or type of pill. The particular size, shape, or type of pill may be indicated by indicator 254, e.g., a notch, recession, marking, text, etc. Moreover, a pharmacist may match a particular pill to the indicator 254 by placing the pill in the indicator 254 to see if it fits, e.g., confirming a match between the pill and the disposable part 250.

Figure 2J:
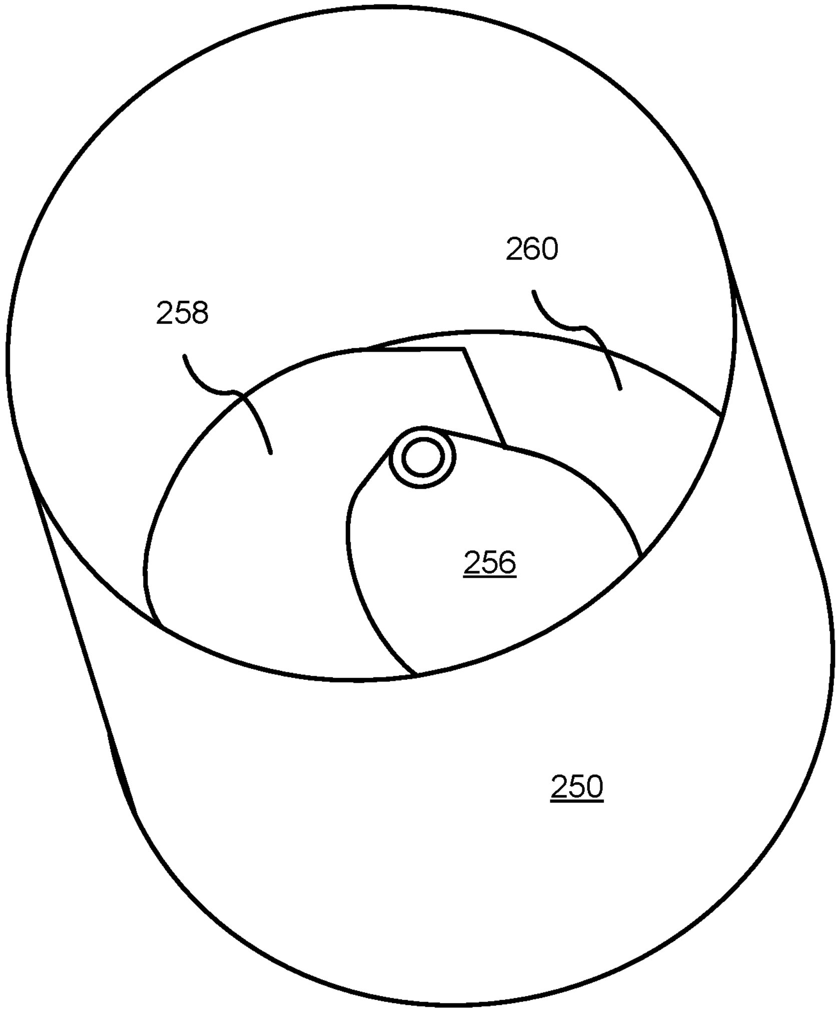
FIG. 2J is an example illustration of a disposable component of a medication container according to an embodiment of the present disclosure.

In an example illustrated in FIG. 2J, the disposable part 250 may include a cone 256, a scraper 258, or a turntable 260. In some examples, the cone 256 or scraper 258 are molded into or attached to another part of disposable part 250 (e.g., a body). The turntable 260 may be a separate part and may rotate within the disposable part 250. For example, the turntable may be captured by the scraper 258 and the cone 256. In some examples, the cone 256 may displace pills or medication housed inside the disposable part 250, such that the pills or medication rest along a periphery of the disposable part 250, e.g., over/on the turntable and not in the center of the disposable part 250.

In some examples, the height or diameter of the cone 256 may be selected based on the size or shape of a medication (e.g., a pill). For example, the cone 256 may have a larger diameter for a smaller pill and a smaller diameter for a larger pill. Thus, the space between an outer edge of the cone and a periphery of the disposable part 250 may increase as the size of a pill increases. In an example, the diameter of the cone 256 and associated space between the outer edge of the cone and a periphery of the disposable part 250 are selected to approximately match a dimension (e.g., length, width, or height) of a particular size of pill or range of sizes of pills.

Figure 2K:
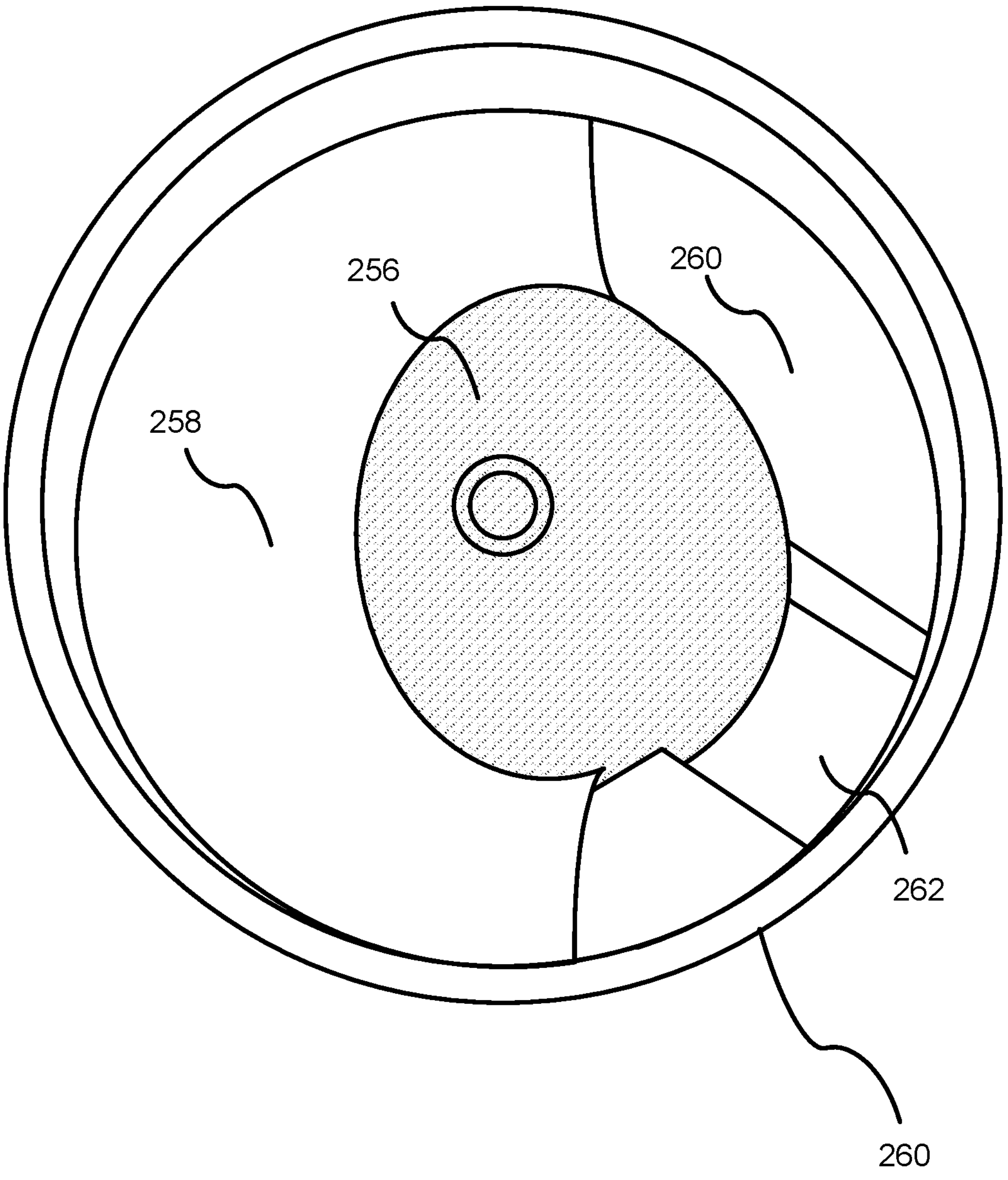
FIG. 2K is an example illustration of a disposable component of a medication container according to an embodiment of the present disclosure.

In an example illustrated in FIG. 2K, the turntable 260 may include a well 262. In some examples, the well 262 is sized (width, height, depth, etc.) to accommodate a specific number of pills or medication, for example a single pill. For example, the length, width, and height of the well 262 may be selected to accommodate a particular size (length, width, or height) of a particular pill, or a range of sizes of pills. Thus, as the turntable 260 rotates, the pills may be displaced by the cone 256 so that the pills rest on the turntable 260. A specific number of pills (e.g., one pill) may then fall into the well 262 based on the size of the pill(s) and the size of the well 262; the remaining pills resting on the turntable may be separated from the well 262 by the scraper 258.

Figure 2L:
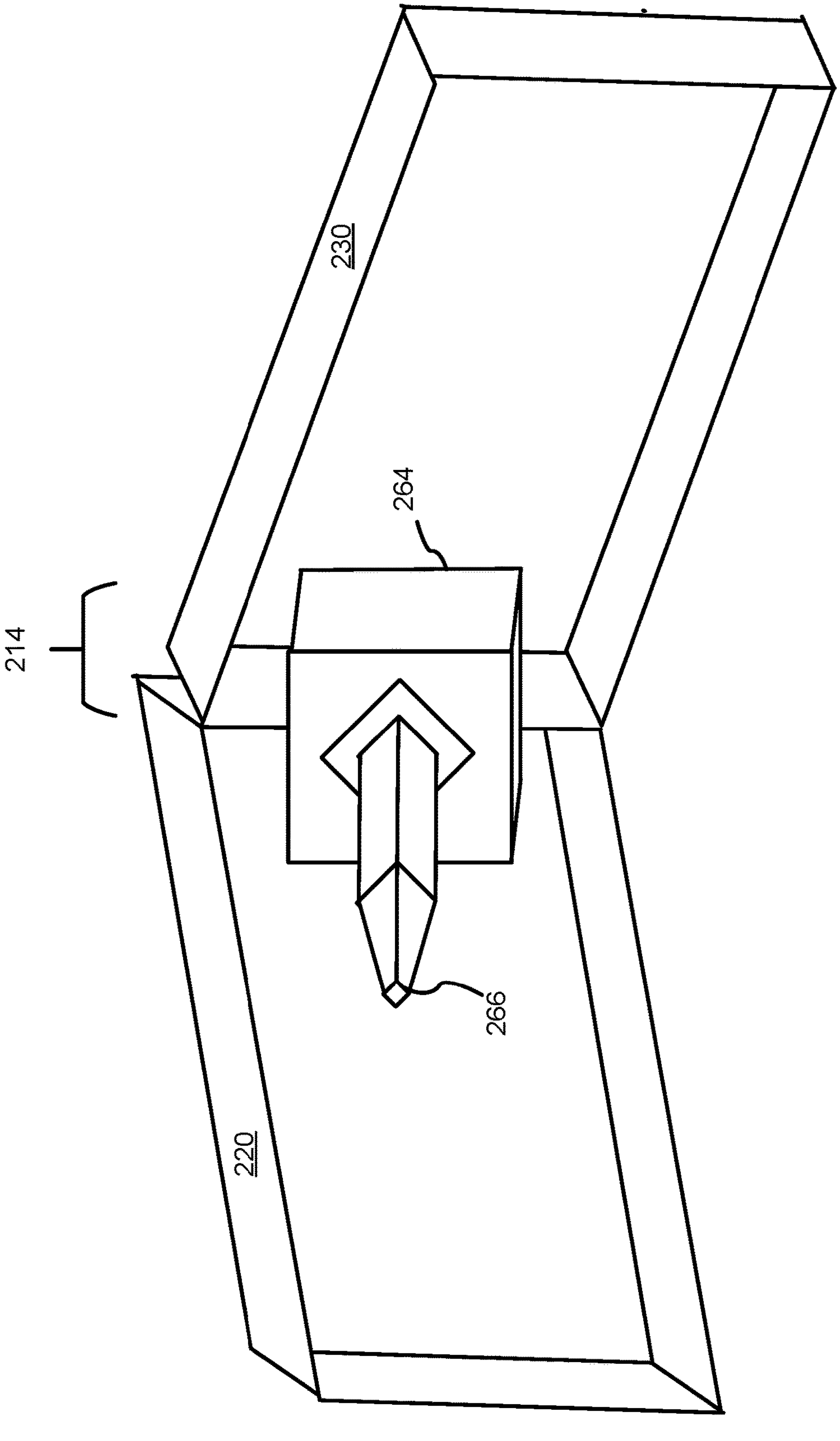
FIG. 2L is an example illustration of a durable component of a medication container according to an embodiment of the present disclosure.

In an example illustrated in FIG. 2L, the durable part 214 may include a motor 264 (e.g., a stepper motor) and an obelisk 266. For example, the motor may be secured by one or more attachment screws 234 and may be used to rotate turntable 248 (e.g., clockwise, counterclockwise, back and forth, etc.). Moreover, an obelisk 266 may be formed to fit inside of or otherwise complement the disposable part 250. In an example, obelisk 266 may fit within disposable part 250 and as motor 264 turns obelisk 266, a connection between obelisk 266 and disposable part 250 may cause the turntable 260 to turn. Accordingly, well 262 of turntable 260 may be advanced by motor 264 and obelisk 266. In some examples, the motor 264 may be a hand crank or manually operated mechanism.

Figure 2M:
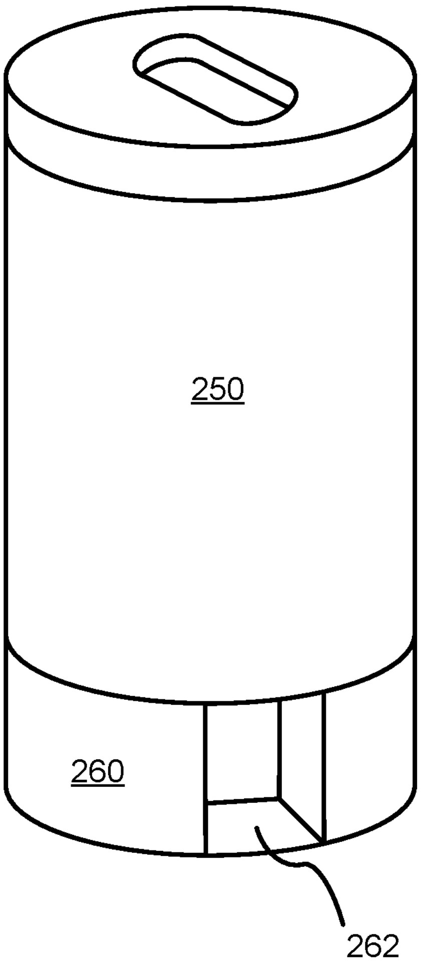
FIG. 2M is an example illustration of a disposable component of a medication container according to an embodiment of the present disclosure.

As further illustrated in FIG. 2M, the well 262 may be rotated as turntable 260 is rotated. Moreover, the turntable 260 may be rotated in a vibratory manner (e.g., back and forth) or in concert with a vibratory mechanism (e.g., using a vibratory motor, piezo element, etc.) until a pill falls into the well 262. Moreover, one or more rumbling strips disposed on a surface of the disposable part 250 may create interference with the turntable 260 as it rotates. Thus, in an example, a pill or medication captured within well 250 may be deposited from the chute 232 of durable part 214 when the well 262 aligns with the chute 232. For example, the motor 264 may stop turning the obelisk 266 when the well 262 and the chute 232 are aligned. Moreover, in some examples, a sensor such as an optical sensor may detect that a pill or medication is captured within the well 262. For example, a captured pill may be identified as the turntable 260 makes a 360-degree rotation or continuously alternates between two orientations (e.g., from one end of the scraper 258 to the other end of the scraper 258) until a sensor detects a pill in the well 262. Moreover, in some examples, a sensor such as an optical sensor may detect that a pill or medication captured within the well 262 has been dispensed (e.g., identified that pill or medication has dropped through the chute 232) and/or that the medication has been collected (e.g., from a collection tray). According to some aspects, if a sensor does not detect that first medication is collected, second medication may not be dispensed.

Figure 2N:
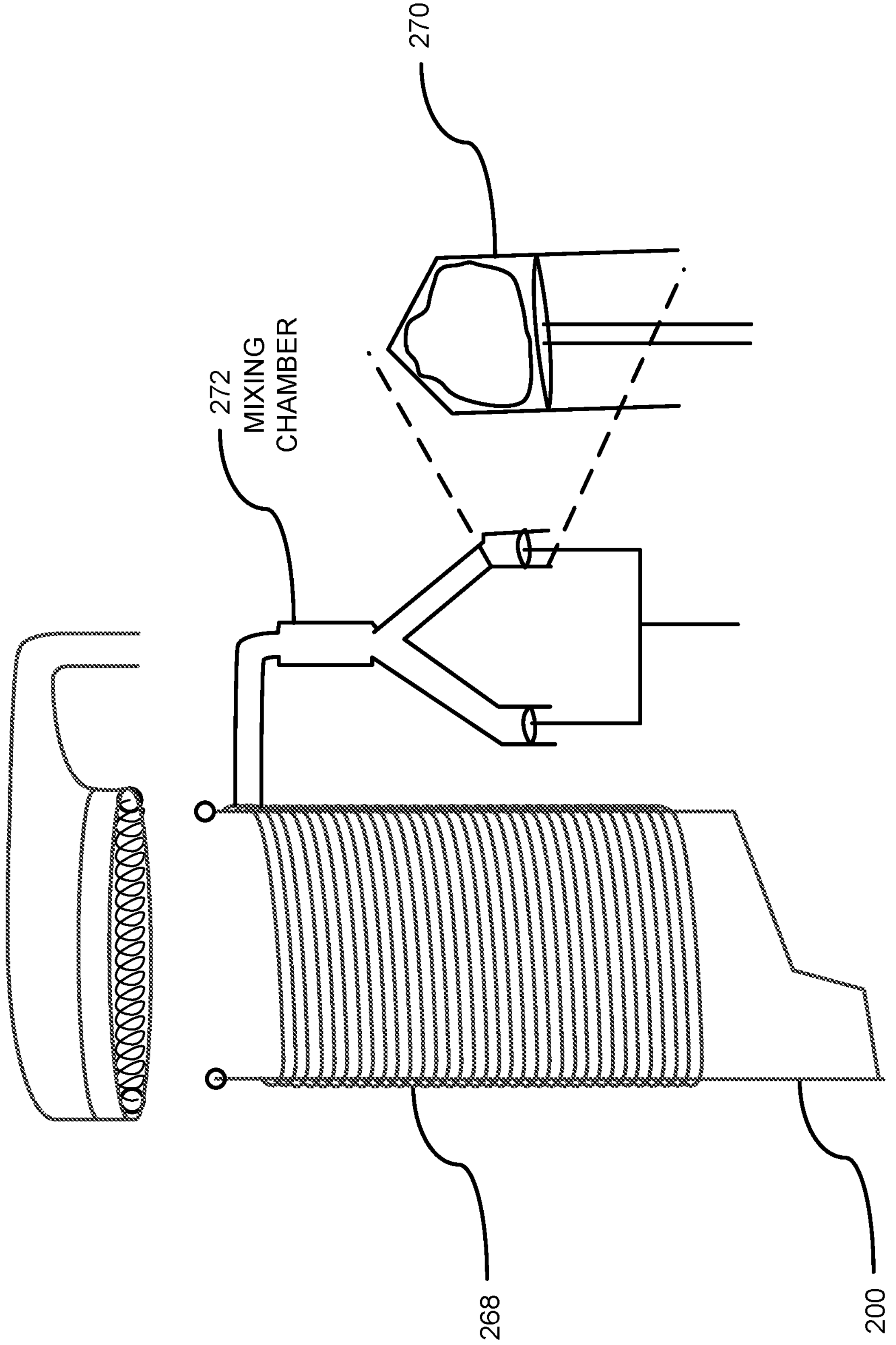
FIG. 2N is an example illustration of a destruction mechanism of a medication container according to an embodiment of the present disclosure.

As illustrated in FIG. 2N, one or more examples may include a loop of wire 268, e.g., built into the side or wrapped around the durable part 214 or the disposable part 250. The loop of wire 268 may be continuous, creating a barrier within or around the durable part 214 or the disposable part 250. Moreover, a signal may be transmitted throughout the wire 268 and the signal may be detected if the wire remains unbroken (e.g., checking for a voltage drop at one end of the wire. However, if the durable part 214 or disposable part 250 is tampered with (e.g., breached or broken), the respective loop of wire 268 may no longer carry the signal and it may be determined that the loop of wire 268 has been broken.

In some examples, one or more actuators 270 may be triggered by a breach or break of the loop of wire 268. The one or more actuators 270 may be attached to or contained within one or both of the durable part 214 or the disposable part 250 and may apply pressure on one or more individual vessels containing separate chemicals based on detecting a breach or break in the loop of wire 268. In an example, separate chemicals may form a foaming or hardening agent when joined, e.g., in order to render the pills or medication unusable as a result of detected tampering. Moreover, the separate chemicals may be joined in a mixing chamber 272 prior to entering the disposable or replaceable part 40. According to some aspects, a foaming module may include two pouches, each containing a separate chemical that may form a foaming agent or hardening agent when joined. According to some aspects, a foaming module may be removable or replaceable. For example, the foaming module may have a shelf life (e.g., associated with one or more chemicals of included in the foaming module) and the foaming module may be replaced periodically.

In some examples, the durable part 214 or may include one or more chemical storage vessels (e.g., one or more spring loaded syringes). A plunger of the one or more spring loaded syringes may be partially or fully immobilized (e.g., directly or indirectly) by a mechanical apparatus (e.g., latching mechanism, actuator, locking pin, etc.). When the continuous loop of wire 268 is broken, the one or more spring-loaded syringes may be freed to expel the contents of the one or more spring-loaded syringes (e.g., by removing or retracting the mechanical apparatus). For example, when the wire 268 is broken, one or more actuators blocking a portion of one or more spring-loaded syringes containing chemicals as fast-acting adhesives (e.g., cyanoacrylate, polyurethane, epoxy, etc.), foaming agents, bittering agents (e.g., denatonium), coloring agents, alkaline compounds, acidic compounds, and/or chemical accelerators. The spring-loaded syringes may then expel the stored chemicals into the disposable part 250, ruining the stored medication or pills and preventing the user from circumventing the secured container to obtain unauthorized pills or medication.

In an example, a user may attempt to obtain pills or medication by breaking into the medication container 200. As the user breaches the disposable part 250, the medication container 200 may detect the breach based on no longer detecting a signal through the loop of wire 268. In another example, the medication container 200 may detect the breach based on identifying an attempt to access the medication via the chute 232 or well 262 (e.g., by detecting a foreign object using one or more sensors associated with pill detection). For example, the medication container 200 may normally expect a first sensor to detect a pill in the well 262 and then a second sensor to detect the pill passing through the chute 232 as the pill is dispensed. A breach may be identified if the second sensor detects an object in the chute 232 without a prior detection of an object in the well 262. In another example, dispensing of a pill may include a first sensor detecting a pill passing through a first portion of the medical container 200 and then a second sensor may detect the pill passing through a second portion of the medical container 200. Thus, a breach may be identified if the second sensor detects an object prior to a detection by the first sensor.

As a result of the identified breach, actuators 270 may be triggered to apply pressure to individual vessels containing separate chemicals. The separate chemicals may be subsequently joined in a mixing chamber 272 and the resultant hardening or foaming agent (e.g., epoxy, etc.) may be dispersed throughout the disposable part 250 of the medication container 200. Thus, the user will be unable to obtain usable pills or medication by breaking into or tampering with the medication container 200.

Figure 2O:
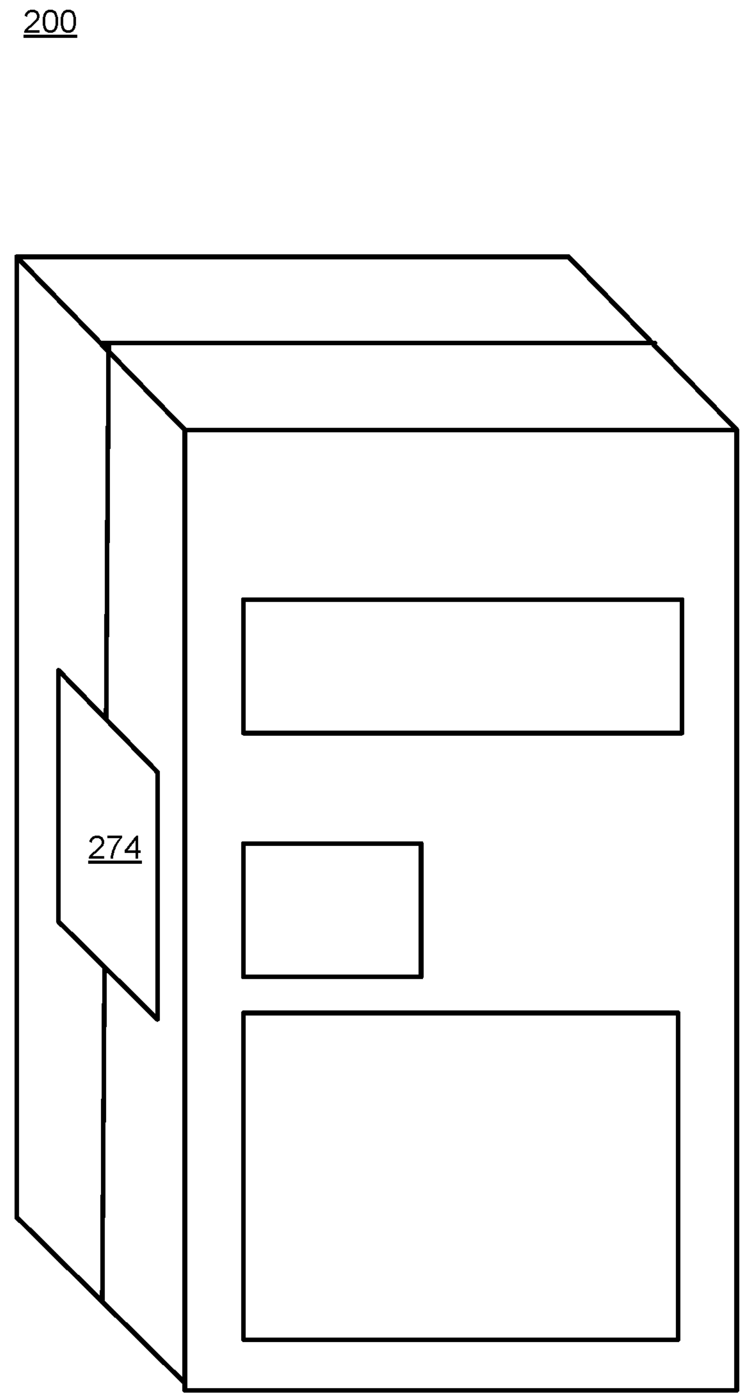
FIG. 2O is an example illustration of a medication container according to an embodiment of the present disclosure.

As illustrated in FIG. 2O, in some examples, the medication container 200 may include a pouch 274 for holding one or more unsecured pills or medication. For example, if a user has difficulty getting their medication from the medication container 200, they may access the unsecured medication stored in the pouch 274 until they are able to consult with a pharmacist.

Figure 2P:
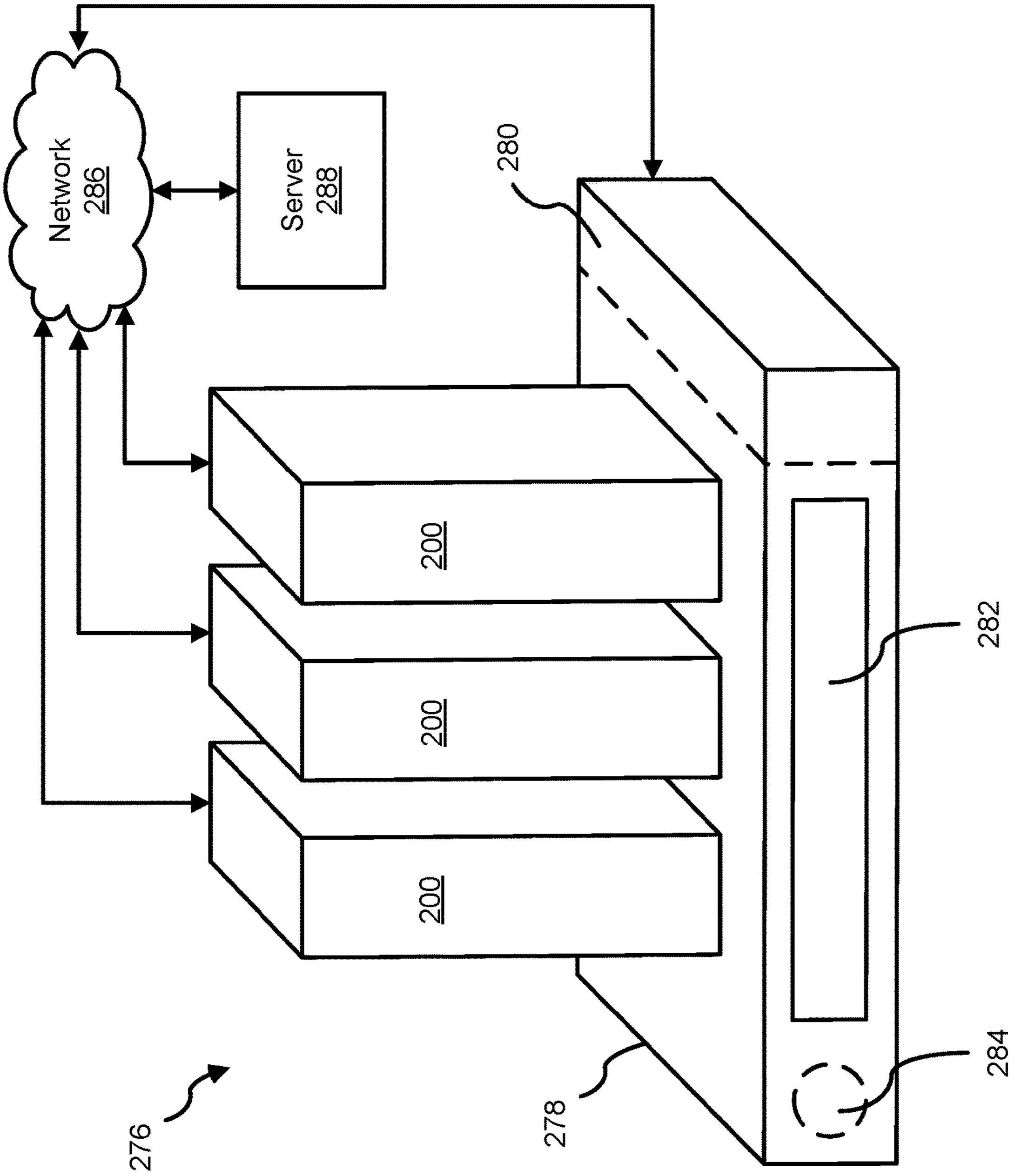
FIG. 2P is an example illustration of a grouping of medication containers according to an embodiment of the present disclosure.

As illustrated in FIG. 2P, in some examples, an operating environment 276 may include one or more medication containers (e.g., medication container 200) attached to another object (e.g., base 278). In an example, the medication containers 200 may dispense medication into a tray 282 of the base 278 in accordance with a schedule determined by a pharmacist or physician.

Moreover, the base 278 may include one or more processors, batteries, communication devices, audio or visual indicators, or input devices, e.g., located in portion 280 of the base 278. In some examples, the base 278 may include one or more sensors (e.g., sensor 284) to detect a presence of any dispensed medication in the tray 282. Likewise, the base 278 may determine the absence of any dispensed medication in the tray 282 based on detection information received from the sensor 284.

In some examples, the base 278 and one or more of the attached medication containers 200 may be connected to a network 286, e.g., via a wired or wireless connection. Moreover, the network 286 may be connected to a server 288. In an example, the base 278 may communicate information regarding the dispensing of medication by the medication containers 200. For example, the base 278 may communicate to the server 288 (e.g., via network 286) that dispensed medication has persistently remained present in the tray 282. Accordingly, the server may notify a doctor or an interested third party that the patient is not taking their medication or may be incapacitated.

Figure 3:
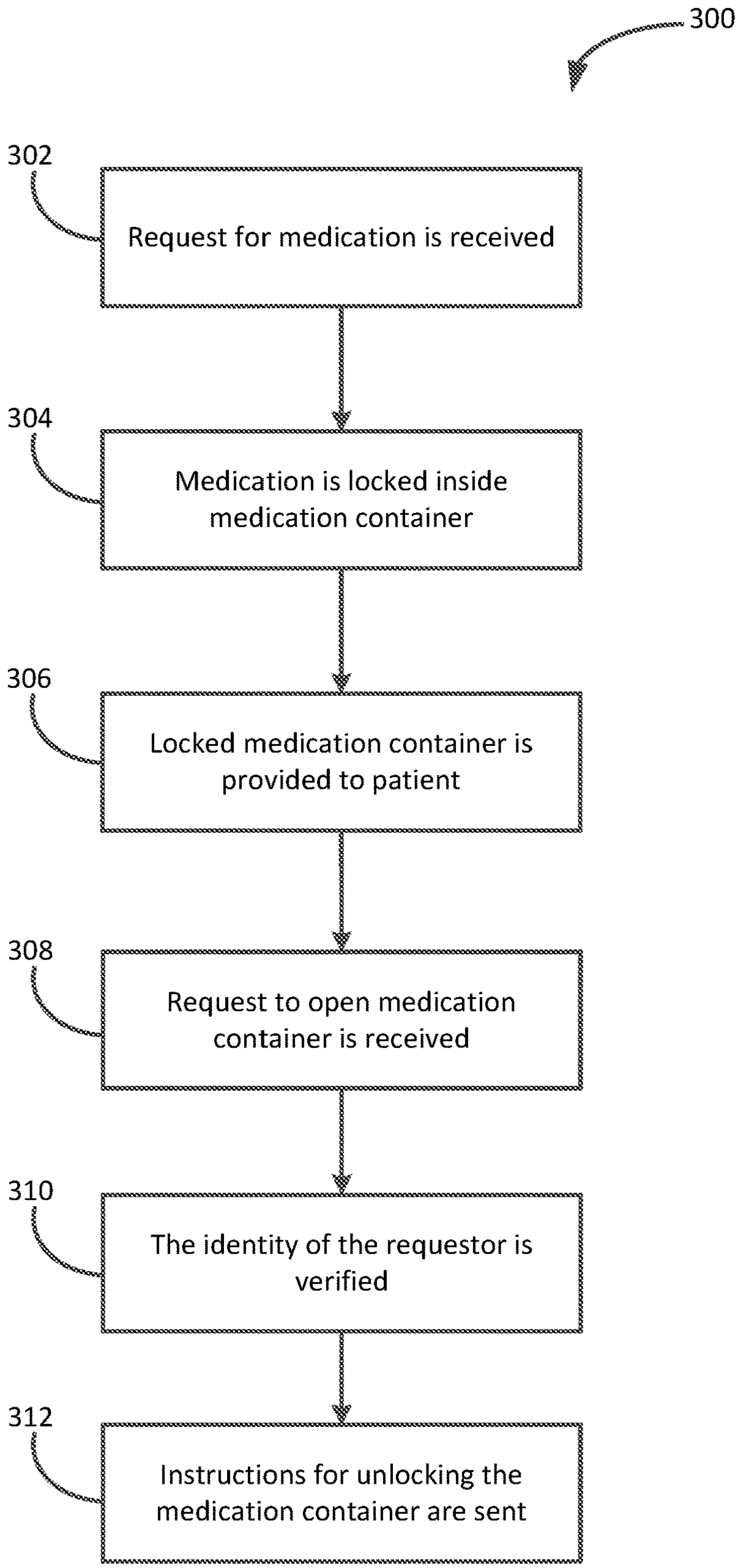
FIG. 3 is a block diagram describing a method for utilizing a medication container according to an embodiment of the present disclosure.

FIG. 3 illustrates an exemplary method 300 of utilizing the medication container 200 to securely provide medication to a patient or caregiver. At step 302, a request for medication is received, such as by a pharmacy or other medication provider. The request may be initiated by a patient or caregiver, for example, the request may include the name (or other identifier) of a medication or a prescription for a medication. For example, if the medication is a nonprescription medication, then the name of the medication may be received. If the medication requires a prescription, then the prescription may be received. The request for the medication may be received by a telecommunication system associated with the pharmacy or other medication provider.

At step 304, medication may be locked inside medication container 200. For example, the medication may be placed inside housing 202 by the pharmacy or other medication provider, including an automated medication dispensing device. The medication may be locked inside housing 202 using locking mechanism 206. For example, after the pharmacy or other medication provider puts the medication into housing 202, the pharmacy or other medication provider may configure or program the locking mechanism 206 with a credential by which locking mechanism 206 may be unlocked by the patient or caregiver. Alternatively, locking mechanism 206 may already be configured with a factory pre-set credential to unlock locking mechanism 206. In either case, the credential to unlock locking mechanism 206 may be recorded (e.g., in a telecommunication system associated with the pharmacy or other medication provider) so that it may later be provided to the patient or caregiver to unlock medication container 200 that is in his or her possession, as will be discussed below.

Further, medication container 200 may be associated with a container identifier (e.g., an alphanumeric code) uniquely identifying the medication container 200. The container identifier may be affixed or otherwise indicated on medication container 200, but is not necessarily so. The container identifier may be used by the pharmacy or other medication provider to identify the particular medication container (e.g., medication container 200). For example, the patient or caregiver may provide the container identifier when he or she contacts the pharmacy or other medication provider to receive the credential to unlock medication container 200, whereby the pharmacy or other medication provider may use the container identifier to look up the credential to unlock medication container 200. Accordingly, the container identifier may be recorded (e.g., in a telecommunication system associated with the pharmacy or other medication provider) in association with the corresponding credential before medication container 200 is provided to the patient or caregiver by the pharmacy or other medication provider.

At step 306, medication container 200, now locked and containing the medication, may be distributed to the patient or caregiver. In the event that the container identifier is not indicated on medication container 200 itself, the container identifier may be separately provided to the patient or caregiver. Thus, the container identifier may serve as an authentication to the pharmacy or other medication provider that the patient or caregiver is authorized to access the medication within medication container 200, as opposed to someone that had just found or stolen medication container 200.

At step 308, a request to gain access to the medication within medication container 200 may be received, for example, by the pharmacy or other medication provider that originally provided medication container 200. This request may, for example, be a telephone call, a text message, an internet request, a request through a smart phone application, or use other type of communication media. In an aspect, the request may include the container identifier, which may be used to determine the credential needed to unlock medication container 200. For example, the pharmacy or other medication provider may use the container identifier in a telecommunication system to cross-reference the container identifier with a table of container identifiers and associated medication container credential, thereby determining the credential for the patient's medication container 200.

At step 310, the identity of the patient or caregiver may be verified, for example, by the pharmacy or other medication provider. The verification may occur via any known methods of authentication, a biometric authentication, receiving answers to previously provided authentication questions, or other similar methods. As another example, the identity of the patient or caregiver may be verified via the patient or caregiver providing the container identifier to the pharmacy or other medication provider.

At step 312, instructions for unlocking medication container 200 may be provided by the pharmacy or other medication provider to the patient or caregiver. The instructions may be provided using various methods, such as text, email, spoken, etc. The instructions may include the credential associated with medication container 200 and usable to unlock locking mechanism 206 of medication container 200. Accordingly, the patient or caregiver may use the provided credential to unlock locking mechanism 206 and access the medication within housing 202.

In an aspect, the prescription may be for medicine that is currently needed, will be needed in the future, or medicine that may conditionally be needed. For example, a traveler may be leaving to visit a foreign country where diseases exist that do not exist in the traveler's country of departure, such as malaria or the zika virus. Further, in the destination country, certain medicines to combat the diseases may not be readily available. The traveler may obtain medication container 200 with the appropriate medicine from his country of departure as a precaution in case he contracts such a disease.

If the traveler does contract one of such diseases, the traveler may then contact the pharmacy or doctor from where he received medication container 200 to inform them that he needs the medicine locked in medication container 200. This may be done if the traveler has a doctor in the destination country diagnose him with the disease, or he may call his doctor in his country of origin and explain his symptoms. Instructions (e.g., the credential to unlock) may then be sent to the traveler for how to unlock the medication container. For example, medication container 200 may contain a combination lock, and the instructions may include the combination.

Sometimes medicines can be highly addictive or powerful substances. In such as case it may be important that the person prescribed the medication only take the medication if it is truly needed or exactly as prescribed so as to avoid abuse or addiction. For that reason, the medicine may be locked in medication container 200.

Verification may be required to ensure that the requestor is the person to whom the medication was issued or prescribed. Verification may be executed in numerous ways. For example, the requestor may be required to provide a spoken password, providing a password via a mobile device, or other similar known methods of providing a verification credential. Biometric verification may also be used, such as a fingerprint reader, eye scanner, voice recognition, and the like.

Figure 4:
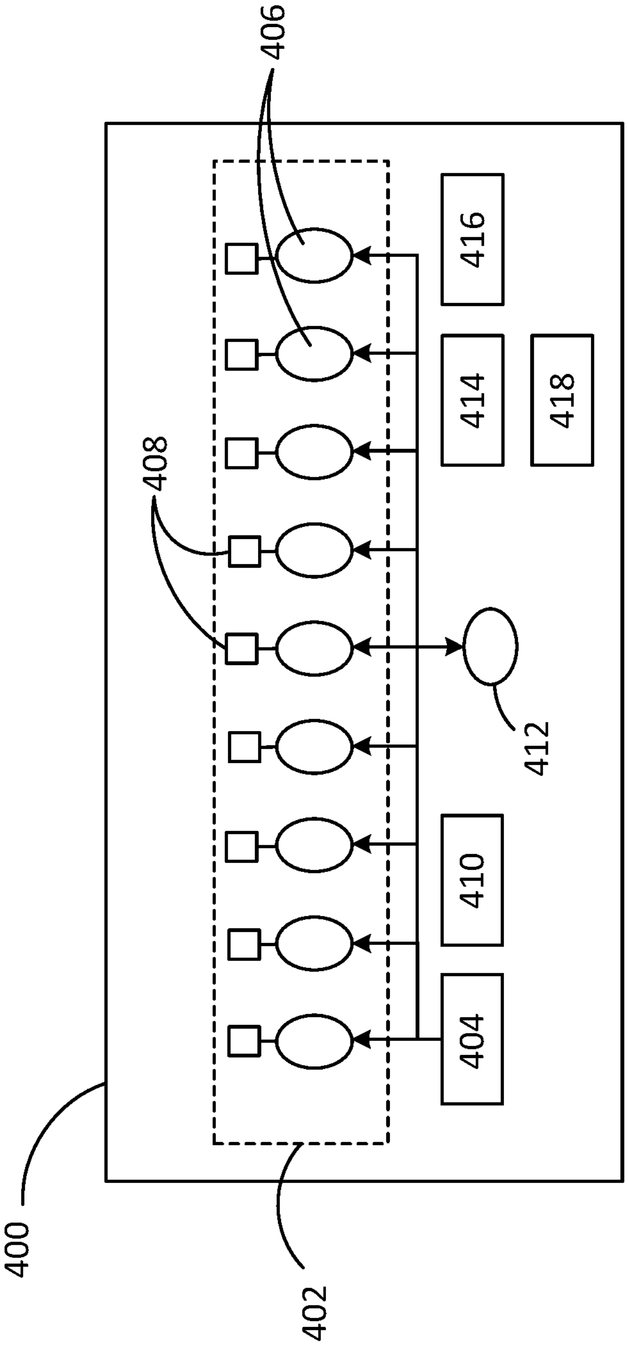
FIG. 4 is example illustration of a medication container according to an embodiment of the present disclosure.

FIG. 4 depicts an alternative embodiment of a medication container. Medication container 400 may include sections for one or more medicines, such as section 402. Section 402 may include a plurality of compartments 406 and one or more locking mechanisms 404404. In an aspect, each compartment 406 is operatively coupled to the same locking mechanism 404 to lock and unlock all, a subset, or just one of compartments 406. Locking mechanism 404 may be programmed or otherwise configured to only open one or a subset of compartments 406 upon entry of a valid credential associated with that one compartment 406 or subset of compartments 406. For example, locking mechanism 404 may be programmed to unlock a first compartment 406 (or a first subset of compartments 406) upon entry of a first credential. Locking mechanism may further be programmed to open a second compartment 406 (or a second subset of compartments 406) upon entry of a second, different credential. In another aspect, each compartment 406 is operatively coupled to a different locking mechanism 404. Medication container 400 may further include at least one destruction mechanism 408.

Locking mechanism 404 may include one or more numbered dials that, when the right combination of numbers is selected, will unlock one or more lockable compartments 406. In another example, locking mechanism includes a series of buttons that, when pressed in the right combination or order, unlock one or more compartments 406. In another example, locking mechanism 404 may be electronic and connected to a network. In another example, locking mechanism 404 may be electronic and connected directly to a mobile device via communication protocol such as Bluetooth® or Near Field Communication (NFC). At a specific time, locking mechanism 404 may receive instructions to unlock a particular compartment 406. Each day a different compartment 406 may be opened. It can be appreciated that there are numerous types of locking mechanisms, as described above, that can be used to lock and unlock compartments 406.

Medication container 400 may be configured with display 410. Display 410 may be any type of known display such as an LED, LCD, or the like. Display 410 may display a credential (e.g., a code) that may be used to unlock locking mechanism 404. The credential may be displayed on display 410 only at specific time intervals. Further, the particular credential displayed during a time interval may only be usable to unlock locking mechanism 404 during that time interval. During a first predetermined time interval, a first unique credential for unlocking a first compartment 406 may be displayed on display 410. During a second predetermined time interval, and a second unique credential for unlocking a second compartment 406 may be displayed on display 410, and so forth. Display 410 may only display a credential for unlocking locking mechanism 404 during the first, second, etc. predetermined time intervals. Outside the first, second, etc. predetermined time intervals, locking mechanism 404 may be deactivated.

In an example, a user may have a prescription to take a medicine twice a day, once in the morning and once in the evening. A first credential may be displayed on display 410 from 8 am-10 am that unlocks a first compartment 406 from 8 am-10 am. A second credential may be displayed on display 410 from Bpm-10 pm that unlocks a second compartment 406 from 8 pm-10 pm. At all other times no credential may be displayed on display 410 and no credentials are valid, preventing any compartment 406 from being opened.

In an aspect, the predetermined time intervals may be set by the pharmacy or other medication provider before the filled medication container 400 is provided to the patient or caregiver. Alternatively, medication container 400 may be connected, via a network (such as network 612 in FIG. 6), to a computing device with an interface (such as medication provider interface 614 in FIG. 6). The computing device may, for example, be associated with a pharmacy that fills medication container 400. Medication container 400 may receive a credential for unlocking locking mechanism 404 from the computing device with instructions to display the credential for a predetermined amount of time or for the predetermined time interval. The computing device may allow pharmacists or doctors to remotely change the accessibility of the medication in medication container 400 as needed.

In one aspect, display 410 may present a notification that locking mechanism 404 is activated to accept a credential (e.g., a biometric identifier) during a time interval, and subsequently grant access to one or more compartments 406 upon the provision of a valid credential. The notification may serve to indicate to the patient or caregiver that he or she should enter a credential input during the indicated time interval. For example, in an embodiment in which locking mechanism 404 comprises a biometric lock, display 410 may provide a notification for a time interval that the patient or caregiver should enter their biometric identifier, such as a fingerprint. If the patient or caregiver successfully provides a valid biometric identifier during that time interval, locking mechanism 404 will unlock one or more compartments 406 and thereby grant the patient or caregiver access to the medication therein. If the patient or caregiver does not enter a valid biometric identifier during the time interval, locking mechanism 404 will be deactivated and no longer accept a biometric identifier, even if otherwise valid, until a next valid time interval begins. A subsequent second time interval may be commenced at which point the locking mechanism 404 may be reactivated to accept a valid biometric identifier and unlock one or more compartments 406. Instructions to commence a time interval and display the notification that locking mechanism 404 is activated to accept a credential and to enter the time interval during which locking mechanism 404 is activated may be provided to medication container 400 via a network connection. For example, a pharmacy or other medication provider may communicate such instructions to medication container 400 over a network.

Display 410 may additionally be used to provide information or a message to the patient or caregiver regarding the medication contained within medication container 400. For example, one technique to prevent a patient from over-consuming or under-consuming a medication is to require the patient to undergo a "pill count," wherein the patient travels to the medication provider and the medication provider observes the number or quantity of medication remaining in the container. To this end, medication container 400 may be configured to receive a message (e.g., the aforementioned pill count request) or other information from the medication provider and display this message on display 410. Medication container 400 may receive the message from a telecommunication system associated with the medication provider over a network (such as network 612 shown in FIG. 6).

Destruction mechanism 408 may be disposed inside or otherwise in association with lockable compartments 406. In an aspect, destruction mechanism 408 may be operatively coupled to lockable compartments 406. Destruction mechanism 408 may be a mechanism that can destroy or other render unusable any medicine disposed in lockable compartments 406. For example, destruction mechanism 408 may house a liquid, such as a spoiling agent, that, when destruction mechanism 408 is activated, may be released into at least one of locking compartments 406 to destroy or render the medication disposed within un-useable. Destruction mechanism 408 may prevent medication housed inside locking compartments 406 from being accessed without locking mechanism 404 being properly unlocked. Destruction mechanism 408 may be activated upon a determination that one or more unauthorized attempts have been made to access the medicine contained within locking compartments 406 or that medication container 400 has otherwise been tampered with. For example, destruction mechanism 408 may be activated upon a determination that an incorrect credential has been entered into locking mechanism 404 a number of times equal to or greater than a predetermined threshold. Destruction mechanism 408 may, in some aspects, be mechanically activated by an improper access attempt. For example, the body of medication container 400 may be configured with destruction mechanism 408 such that if there was a breach or other trauma to the body, destruction mechanism 408 would activate.

Medication container 400 may be further configured with antidote compartment 412, which may contain a medication or other substance that may be an antidote to the medication provided in compartments 406. The antidote provided in antidote compartment 412 is not limited to an antidote, per se, of the medication provided in compartments 406 but may refer generally to a medication or other substance that may be used to counteract or otherwise ameliorate a condition caused by the medications provided in compartments 406. As one example, if compartments 406 provide an opioid pain reliever, antidote compartment 412 may provide naloxone, which may be used to treat opioid overdose. Antidote compartment 412 may be operatively coupled with locking mechanism 404. As such, antidote compartment 412 may be unlocked via input of a credential to locking mechanism 404. For example, medication container 400 may be configured, such as by the pharmacy or other medication provider originally providing the medication container 400, with an antidote credential. If the antidote credential is entered to locking mechanism 404, antidote compartment 412 may be unlocked and accessible. As described above with respect to compartments 406, the antidote credential may be displayed via display 410 for a set time interval and the antidote credential is only valid during that time interval.

Medication container 400 may further be configured with processor 414 and memory 416 communicatively connected to processor 414. Memory 416 may receive, store, and/or provide instructions to effectuate various operations relating to medication container 400. Medication container 400 may also include network interface 418 to effectuate communications with, for example, a telecommunication system associated with the pharmacy or medication provider. Network interface 418 may be embodied as a Wi-Fi_33 interface, a Bluetooth® interface, a cellular interface, or an ethernet interface, as some examples.

In an example, two or more medication containers 400 may be physically attached to each other or to another object (e.g., a medication tray). Moreover, the two or more medication containers may dispense medication into the medication tray at time intervals based on a predefined schedule, e.g., as programmed by a pharmacist when the prescriptions are filled in their respective medication containers (e.g., medication container 400).

In another example, the medication container 400 may be opened by a pharmacist in case of a failure of the medication container 400. For example, a pharmacist may use a backup mechanism (e.g., a specialized tool) to open the medication container 400 and retrieve medication in case of a failure. Moreover, a security seal may be used to identify any unauthorized access or tampering with the backup mechanism.

Figure 5A:
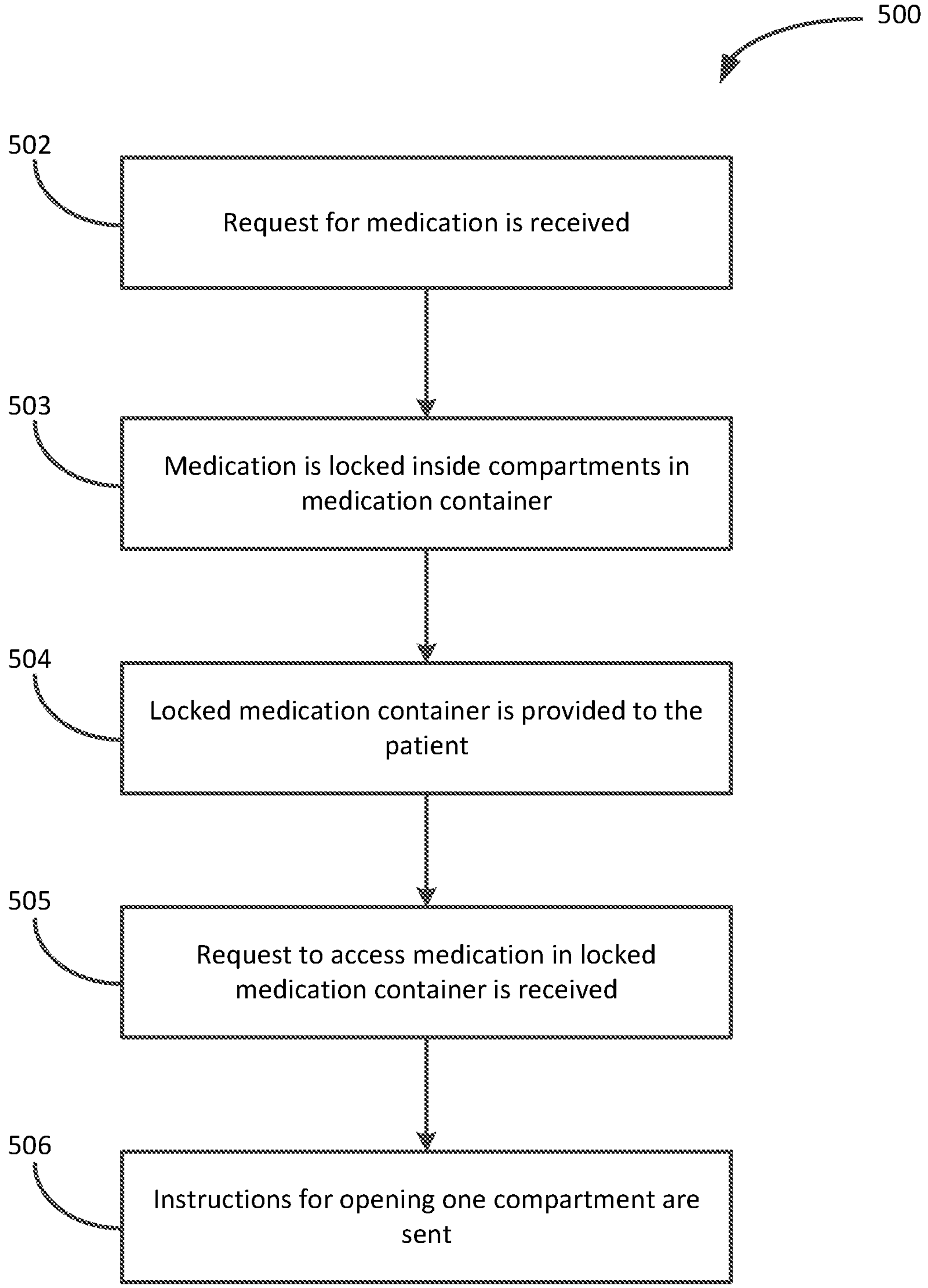
FIG. 5A is an exemplary method for utilizing a medication container according to an embodiment of the present disclosure.

FIG. 5A illustrates a method 500 of distributing medicine utilizing the medication container 400. At step 502, a request for medication may be received by a pharmacy or other medication provider. The request may include a name or other identifier of the medication or a prescription for the medication.

At step 503, the pharmacy or other medication provider may place the medication within compartments 406 of medication container 400 and secure compartments 406 via locking mechanism 404. The pharmacy or medication provider may program or set locking mechanism 404 with or more credential or locking mechanism 404 may already be programmed with one or more pre-set credential. In one aspect, locking mechanism 404 may be programmed with a first credential that, when entered into locking mechanism 404, will unlock a first compartment 406 (or a first subset of compartments 406). Locking mechanism 404 may be further programmed with a second credential that, when entered into locking mechanism 404, will unlock a second compartment 406 (or a second subset of compartments 406). The one or more credential may be recorded by the pharmacy or medication provider so that the one or more credentials may later be provided to the patient or caregiver to unlock one or more of compartments 406. A container identifier uniquely identifying the medication container 400 may be recorded for later reference by the pharmacy or medication provider.

At step 504, medication container 400, now locked and containing the medication, may be provided to the patient or caregiver, such as the patient or caregiver that originally requested the medication.

At step 505, a request to gain access to the medication within medication container 400 may be received, such as by the pharmacy or other medication provider. The request may be to gain access to the medication within one or a subset of compartments 406 of medication container 400. In one aspect, the request may be to gain access to the medication within antidote compartment 412. The request may include the container identifier, which may be used by the pharmacy or medication provider to determine one or more credentials associated with the particular medication container (e.g., medication container 400) identified by the container identifier.

At step 506, instructions for opening one or more compartments 406 are provided by the pharmacy or medication provider to the patient or caregiver. The instructions may include one or more credentials each usable to unlock one or more compartments 406 in medication container 400. For example, a first credential may be provided that, when entered into locking mechanism 404, unlocks a first compartment 406 (or antidote compartment 412). Upon receiving the credential, the patient or caregiver may enter the credential into locking mechanism 404 to unlock the corresponding compartment 406 (or antidote compartment 412) and gain access to the medication therein.

In an aspect, a patient may have a prescription for a medicine that should be taken once a day. Some medicines can be highly addictive or are subject to abuse, and thus need to be monitored. In an example, using medication container 400 from FIG. 4, the prescribed daily dosage of the medication is placed inside each compartment 406. Each compartment 406 may be associated with a different date. On the date associated with the particular compartment 406, instructions may be sent for opening that compartment.

The instructions may be sent in a variety of ways. In an aspect, locking mechanism 404 may be a type of combination lock, mechanical or electronic. The credential for unlocking a particular compartment 406 may be given to the person to whom the medicine is prescribed. The person may then put in the credential to unlock the compartment 406 and retrieve the medicine. Each compartment 406 may have a unique credential so that the person can only retrieve the prescribed amount of the medicine at a given time.

Figure 5B:
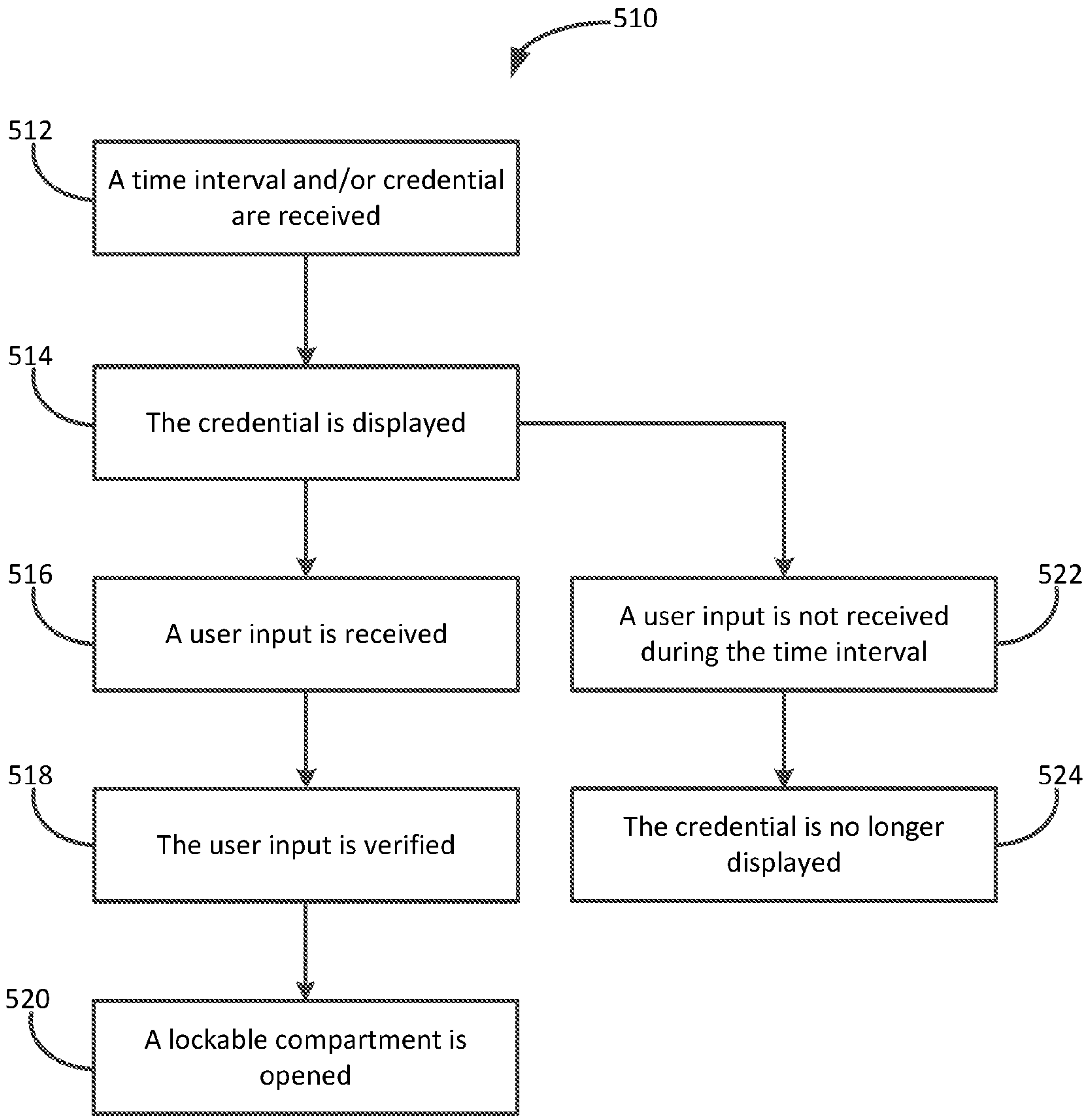
FIG. 5B is a block diagram describing a method for utilizing a medication container according to an embodiment of the present disclosure.

FIG. 5B illustrates a method 510 of distributing medicine utilizing the medication container 400. Method 510 may be performed in conjunction with method 300 described in relation to FIG. 3 and/or method 500 described in relation to FIG. 5A. At step 512, a time interval may be received by medication container 400. During the time interval, an associated credential may be usable with locking mechanism 404 to unlock one or more compartments 406. In some aspects, the credential may be received along with the time interval. In other aspects, the credential may already be stored in memory 416 of medication container 400 at the time that the time interval is received. In yet other aspects, processor 414 of medication container 400 may randomly generate the credential (e.g., an alphanumeric code or password), either before or after the timer interval is received. The time interval and/or associated credential may be received before medication container 400 is provided to the patient or caregiver. For instance, the pharmacy or medication provider may program the locking mechanism 404 of medication container 400 with the time interval and/or associated credential before delivering medication container 400 to the patient or caregiver. Additionally or alternatively, the time interval and/or credential may be received while medication container 400 is possessed by the patient or caregiver. In such a case, the time interval and/or credential may be provided to medication container 400 via a network from a telecommunication system associated with the pharmacy or medication provider.

At step 514, the credential is displayed. For example, the credential may be displayed on display 410 of medication container 400 during the corresponding time interval. An indication of the time interval may also be displayed on display 410. Displaying the credential and/or time interval may serve as an indicator that the patient or caregiver should enter a credential input during the time interval. Following the credential being displayed, a user may potentially provide a user input (e.g., enter a credential, such as a code, via locking mechanism 404). If a user input is received, then steps 516-520 are followed. At step 516, a user input is received by medication container 400, such as via locking mechanism 404. The user input may preferably be the credential displayed on display 410. At step 518, the user input is verified. For example, medication container 400 may verify that the user input matches the credential displayed or that the user input is otherwise valid. Further, medication container 400 may verify that the user input was entered during the time interval associated with that credential. At step 520, responsive to verifying that the provided credential is correct and/or that it was provided during the time interval, locking mechanism 404 may be deactivated or unlocked to open one or more compartments 406 so that medication within may be accessed. If the provided credential was incorrect and/or not provided during the corresponding time interval, locking mechanism 404 remains locked and the user may not access the medication in compartments 406.

Alternatively, if user input is not received in the time interval, steps 522 and 524 are followed. At step 522, the user input is not received during the time interval. For example, the credential may be displayed on display 410 for the time interval, but the user does not input the credential. In step 524, the credential is no longer displayed. For example, when the time interval expires, the credential may no longer be displayed on display 410, disallowing access to medication in lockable compartments 406. Further, the credential corresponding to and previously displayed during the expired time interval is no longer valid to open compartments 406 of medication container 400 upon expiration of the time interval.

In an alternative embodiment of the method 510 shown in FIG. 5B, a time interval (without an associated credential) is received by medication container 400. The credential may already be stored and known by medication container 400 at the time that the time interval is received. Such an embodiment may be particularly useful when locking mechanism 404 is configured as a biometric lock requiring a biometric identifier as the credential. This embodiment may be useful in such a case due to a biometric identifier credential being generally non-communicable, unlike a code or password. In some aspects, the time interval may be received by medication container 400 before medication container 400 comes into possession of the patient or caregiver. For example, a pharmacy or other medication provider may pre-code one or more time intervals into medication container 400 before providing the medication container 400 to the patient or caregiver. In other aspects, the time interval may be received after medication container 400 is possessed by the patient or caregiver. For example, the time interval may be received over a network from a telecommunication system associated with the pharmacy or other medication provider.

Subsequent to receiving the time interval, display 410 of medication container 400 may provide a notification that locking mechanism 404 is active and will unlock one or more compartments 406 upon the input of a valid credential (e.g., a biometric identifier). Display 410 may further indicate the start time, end time, and/or duration of the time interval.

A user input of a credential may be received by locking mechanism 404. If the credential is received (and is valid) within the time interval, locking mechanism 404 may unlock one or more compartments 406 and allow access to the medication therein. If the credential is received outside of the time interval (or is not valid), locking mechanism 404 will not unlock any compartments 406.

Figure 6:
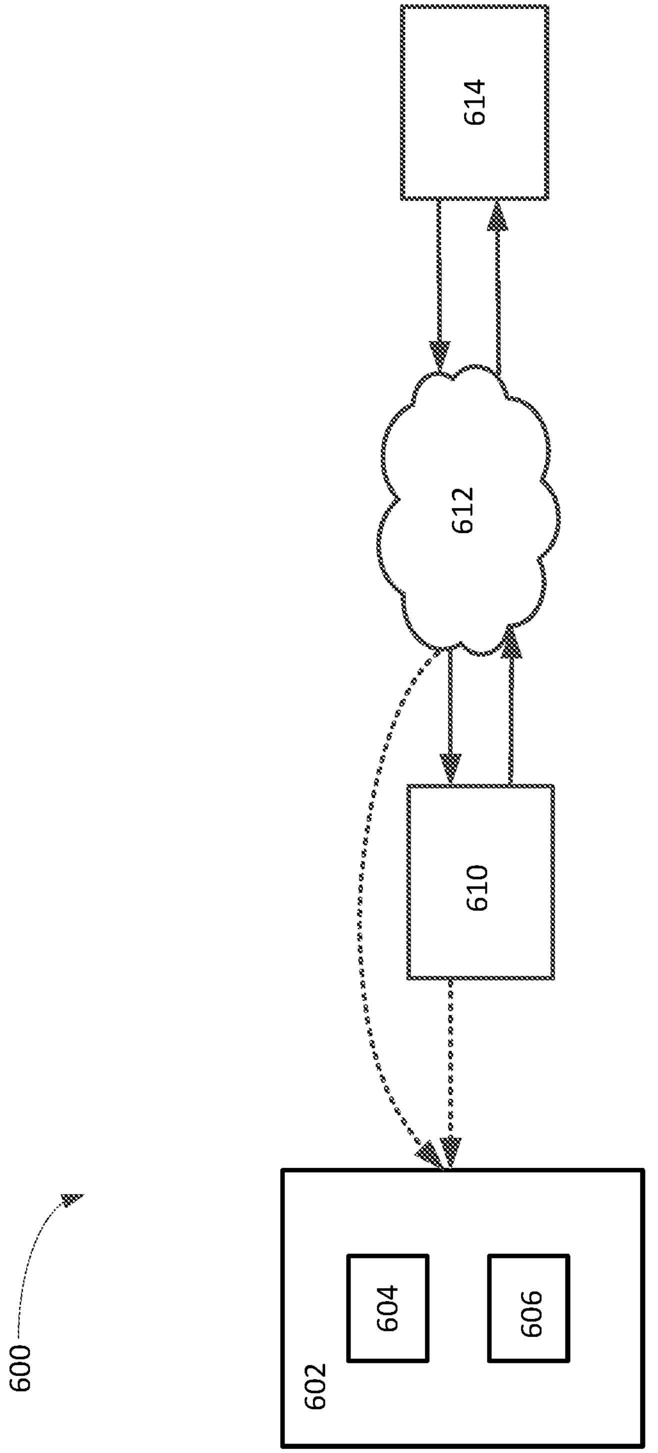
FIG. 6 is an example diagram of a system for dispensing medicine using a medication container according to an embodiment of the present disclosure.

FIG. 6 illustrates a system 600 in which medication container 602 may be used. System 600 may include medication container 602, mobile device 610, network 612, and medication provider interface 614. Medication container 602 may be a medication container as described herein, such as medication dispenser 100 from FIG. 1, medication container 200 from FIG. 2, or medication container 400 from FIG. 4. Medication container may include locking mechanism 604 and compartment 606.

Mobile device 610 may be a device that can connect to a wireless or wired network, such as network 612. In an aspect, mobile device 610 may also be able to connect to medication container 602. Mobile device 610 may be a mobile phone, smart phone, tablet, or other similar device. Mobile device 610 may connect to medication container 602 via a proximity communication protocol such as Bluetooth® or NFC. Network 612 may be any wired or wireless network, such as the Internet, wherein data can be transmitted to and from different devices. Medication provider interface 614 may be an interface that receives requests for the medication and/or provides the means for the requestor to access medication. In an aspect, medication provider interface 614 may be a server or other similar computing device that may be associated with the pharmacy or physician.

In another aspect, a pharmacist or physician (not shown) may place requested medicine (not shown) in compartment 606 of medication container 602. Medication container 602 may be locked using locking mechanism 604. Medication provider interface 614 may receive verification credentials from the pharmacist or physician for accessing the medication. Verification credentials may be, for example, a spoken password, an alphanumeric password, biometric information, a code, and the like. When the requestor needs the medication, the requestor may connect to medication provider interface 614 using mobile device 610 through network 612. Medication provider interface 614 may require a verification credential before providing instructions for opening medication container 602. The requestor may then provide the verification credential to medication provider interface 614 through mobile device 610. For example, the requestor may call the physician or pharmacist with mobile device 610 and provide a spoken password or answer security questions. In another example, mobile device 610 includes a thumbprint reader or another biometric reader, and the biometric information is transmitted to medication provider interface 614 for verification. In yet another example, the requestor may send a text message with a password to medication provider interface 614 for verification. Still yet another example would be an application running on the mobile device that would process verification data and other pertinent information relating to the medical provider, requestor and medication.

Upon verifying the identity of the requestor and/or the identification of the medication container, medication provider interface 614 may provide approval that medication container 602 may be unlocked. Medication provider interface 614 may provide the means or instructions for opening the medication container. For example, if the requestor provides a spoken password over the phone, medication provider interface 614 may provide the requestor with a credential to unlock locking mechanism 604. In another example, medication provider interface 614 may send a credential to mobile device 610 via text, email, or other electronic means. In another example, medication provider interface 614 may be able to connect to locking mechanism 604 through network 612 to unlock medication container 602. In yet another example, mobile device 610 may connect directly to locking mechanism 604 via a proximity communication protocol such as Bluetooth® or NFC to unlock locking mechanism 604. It can be appreciated that there may be a variety of ways within the scope of this disclosure in which medication provider interface 614 may provide the instructions to unlock medication container 602.

The methods as systems described herein may be at least partially implemented as computer-executable instructions. Such instructions may be stored or distributed on computer-readable media, such a memory, including magnetic and optically readable and removable computer disks, hard-wired or preprogrammed in chips (e.g., EEPROM semiconductor chips or ASICs), as well as distributed electronically over the Internet or over other networks (including wireless networks). Computer readable storage media disclosed herein does not include signals.

Figure 7:
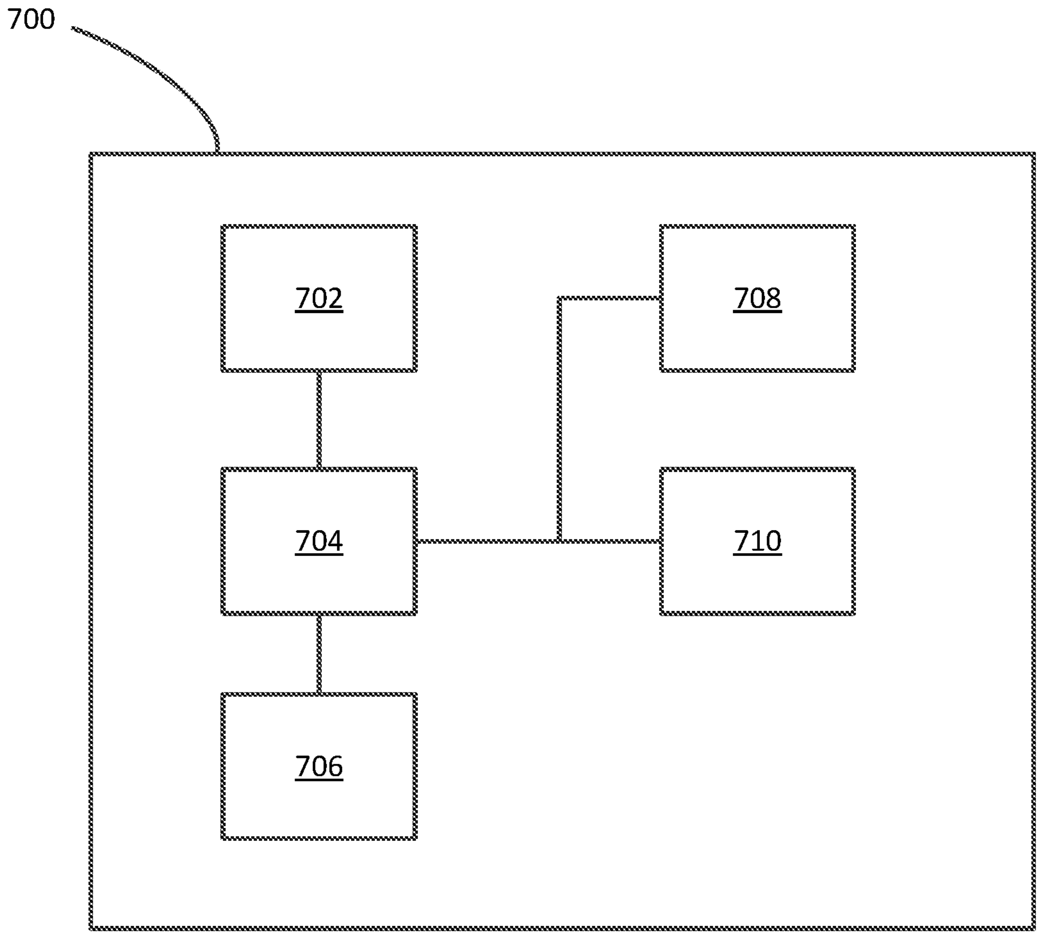
FIG. 7 is a diagram of an example telecommunication system according to an embodiment of the present disclosure.

FIG. 7 depicts a telecommunication system 700 in which the methods and systems described herein may at least partially be implemented. For example, telecommunication system 700 may be incorporated with medication dispenser 100, medication container 200, and/or medication container 400 to facilitate at least some operations disclosed here relating to medication container 200 and/or medication container 400. System 700 may include memory 702, processor 704, transceiver 706, hard drive 708, and power supply 710. Memory 702 may be communicatively coupled to processor 704 and contain instructions for operations for processor 704 to perform. Hard drive 708 and transceiver 706 may be operably coupled to processor 704. Power supply 710 may supply power to processor 704.

Processor 704 may be any type of known processor found in a computing environment that can execute instructions. Memory 702 may be any type of known memory, such as RAM, that can provide instructions for the processor to perform. For example, memory 702 may contain a computer program or code for medication provider interface 614. The computer program or code on memory 702 may provide instructions to processor 704 for executing the operations of medication provider interface 614 as described herein. Hard drive 708 may be any type of known hard drive that can store information, such has a hard disk drive or a solid state hard drive. Transceiver 706 may be any type of known transceiver that can send and receive information wired or wirelessly. For example, transceiver 706 may be an Ethernet port, and Wi-Fi transceiver, and cellular transceiver, and the like. Power supply 710 may be any type of known computing power supply that can supply power to the processor.

Aspect A—Apparatus Features. This disclosure is directed to one or more of the aspects set forth below.

1. A medication dispenser including:

an inner container disposed within the medication dispenser, the inner container configured to securely secure a medication, the inner container having a bottom disposed within the inner container;

a cone having a sloped surface extending upward from the bottom of the inner container, wherein the cone has a cone opening defined therein and wherein the cone is stationary with respect to the inner container;

a rotatable assembly cooperatively connected to base of the inner container, the rotatable assembly configured to rotate with respect to the cone, the rotatable assembly having a well, wherein the well includes an opening defined in the rotatable assembly and wherein the well rotates along with the rotatable assembly, a push wing disposed within the inner container and adjacent to the sloped surface, the push wing configured to rotate with respect to the cone;

a chute extending from the from a bottom of the rotatable assembly;

a reversible motor coupled to the rotatable assembly operable to rotate the rotatable assembly and the push wing.

2. The medication dispenser of aspect 1 wherein the chute is aligned with the cone opening and wherein a medication is dispensed when the well aligns with the cone opening.

3. The medication container of aspect 2 further including a first sensor positioned adjacent to the chute and wherein the first sensor sends a signal to stop the reversible motor when a pill drops into the chute.

4. The medication container of aspect 3 wherein the reversible motor is aligned in a non-operational position when stopped.

5. The medication dispenser of aspect 1 further including an adapter aligned with the cone opening and wherein a size of the adapter are based on one or more dimensions of the medication and wherein the well is periodically aligned with the cone opening as the rotatable assembly rotates.

6. The medication dispenser of aspect 1 wherein the push wing rotates at the same speed as the rotatable assembly.

7. The medication dispenser of aspect 1 wherein a first sensor is configured to sense an increase in amperage being drawn from the reversible motor thereby detecting there is a blockage in the dispensing of the medication and the first sensor sends a signal to reverse a direction of rotation of the reversible motor 8. The medication dispenser of aspect 1 further including an adapter aligned with the cone opening and wherein a size parameter of the adapter is based on one or more dimensions of the medication.

9. The medication dispenser of aspect 8 wherein the medication dispenser is sized based on a number of pills 10. The medication dispenser of aspect wherein the adapter is selected based on the size parameter.

11. The medication dispenser of aspect 9 wherein the size parameter is based on a National Drug Code (NDC) number associated with the medication.

12. The medication dispenser of aspect 11 wherein the adapter is sized based on a template if the NDC number is not associated with a preselected adapter.

13. The medication dispenser of aspect 1 further including an emergency access panel and wherein there is a keyhole positioned behind the emergency access panel.

14. The medication dispenser of aspect 13 wherein the keyhole is configured to cooperatively work with a key to provide access to the medication container.

15. The medication dispenser of aspect 14 further including a foaming module configured to destroy the medication based on unauthorized access and wherein the foaming module is deactivated when a key is used to access the medication container.

16. The medication dispenser of aspect 1 further including an unsecure location separate from the secure location for storing at least one dosage of the medication.

17. The medication dispenser of aspect 1 wherein the medication is dispensed using gravity and the chute between a bottom of the rotatable assembly and an opening in the medication dispenser is where the medication is accessible by a user.

18. The medication dispenser of aspect 17 wherein the chute is coupled to a pill collection tray and wherein the pill collection tray has a second sensor configured to send a signal when the medication is retrieved.

19. The medication dispenser of aspect 18 wherein the pill collection tray is configured to impede access by a child.

20. The medication dispenser of aspect 1 further including an unsecured compartment for dispensing a portion of the medication and wherein the unsecured compartment is configured to impede access by a child.

21. The medication dispenser of aspect 20 wherein a time stamp is generated when the medication is retrieved and wherein a second medication is stopped from dispensing until the medication is retrieved.

22. The medication dispenser of aspect 1 further including a back-up sensor configured to send a signal to stop the motor if the first sensor fails to send a signal to stop the motor if the motor is still engaged.

23. The medication dispenser of aspect 1 further including a physiological monitor, wherein the physiological monitor is one of a pulse oximeter, heart rate monitor, a blood pressure monitor or a temperature monitor and wherein the medication is dispensed based on a reading of the physiological monitor.

24. The medication dispenser of aspect 23 wherein the physiological monitor is integral to the medication dispenser.

25. The medication dispenser of aspect 23 wherein the physiological monitor is separate from and in communication with the medication dispenser.

26. The medication dispenser of aspect 1 further including a lighted keypad configured to receive inputs from a user.

27. The medication dispenser of aspect 26 wherein the lighted keypad also includes braille.

28. The medication dispenser of aspect 26 wherein the user may enter a number associated with a pain scale.

29. The medication dispenser of aspect 1 further including an electronic video screen configured to provide information to the user.

30. The medication dispenser of aspect 29 wherein the information is a prescription label associated with the medication.

31. The medication dispenser of aspect 29 wherein the information is a schedule of prescribed dosages of the medication 32. The medication dispenser of aspect 1 further including a communication module configured to communicate with an external device.

33. The medication dispenser of aspect 32 wherein the medication container has a unique media access control (MAC) address.

34. The medication dispenser of aspect 1 wherein components of the medication container that come in contact with the medication are removable and replacement components are configured to be inserted in place of the inner container.

35. The medication dispenser of aspect 1 wherein the inner container is removable and a top cap and a bottom cap are removable from the inner container and a second top cap and a second bottom cap are connected to the inner container prior to disposing the inner container in the medication dispenser.

36. The medication dispenser of aspect 35 wherein the top cap and the second top cap are configured to impede access by a child.

37. The medication dispenser of aspect 1 further including a transparent window positioned in view of the rotatable assembly.

38. The medication dispenser of aspect 1 further including a label holder.

39. The medication dispenser of aspect 38 wherein the label holder is sized independent of the size of the medication dispenser.

40. The medication dispenser of aspect 38 further including a panel connected to the label holder, the panel having a series of pins attached integrally thereto and wherein the label holder has a series of holes defined therethrough, such that the series of pins aligns with the series of holes and when the panel is pushed into the label holder, the pins are configured to put holes in an attached label.

41. A method including:

receiving, by a lockable medication container, a medication;

receiving authorization credentials input by a pharmacist;

comparing input credentials from a user to the authorization credentials;

if the input credentials match the authorization credentials, granting the user access to the medication, wherein the granting access step includes dispensing a dosage of the medication to the user.

42. The method of aspect 41 wherein the dispensing a dosage step includes rotating a push wing disposed within the lockable medication container and a rotatable assembly connected to a bottom of the lockable medication container, wherein the push wing and rotatable assembly rotate with respect to a cone having a sloped surface and an opening defined therein, and wherein the rotatable assembly has a well, wherein the well includes an opening defined in the rotatable assembly, and wherein the well rotates along with the rotatable assembly, and wherein the well is periodically aligned with the chute as the rotatable assembly rotates, wherein the medication is dispensed through the chute when the well is aligned with the chute.

43. The method of aspect 42 wherein the lockable medication container includes a reversible motor, and wherein the push wing and rotatable assembly rotates based on power supplied by the reversible motor.

44. The method of aspect 43, wherein the reversible motor rotates the rotatable assembly in one direction, and if the medication to be dispensed is caught in the well, the reversible motor rotates the rotatable assembly in the opposite direction.

45. The method of aspect 43 wherein the reversible motor rotates in a direction determined by a sensor.

46. The method of aspect 41 wherein the sensor detects an increase in amperage and reverses the direction based on the increase in amperage.

Aspect Set B—Security System for a Locking Medication Container

47. An apparatus for dispensing medication including:

a lockable medication dispenser having a medication storage compartment and a lockable cover, the lockable medication dispenser configured to secure medication inside the storage compartment and to prevent unauthorized access to the medication;

a security system in associated with the lockable medication dispenser;

a sensor operable in conjunction with the security system;

a foaming module in communication with the lockable medication dispenser, wherein the foaming module includes at least two pouches, each of the two pouches containing a separate chemical; and wherein, upon detection of a breach of the security system, the foaming module is configured to release each of the separate chemicals into a combination chamber and then into the medication storage compartment, wherein a combining of each of the separate chemicals and the medications renders the medications unusable.

48. The apparatus of aspect 47 wherein the sensor detects a break in a wire disposed within the medication storage compartment.

49. The apparatus of aspect 47 wherein the sensor is an optical sensor configured to detect when a lever within the lockable medication dispenser is moved.

50. The apparatus of aspect 47 wherein a breach of the security system generates an alarm.

51. The apparatus of aspect 51 wherein the alarm is transmitted to a third party.

52. The apparatus of aspect 47 wherein the security system includes a tamper resistant cover having one-way tabs that disconnect from the cover when pried open, wherein disconnect tabs indicates a breach.

53. The apparatus of aspect 47 wherein the security system includes a continuous wire extending around a perimeter of the medication storage compartment and a power source in communication with the continuous wire and the sensor, and wherein the sensor is configured to detect a breach if the continuous wire is broken.

54. The apparatus of aspect 47 wherein the security system includes a set of diagnostic procedures and a critical failure of the diagnostic features considered a breach of the security system.

55. The apparatus of aspect 47 wherein the sensor monitors a battery compartment associated with the lockable medication dispenser and an opening of the battery compartment is considered a breach.

56. The apparatus of aspect 47 wherein the security system includes a use-by date by which the medication should be used and wherein the security system compares current date information to the use-by date, and if the current date information is later than the use-by date of the medication, the security system determines a breach has occurred.

57. The apparatus of aspect 47 wherein if a breach is detected, the dispenser is disabled and the foaming module is not activated.

58. The apparatus of aspect 47 wherein the security system includes a continuous wire extending around a perimeter of the medication storage compartment and a power source in communication with the continuous wire and the sensor, wherein the dispenser includes a first material and wherein the continuous wire is enclosed in a second material, and wherein the first material and the second material have different hardness properties.

59. The apparatus of aspect 47 wherein the foaming module is configured to be removed and replaced with a new foaming module.

60. The apparatus of aspect 59 wherein the foaming module is removed based on an expiration date of one or more of the separate chemicals.

61. A method including:

Securing a medication in a lockable medication dispenser;

Activating a sensor associated with the lockable medication dispenser, wherein the sensor is configured to monitor integrity of the lockable medication dispenser and wherein the sensor is in communication with a foaming module;

Sensing a breach in the integrity of the lockable medication dispenser;

Releasing a first chemical from the foaming module based on the sensing step, wherein the chemical interacts with the medication to render the medication unusable.

62. The method of aspect 61 further including a second chemical and the releasing step includes releasing the first chemical and the second chemical, and wherein a combination of the first chemical and the second chemical interacts with the medication to render the medication unusable.

63. The method of aspect 62 wherein the sensing step includes a continuous wire disposed in a circumference around the medication dispenser and the breach is a break in the wire.

64. The method of aspect 62 wherein the sensing step includes a continuous wire disposed around a battery compartment and the breach is a break in the wire.

65. The method of aspect 62 wherein the sensing step includes an opening of the medication dispenser using unauthorized credentials.

66. The method of aspect 62 wherein the sensing step includes a break in a medication storage compartment in the lockable medication dispenser.

67. The method of aspect 62 wherein the sensing step includes a failure of a set of diagnostic procedures associated with the lockable medication dispenser.

68. The method of aspect 62 wherein the sensing step includes comparing a use-by date of the medication to a current date and if the current date is after the use-by date, then performing the releasing step.

Aspect Set C—Portal for Using A Lockable Medication Container

69. A method including:

a. receiving a prescription for a medication from a health care provider for the patient;

b. accessing a profile of a patient from a dashboard on a portal, wherein the portal is connected to a database and a computer program; wherein the profile includes patient data;

c. accessing a health care provider profile through the portal, wherein the health care provider profile includes privileges associated with the health care provider for each medication dispenser based on medication and patient profile;

d. entering the prescription specifying the medication into the database through the portal;

e. entering, by the pharmacist, into the portal, instructions on dispensing the medication based on the prescription [or recommendations by the doctor]

f. providing parameters of the medication dispenser to the pharmacist, the parameters including a size of the locking medication container and a size of an adapter based on the identification of the medication and the prescription g. loading medication in the medication dispenser pursuant to instructions;

h. connecting the medication container to the portal; and i. automatically configuring the medication container for distribution of the medication to the user using an identification of the medication and the health care provider profile and the instructions.

70. The method of aspect 69 wherein the instructions comprise instructions for disposing the medication in the locking medication container and disposing the medication in an unsecure compartment in a locking medication dispenser.

71. The method of aspect 70 wherein the instructions comprise disposing a majority of the medication in the locking medication container and disposing a minority of the medication in the unsecure department.

72. The method of aspect 69 wherein the instructions are based on recommendations from the physician or health care provider.

73. The method of aspect 69 further including placing the locking medication container is placed in set-up mode.

74. The method of aspect 73 wherein the set-up mode includes generating user credentials and associating the user credentials with the medication dispenser.

75. The method of aspect 74 wherein the user credentials comprise one of access codes, biometric detection, and override codes.

76. The method of aspect 69 wherein the medication container is in communication with the portal.

77. The method of aspect 76 further including generating an alert when the medication is dispensed to the user.

78. The method of aspect 77 further including receiving, through the portal, the alert when a medication is dispensed to the user and when the medication is retrieved.

79. The method of aspect 76 further including receiving, through the portal, an indication of an unauthorized attempt to access the medication and disabling the access credentials through the portal if a number of unauthorized attempts exceeds a threshold number.

80. The method of aspect 75 further including resetting, through the portal, updated access credentials and providing the updated access credentials to a user.

81. The method of aspect 69 further including authenticating, through the portal, the health care provider prescribing the medication by comparing the health care provider credentials to a set of stored credentials in the database.

82. The method of aspect 81 wherein for a first-time authentication, the health care provider supplies a secure personal identification number accessible by the pharmacist, and wherein the first-time authentication is based on the pharmacist entering the personal identification number.

83. The method of aspect 69 wherein configuring the locking medication dispenser further includes setting one or more attributes of the locking medication dispenser based on a nature of the medication and preferences of the health care provider.

84. The method of aspect 83 wherein the one or more attributes includes a dispensing schedule having a periodic dispensing schedule or a dispensing schedule based on a request.

85. The method of aspect 83 wherein the one or more attributes includes adding a foaming module configured to destroy the medication upon a breach of the locking medication dispenser.

86. The method of aspect 85 wherein an indication that the medication was destroyed is received through the portal.

87. The method of aspect 83 wherein the one or more attributes include audio or visual alerts when the medication is dispensed.

88. The method of aspect 83 wherein the one or more attributes include audio or visual alerts when the medication is retrieved.

89. The method of aspect 88 further including generating a time stamp associated with the retrieval of the medication.

90. The method of aspect 69 wherein the locking medication container is locked or unlocked through the portal by an authorized individual.

91. The method of aspect 90 further including permitting the locking medication container to be unlocked by the authorized individual on an emergency basis.

92. The method of aspect 91 wherein the manner for locking and unlocking the locking medication container comprise one of entering a credential or receiving a remote signal.

93. The method of aspect 69 wherein the patient data includes the patient's current or past medicines and the patient's medicine allergies, if any.

94. The method of aspect 69 further including placing the locking medication container is performed in a set-up mode and once the set-up mode is completed, the locking medication container transitions to a demonstration mode.

95. The method of aspect 94 wherein the demonstration mode includes the user performing steps to use the locking medication container and accessing dispensed medication.

96. The method of aspect 95 wherein a message is uploaded to the portal upon successful completion of a demonstration performed in the demonstration mode.

96. The method of aspect 69 wherein an inventory of components of the medication dispenser is presented on the portal.

97. A method including:

generating credentials to access a lockable medication container, wherein the credentials include a demonstration credential for operation of the lockable medication container in a demonstration mode;

receiving, through the portal, confirmation that the user has completed operation of the lockable medication container in the demonstration mode; and if the user successfully completed the demonstration mode, providing authorization credentials through the portal for use of the lockable medication container in an operational mode.

98. The method of aspect 97 wherein the demonstration mode includes use of the lockable medication container using placebos in place of a medication.

99. The method of aspect 97 wherein the demonstration mode includes use of the lockable medication container using a real medication.

100. The method of aspect 97 wherein the demonstration mode includes instructions on accessing a medication using pharmacist supplied credentials.

101. The method of aspect 97 wherein the demonstration mode is performed by a customer.

102. The method of aspect 69 wherein there is a common database accessible through the portal and the common database includes data from a plurality of pharmacies, a plurality of health care providers and a plurality of users.

Aspect Set D—A System of Medical Lockable Containers and Methods of Use Thereof

103. A system including:

(a) a first locking medication dispenser including:

a first outer container;

a first inner container configured to be disposed within the first outer container and further configured to receive a first medication; and a first rotatable assembly connected to a bottom of the first inner container, the first rotatable assembly having a hole defined therein, the hole referred to as a first well, and wherein the first well rotates with the rotation of the first rotatable assembly;

(b) a second locking medication dispenser including: a second outer container"

a second inner container configured to be disposed within the second outer container and further configured to receive a second medication; and a second rotatable assembly connected to a bottom of the second inner container; the second rotatable assembly having a hole defined therein, the hole referred to as a second well, and wherein the second well rotates with the rotation of the second rotatable assembly;

(c) a base, wherein the base is coupled to the first locking medication dispenser and the second locking medication dispenser, wherein the base has a first chute defined therein coinciding with a location of the first inner container and a second chute defined therein coinciding with a location of the second inner container, wherein the first chute is periodically positioned under the first well when the first rotatable assembly is rotating and the second chute is periodically positioned under the second well when the second rotatable assembly is rotating.

104. The system of aspect 103 wherein the base is configured to supply power to the first medication dispenser and the second medication dispenser.

105. The system of aspect 103 wherein the first opening in the base and the second opening in the base are sized to accommodate a maximum size of the first medication and the second medication.

106. The system of aspect 105 wherein the first opening in the base and the second opening in the base are in communication with a common chute in the base to provide access to the first medication and the second medication to a user.

107. The system of aspect 106 wherein the common chute opens to a common pill dispenser box.

108. The system of aspect 107 wherein the common chute has a sensor disposed therein and wherein the sensor is configured to detect when the first medication or the second medication is retrieved.

109. The system of aspect 108 wherein the first medication is retrieved prior to the second medication being dispensed.

110. The system of aspect 109 further including a notification generated when the first medication is retrieved and wherein dispensing a second medication is contingent on receipt of the notification by the second lockable medication dispenser that the first medication has been retrieved.

111. The system of aspect 108 wherein the first medication and the second medication are dispensed prior to either the first medication or the second medication being retrieved.

112. The system of aspect 109 wherein a time stamp is generated when the first medication is retrieved and when the second medication is retrieved.

113. The system of aspect 103 wherein the first locking medication dispenser and the second locking medication dispenser are operated independently.

114. The system of aspect 103 wherein the first locking medication dispenser and the second locking medication dispenser are operated in tandem, wherein dispensing a first medication is coordinated with dispensing a second medication.

115. The system of aspect 103 wherein the base includes a base controller that is communication with the first locking medication dispenser and the second locking medication dispenser.

116. The system of aspect 115 wherein the base controller coordinates the dispensing of the first medication and the second medication based on the prescription indicating a time interval between medications.

117. The system of aspect 115 wherein the base controller coordinates the dispensing of the first medication and the second medication based on the prescription indicating interactions between the first medication and the second medication.

118. The system of aspect 103 wherein the first locking medication dispenser and the second locking medication dispenser are stackable one on top of the other.

119. The system of aspect 103 wherein there in no chute if the first medication container or the second medication container is positioned directly on the base.

120. The system of aspect 103 wherein the base is rotatable.

Aspect Set E—Communication System for a Locking Medical Container

121. A system for dispensing medication including:

a lockable medication dispenser having a medication storage compartment and a lockable cover, the lockable medication dispenser configured to secure medication inside the storage compartment and to prevent unauthorized access to the medication;

a first sensor integrated into the medication dispenser, wherein the sensor is configured to detect when a medication has been retrieved from the medication dispenser;

and a storage medium for recording data generated by the at least one sensor; and a communications module integral to the medication dispenser in communication with the first sensor and the storage medium, wherein the communications module includes a transceiver configured to communicate with an external device, and wherein the communications module receives a first signal from the sensor that the medication has been retrieved and applies a time stamp indicative of when the medication has been retrieved to create dispensing data, and wherein the dispensing data is stored in the storage medium.

122. The system of aspect 121 wherein the external device is one of a smart phone, tablet, or personal computer of a user and wherein a communications protocol is one of either Bluetooth, Wi-Fi, or near field communications.

123. The system of aspect 122 further including an application running on one of the smart phone, personal computer, or tablet, wherein the application is programmed to receive the dispensing data.

124. The system of aspect 121 further including a global positioning system associated with the medication dispenser.

125. The system of aspect 124 further including an application running on one of the smart phone, personal computer or tablet, and wherein the communications module transmits a position of the medication container to the application.

126. The system of aspect 121 wherein the communications module is configured to transmit data to a pharmacy computer system when the medication container is in proximity to the pharmacy computer system or a physician computer system.

127. The system of aspect 126 wherein the data is transmitted through one of Bluetooth®, Wi-Fi or near field communications protocols.

128. The system of aspect 121 wherein the communications module includes cellular communication functionality and wherein the communication module transmits data to a remote computer system using the cellular communication functionality.

129. The system of aspect 128 wherein the remote computer system is either a pharmacy computer system or a health care provider computer system.

130. The system of aspect 121 further including a security system and a second sensor operable in conjunction with the security system, and wherein the communications module is further configured to receive a second signal from the second sensor and store the second signal in the storage medium.

131. The system of aspect 130 wherein the second sensor is configured to detect a security breach and the second signal is indicative of a security breach to form security breach data.

132. The system of aspect 131 wherein the first signal and the second signal are transmitted to an application running on a smart phone, tablet or personal computer.

133. The system of aspect 121 wherein the communications module is configured to transmit dispensing data and security breach data to a remote computer system when the medication container is in proximity to the remote computer system.

134. The system of aspect 133 wherein the data is transmitted through one of Bluetooth®, Wi-Fi or near field communications protocols to a pharmacy computer system or a healthcare service provider.

135. The system of aspect 121 wherein the communications module includes cellular communication functionality and wherein the communication module transmits the dispensing data and security breach data to a pharmacy computer system or a healthcare provider computer system using the cellular communication functionality.

136. The system of aspect 135 wherein the dispensing data and security breach data is accessible through a portal.

137. The system of aspect 121 wherein each medication container has a unique identifier and unique media access control address.

138. The system of aspect 121 wherein the communication module includes a wireless communication module.

139. The system of aspect 121 wherein the communications module includes a wired communication module.

140. The system of aspect 121 further including a module configured to detect anomalies, and wherein the communication system is configured to transmit anomalies to a remote computer.

141. The system of aspect 140 wherein the anomalies comprise not accessing the medication in accordance with the schedule.

142. The system of aspect 140 wherein the anomalies comprise physiological anomalies related to the user, wherein the physiological anomalies are based on one of a pulse oximeter reading, a blood pressure reading, a temperature reading or a heart rate reading.

143. The system of aspect 121 further including a second lockable medication container and wherein the communications system is in communication with the lockable medication container and the second lockable medication container.

144. The system of aspect 121 wherein the communication module is controllable from an application running on a tablet, smart phone or personal computer.

145. The system of aspect 121 further including an electronic screen attached to the locking medication container and wherein the communication module is configured to receive data for display on the electronic label.

146. The system of aspect 145 wherein the data is instructions for taking the medication.

147. The system of aspect 145 wherein the data is an electronic label.

148. The system of aspect 121 wherein the first sensor is further configured to record a deviation from a frequency of the medication.

149. The system of aspect 148 wherein the deviation is reported to a pharmacy or a health care provider by the communications module.

According to some examples, a process for a patient to obtain medication from a prescription securing device includes a patient receiving for a prescription for a medication (e.g., a narcotic). For example, the patient may receive a paper, call-in, or electronic prescription from a medical doctor. IN an example, the prescription may be received through or from a website, e.g., rx.com, hosted by a server. In an example, the patient may register for a website or log into a server, e.g., creating a username and password linked to user or patient information (e.g., personal information, insurance information, health information, prescription history, etc.).

In some examples, the pharmacist may manually enter the patient's information into a pharmacy database and, in other examples, some or all of the patient's information may be transferred from the patient's profile or patient database to a pharmacy database (e.g., website, server, cloud-based storage, etc.). The pharmacy database may also store one or more credentials associated with the pharmacist, including pharmacist/pharmacy license numbers, DEA registration numbers, etc.

According to some examples, several different types of disposable or replaceable parts may be available. For example, each type of disposable or replaceable part may be sized or optimized for a particular size or shape (e.g., a range of sizes and shapes) of medications. For examples, a disposable or replaceable part may be specified for or used with medication such as pills having a diameter within a specific range of diameters. Moreover, the medications that are compatible with a specific disposable or replaceable part may be identified based on attributes such an name or National Drug Code (NDC) number. For example, a pharmacist may log into a database and, based on an NDC number associated with a prescribed medication, determine which disposable or replaceable part is compatible with the medication. The database may inform the pharmacist whether that disposable or replaceable part is in stock or whether another disposable or replaceable part may be used as an alternative (e.g., based on the size or shape of the pill or medication).

In some examples, information associated with the patient, subscription, or prescription is transferred to the secured medication container. For example, the pharmacist may transfer patient information (user id, password, etc.), prescription information (e.g., medication name or type, dosage schedule, etc.) to the container via Bluetooth. Moreover, the container may determine a schedule of medication based on the transferred information.

In some examples, the secure prescription container may be assigned a unique identifier. For example, the unique identifier may be used to distinguish a secure prescription container from a group of other secure prescription containers. In some examples, a user or the pharmacist may assign one or more fingerprints of the user to the secure medication container. Moreover, an override such as a keycode or passcode may be assigned to the secure medication container. For example, the override may be used by a patient or pharmacist in the event that the fingerprint scanner is inoperable.

In some examples, a database (e.g., pharmacy database, database associated with the container, etc.) may store information regarding the number of pills prescribed on stored in the secured medication container (e.g., secured or unsecured). Moreover, the database may include information regarding how many unsecured pills are provided by the pharmacist.

In some examples, a test scenario may be performed with a patient or recipient of the secure medication container. For example, a pharmacist may instruct or observe a user or patient as they operate the secure medication container. For example, the user or patient may place or swipe their finger across the fingerprint scanner, the device may match the fingerprint of the user to a stored fingerprint scan (e.g., stored locally on a memory of the secure medication container or on a remote server), and then the user my press a dispense button or otherwise instruct the medication container to dispense a dose of the medication. Moreover, after confirming that the patient has successfully dispensed the medication, the pharmacist may add the dispensed medication to the unsecured pouch or an unsecured medication bottle.

In some examples, two or more secured containers may be linked automatically (e.g., based on a connection to a database, server, cloud system, etc.) or linked manually (e.g., by a doctor or pharmacist). For example, two containers may be assigned to a particular user or patient and may coordinate dispensing of medication based on relative information, including minimizing drug interactions or side effects and maximizing efficacy of the medications. Moreover, one or more medications may not be dispensed or not be dispense within a specific time period based on negative drug interactions (e.g., no simultaneous dispensing opioids and benzodiazepines).

In some examples, the patient may be limited in the number of attempts to receive medication from the secured container, e.g., a particular number of fingerprint scans or override code attempts. In an example, a user may be prompted for an override code after three or more failed fingerprint scans. Moreover, a user may be directed to take the unsecured medication and contact their pharmacist after repeated failed attempts.

In some examples, the user or patient may access a website or download an application to a device (e.g., a laptop, desktop, mobile computing device, etc.). For example, the application may provide directions to the user or patient, such as when to take medication. Moreover, the application may collect information, such as when the patient attempts to receive medication or how often the patient receives the medication. In some examples, the device my poll the user to determine a state of the user (e.g., pain, awareness, etc.). For example, the device may require the user to perform an action (e.g., copying or entering a code) to determine a state of awareness, comprehension, etc. of the user.

In some examples, the user or patient may use the application to access the medication stored in the secured container. For example, a user device running the application may be connected to the secured container via a wired or wireless connection. The application may prompt the user for a passcode or to scan their fingerprint and direct the secured container to dispense the medication based on satisfying the security protocols of the application.

In some examples, the user may receive notifications regarding the medication of the secured container or any linked containers. For example, the user may be notified by the container, an application (e.g., a push notification), website, or database associated with the container, or by email or text message when to one or more medications are ready or appropriate to be dispensed (e.g., based on the prescribed time interval of the medication or to minimize interactions of multiple medications).

In some examples, a physician or pharmacist may receive information from the medication container. For example, the pharmacist or physician may access information stored on a server or obtained directly from the device (e.g., via wired or wireless transmission). For example, a physician may wirelessly receive information from the device when a patient brings the device into the physician's waiting area. Physician or pharmacist information may include data relating to the patient or user's interactions with the device. For example, the pharmacist or doctor may obtain information including frequency, dates, or times that the patient received medication, as well as how the medication was unlocked (e.g., via fingerprint or unlock code). Other information may include the number or amount of medication that has been taken, as well as a number or amount of unused medication (e.g., secured or unsecured).

In some implementations, the data associated with the use by the patient may be analyzed to determine a future prescription plan or patient care plan. For example, analysis of the information (e.g., by a processor of the secured device or a processor connected to a database containing the information) may determine that the user may have sold the bottle based on a low percentage of fingerprint scanner use and a corresponding high percentage of override code use. Moreover, analysis of the information may show that the user does not need to be prescribed the same amount of medication, e.g., based on an identification that the user routinely uses the medication less frequently that prescribed.

In some examples, the data associated with the user by the patient may be analyzed to identify a particular trend associated with the patent's use of the medication. For example, it may be identified that the patient repeatedly requests dispensing of medication prior to the earliest time the medication is available (e.g., based on the prescribed time interval). As another example, it may be determined that the patient is developing a dependency on a medication (e.g., an opioid) if the patient repeatedly requests medication prior to a period of availability (e.g., prematurely based on the prescribed dosage and timing).

In some examples, the data associated with the user may include any deviations from a prescribed prescription plan, e.g., requesting medication more or less frequently than described. Moreover, in some examples, the data associated with the user may include a pattern with respect to the prescribed prescription plan, e.g., medication requested more or less often than prescribed at specific points in the day. Moreover, the data may include data points or trending associated with use of any unsecured medication. For example, a pattern of depleting all available unsecured pain medication may be indicative of a possible dependency on the pain medication.

In some examples, the secure medication container may include a GPS location or tracking device. For example, the information seen by a doctor or pharmacist may include a GPS location of the user at the time. Moreover, in some examples, a user may be informed (e.g., via email, text message, push notification, etc.) to take a medication based on a location of the user. For example, certain medications such as pain killers may be preferable to take at a user's home address.

Figure 8:
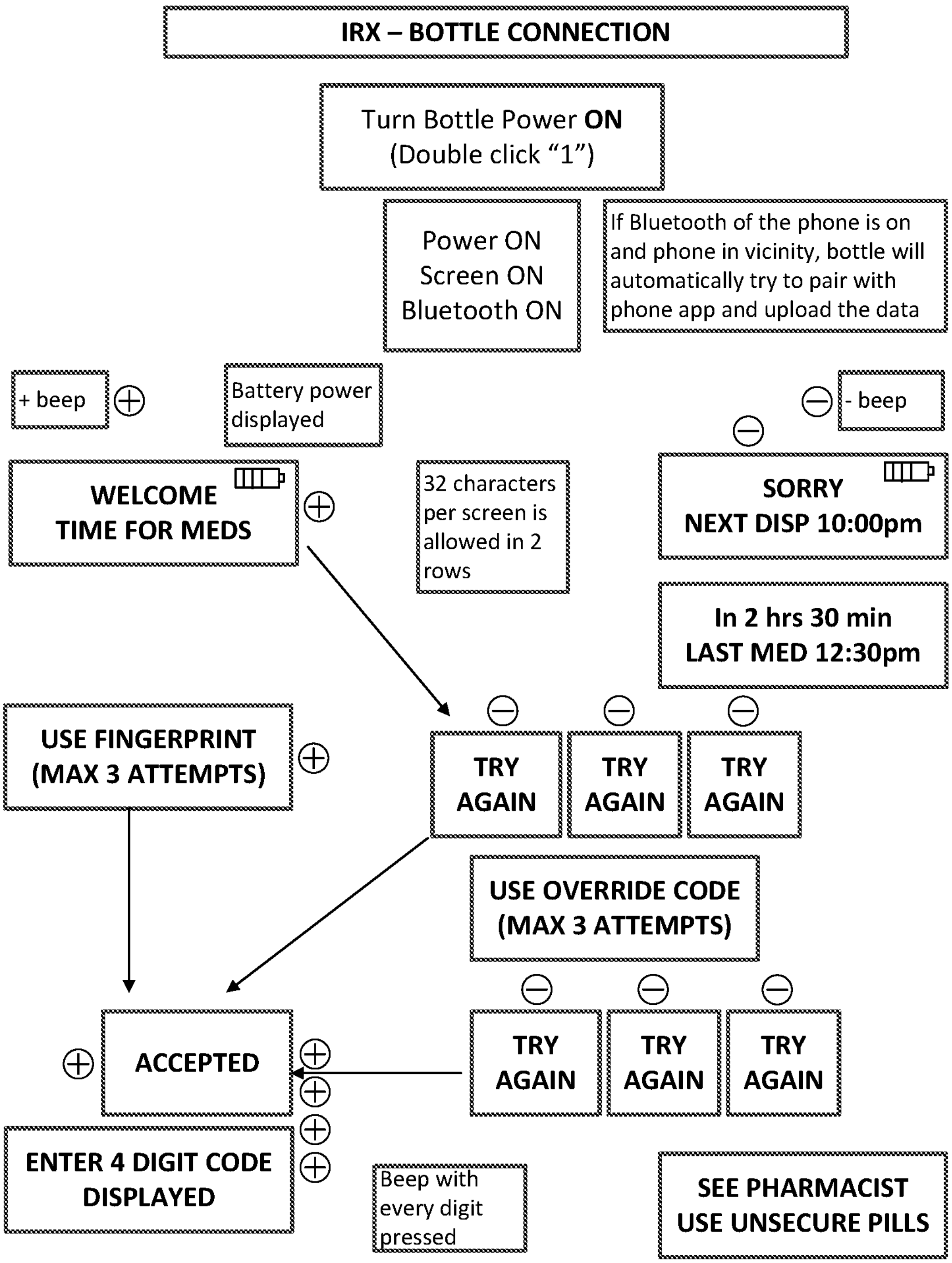
FIG. 8 is a block diagram illustrating logic employed by a medication container according to an embodiment of the present disclosure.

As shown in FIG. 8, an illustrative medication container may be turned on (e.g., by double clicking an alphanumeric input). For example, when the medication container is turned on, the screen may also turn on. Moreover, the medication container may automatically attempt to pair with a user's phone or computing device (e.g., via Bluetooth or other wireless connection). The medication container may communicate with the user via text on the screen, audible beeps, etc. For example, the medication container may inform the user when an incorrect fingerprint has been entered or may prompt the user for an override code. If the user is unable to operate the medication container (e.g., failed fingerprint scans or failed override code attempts), the medication container may prompt the user to contact a pharmacist and use unsecured pills in the meantime.

Figure 9:
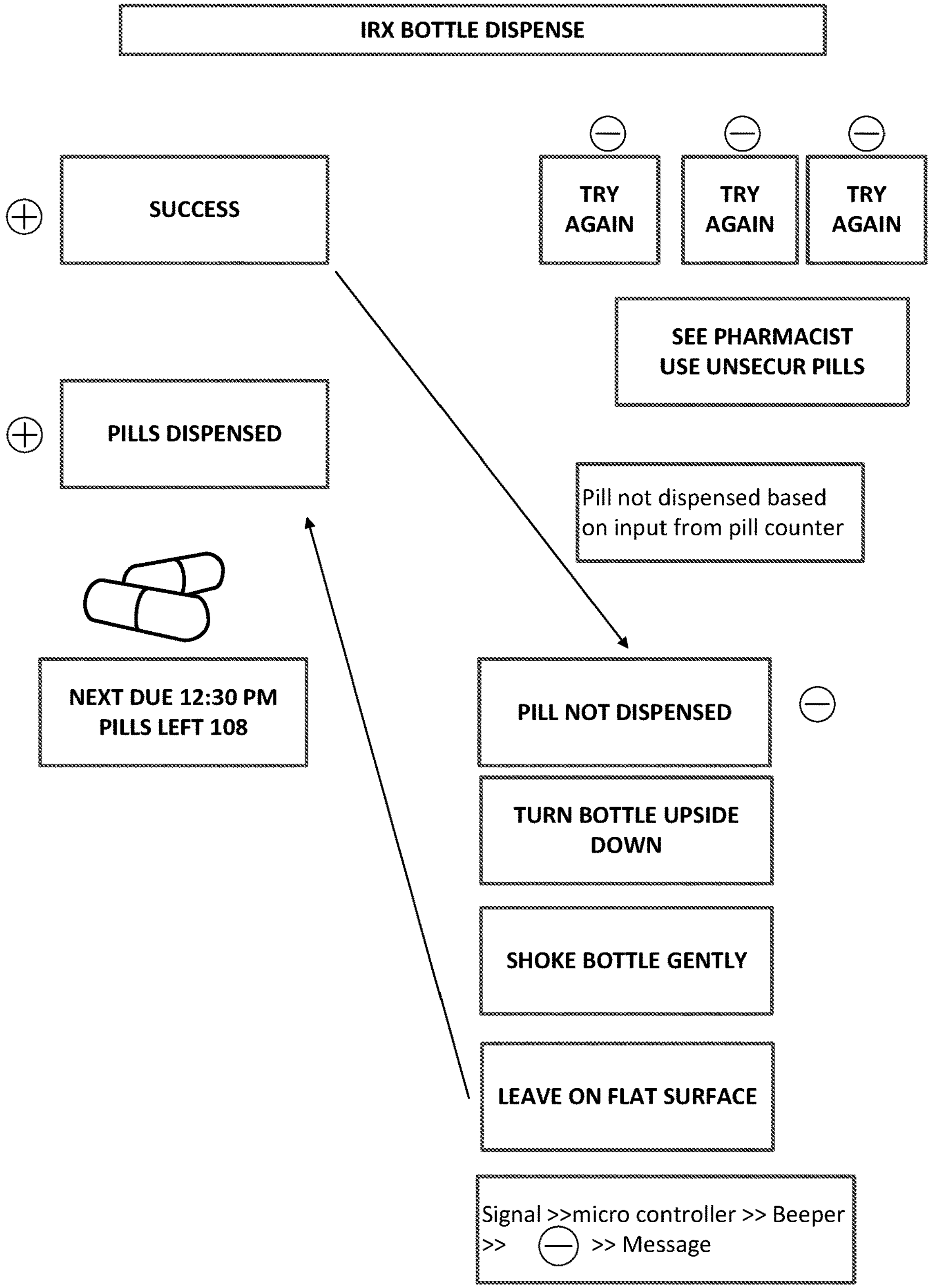
FIG. 9 is a block diagram illustrating logic employed by a medication container according to an embodiment of the present disclosure.

As shown in FIG. 9, the medication container may determine whether medication has been successfully dispensed and, if not, the medication container may provide the user with one or more troubleshooting prompts. For example, the medication container may inform the user via on-screen messages or audible beeps/indicators that the medication has not been dispensed. Moreover, the medication container may direct the user to perform one or more troubleshooting actions (e.g., turn bottle upside down, shake bottle gently, leave on flat surface, etc.).

While the disclosure has been described in connection with the various embodiments of the various figures, it is to be understood that other similar embodiments can be used, or modifications and additions can be made to the described embodiments. For example, the examples of the disclosure have centered around travel medication. The disclosure would be equally applicable if the medical container was not portable and thus the material of the medical container being more substantial in size and strength to prevent breakage. For example, the medical container may be in a kiosk at a camp or conference center wherein certain medications would be preloaded into the medical container and the systems and methods of the disclosure used to provide access to the medication inside the medical container. Therefore, the travel packaging for medications as described herein should not be limited to any single embodiment, but rather should be construed in breadth and scope in accordance with the appended claims.

What is claimed:

1. A system comprising:

(a) a first locking medication dispenser comprising:

a first outer container;

a first inner container configured to be disposed within the first outer container and further configured to receive a first medication; and a first rotatable assembly connected to a bottom of the first inner container, the first rotatable assembly having a hole defined therein, the hole referred to as a first well, and wherein the first well rotates with the rotation of the first rotatable assembly;

(b) a second locking medication dispenser comprising:

a second outer container a second inner container configured to be disposed within the second outer container and further configured to receive a second medication; and a second rotatable assembly connected to a bottom of the second inner container; the second rotatable assembly having a hole defined therein, the hole referred to as a second well, and wherein the second well rotates with the rotation of the second rotatable assembly;

(c) a base, wherein the base is coupled to the first locking medication dispenser and the second locking medication dispenser, wherein the base has a first chute defined therein coinciding with a location of the first inner container and a second chute defined therein coinciding with a location of the second inner container, wherein the first chute is periodically positioned under the first well when the first rotatable assembly is rotating and the second chute is periodically positioned under the second well when the second rotatable assembly is rotating.

2. The system of claim 1 wherein the base is configured to supply power to the first medication dispenser and the second medication dispenser.

3. The system of claim 1 wherein the first opening in the base and the second opening in the base are sized to accommodate a maximum size of the first medication and the second medication.

4. The system of claim 3 wherein the first opening in the base and the second opening in the base are in communication with a common chute in the base to provide access to the first medication and the second medication to a user.

5. The system of claim 4 wherein the common chute opens to a common pill dispenser box.

6. The system of claim 5 wherein the common chute has a sensor disposed therein and wherein the sensor is configured to detect when the first medication or the second medication is retrieved.

7. The system of claim 6 further comprising a notification generated when the first medication is retrieved and wherein dispensing a second medication is contingent on receipt of the notification by the second lockable medication dispenser that the first medication has been retrieved.

8. The system of claim 6 wherein a time stamp is generated when the first medication is retrieved and when the second medication is retrieved.

9. The system of claim 5 wherein the first medication is retrieved prior to the second medication being dispensed.

10. The system of claim 5 wherein the first medication and the second medication are dispensed prior to either the first medication or the second medication being retrieved.

11. The system of claim 1 wherein the first locking medication dispenser and the second locking medication dispenser are operated independently.

12. The system of claim 1 wherein the first locking medication dispenser and the second locking medication dispenser are operated in tandem, wherein dispensing a first medication is coordinated with dispensing a second medication.

13. The system of claim 1 wherein the base includes a base controller that is communication with the first locking medication dispenser and the second locking medication dispenser.

14. The system of claim 13 wherein the base controller coordinates the dispensing of the first medication and the second medication based on the prescription indicating a time interval between medications.

15. The system of claim 13 wherein the base controller coordinates the dispensing of the first medication and the second medication based on the prescription indicating interactions between the first medication and the second medication.

16. The system of claim 1 wherein the first locking medication dispenser and the second locking medication dispenser are stackable one on top of the other.

17. The system of claim 1 wherein there in no chute if the first medication container or the second medication container is positioned directly on the base.

18. The system of claim 1 wherein the base is rotatable.

* * * * *